Aug. 23, 1938.   E. H. PLACKE ET AL   2,127,652
PAPER FEED MECHANISM FOR CASH REGISTERS
Filed July 27, 1936   19 Sheets-Sheet 1

Inventors
Everett H. Placke and
George H. Tasker
By
Their Attorney

Aug. 23, 1938.  E. H. PLACKE ET AL  2,127,652
PAPER FEED MECHANISM FOR CASH REGISTERS
Filed July 27, 1936    19 Sheets-Sheet 3

Inventors
Everett H. Placke and
George H. Tasker
By Pearl Benst
Their Attorney

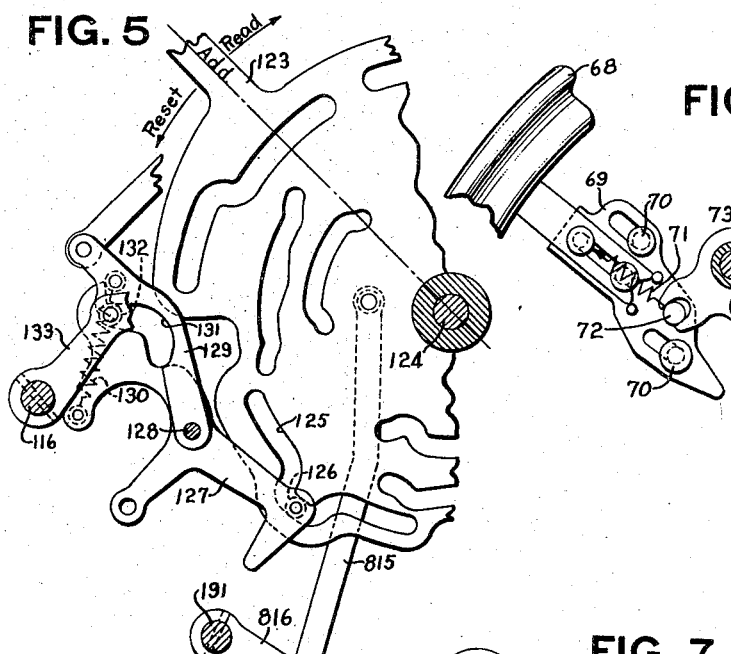
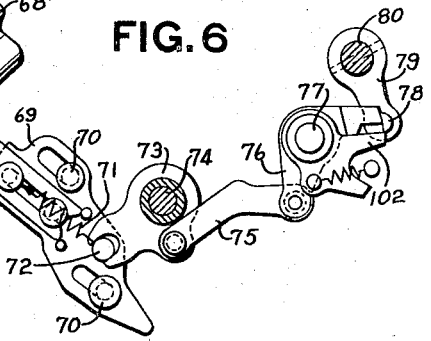
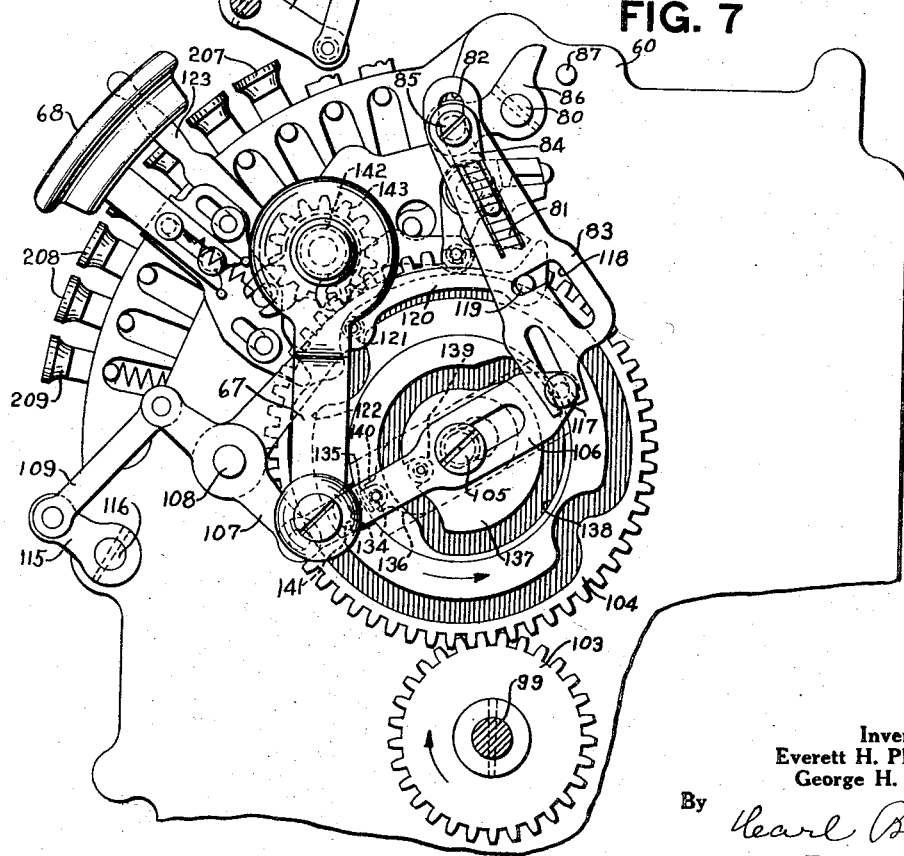

Aug. 23, 1938.  E. H. PLACKE ET AL  2,127,652
PAPER FEED MECHANISM FOR CASH REGISTERS
Filed July 27, 1936  19 Sheets-Sheet 5
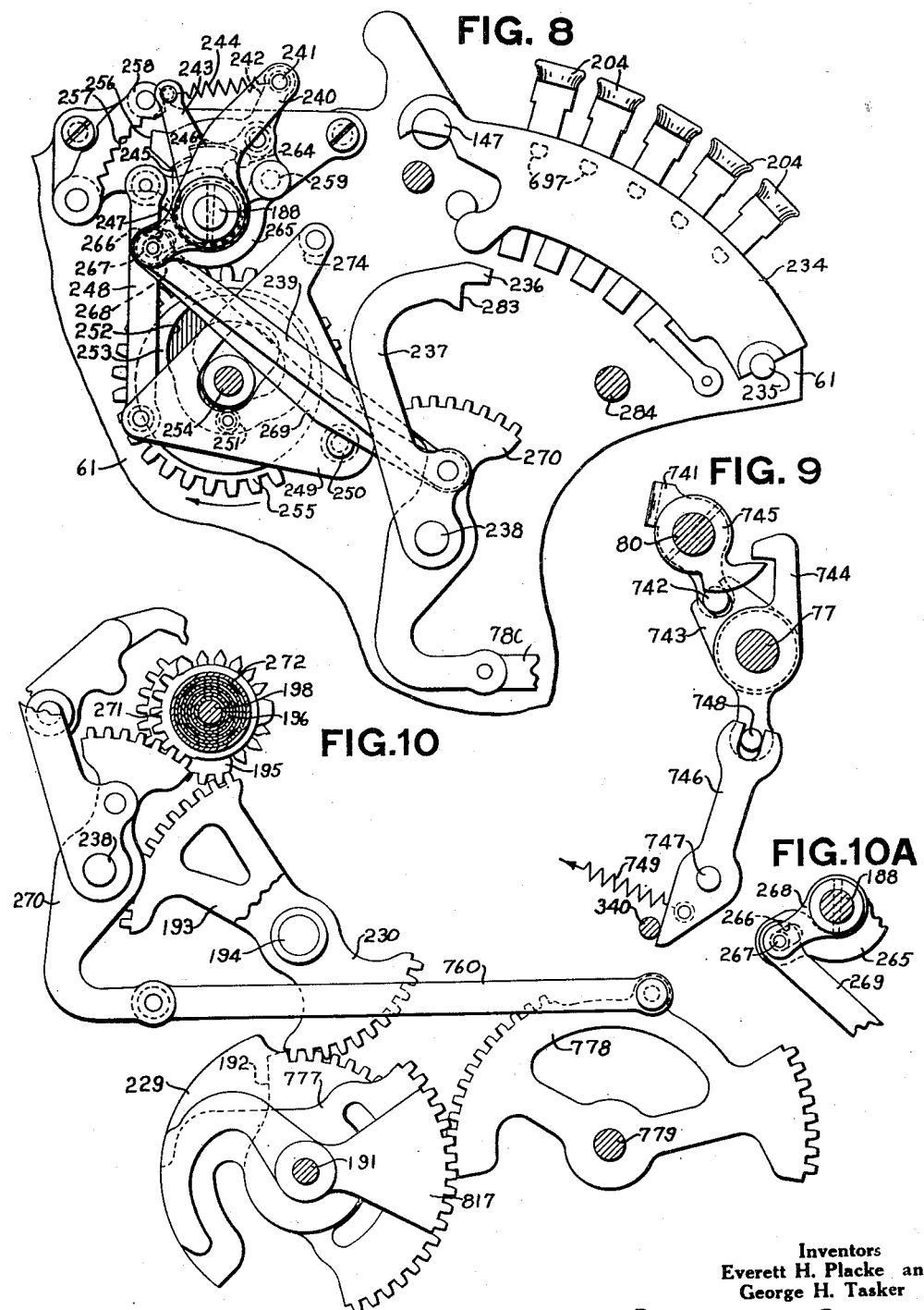
Inventors
Everett H. Placke and
George H. Tasker
By *Jearl Berist*
Their Attorney Aug. 23, 1938. E. H. PLACKE ET AL 2,127,652
PAPER FEED MECHANISM FOR CASH REGISTERS
Filed July 27, 1936 19 Sheets-Sheet 6
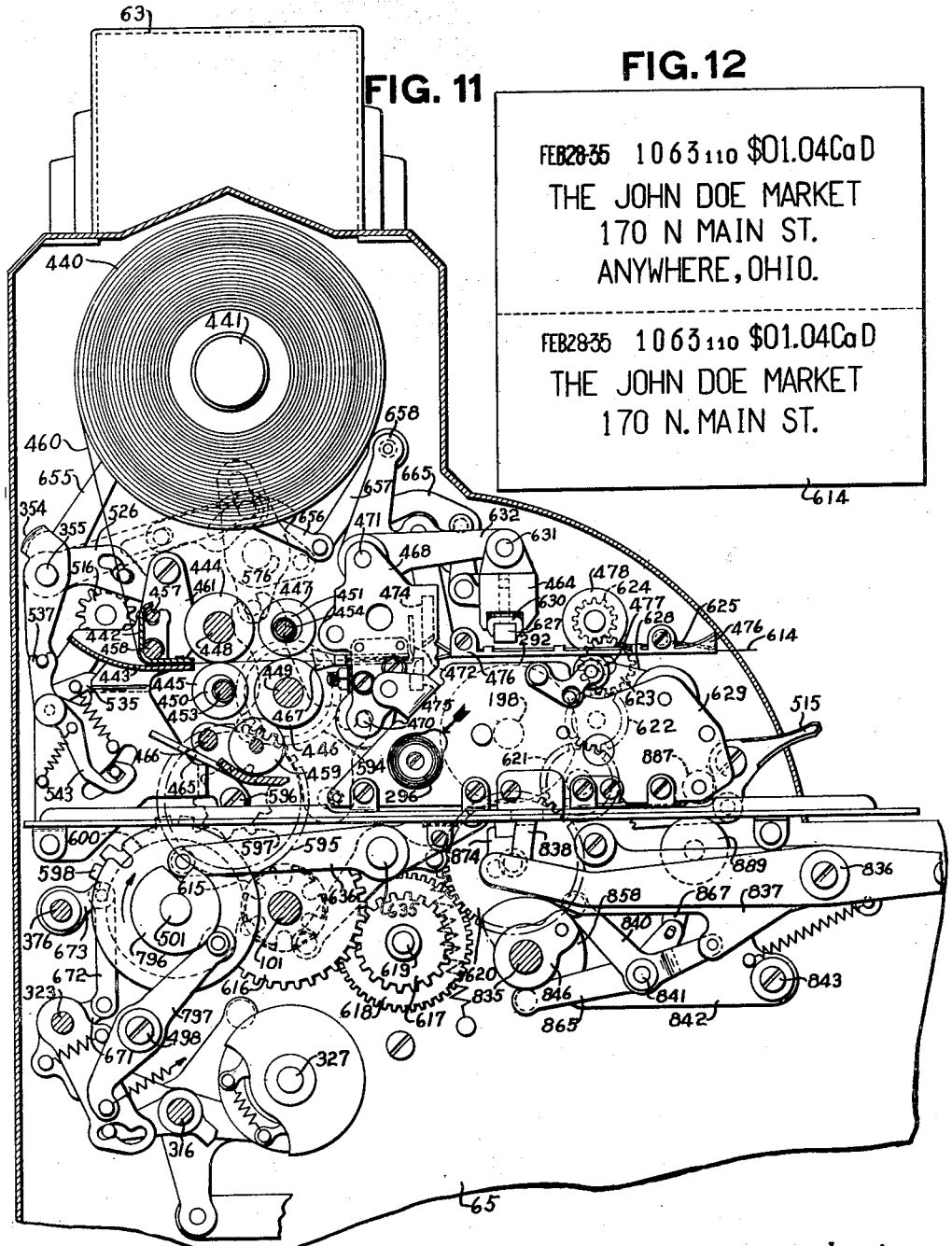
Inventors
Everett H. Placke and
George H. Tasker
By Carl Benst
Their Attorney Aug. 23, 1938.                E. H. PLACKE ET AL                2,127,652
                   PAPER FEED MECHANISM FOR CASH REGISTERS
                    Filed July 27, 1936          19 Sheets-Sheet 7
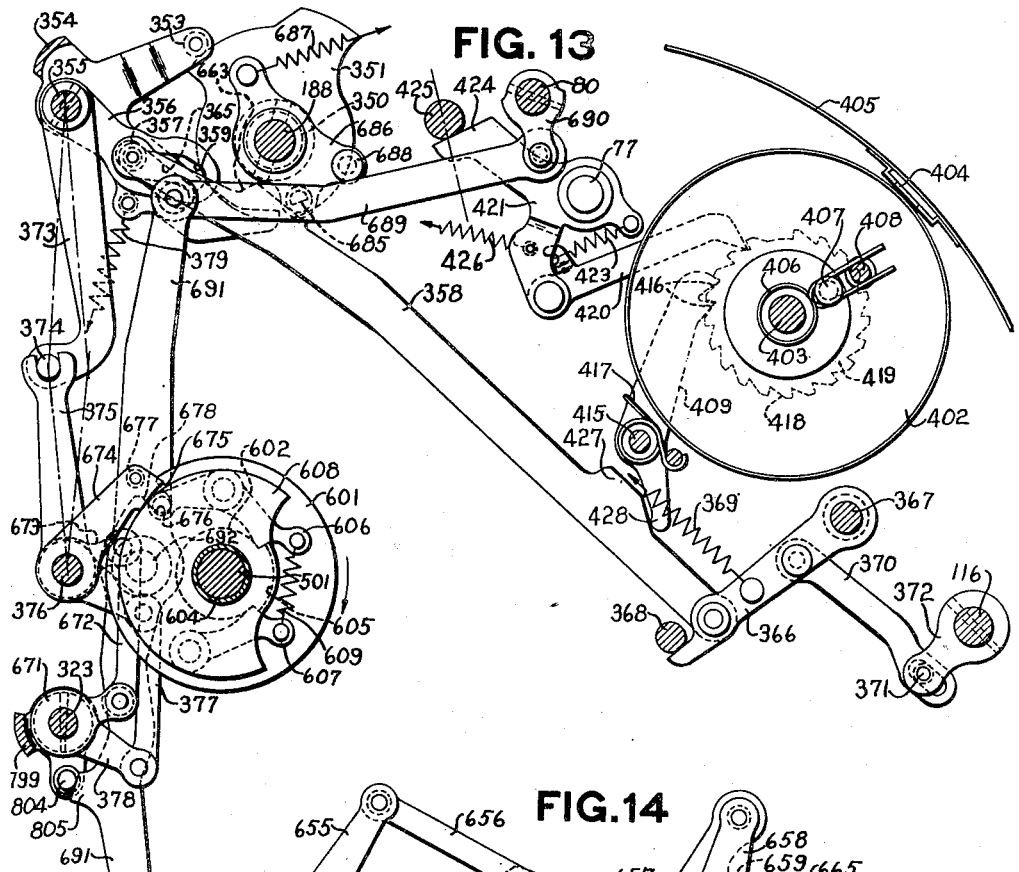
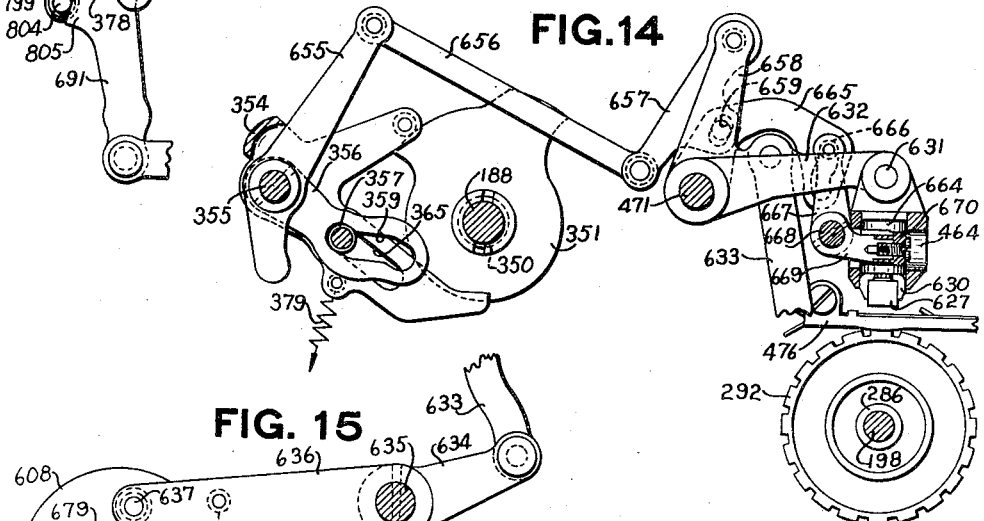
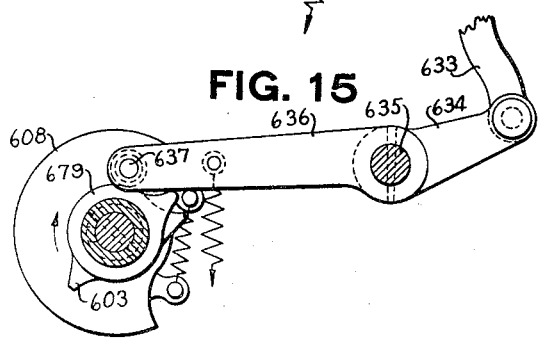
Inventors
Everett H. Placke and
George H. Tasker
By *Earl Benst*
Their Attorney Aug. 23, 1938.  E. H. PLACKE ET AL  2,127,652
PAPER FEED MECHANISM FOR CASH REGISTERS
Filed July 27, 1936  19 Sheets-Sheet 8
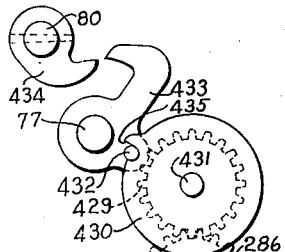
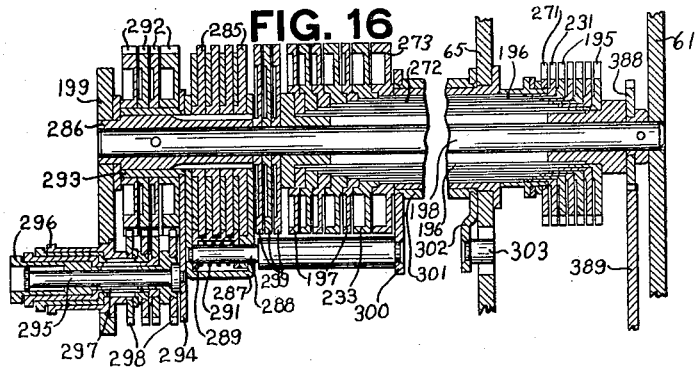
FIG. 16
FIG. 17
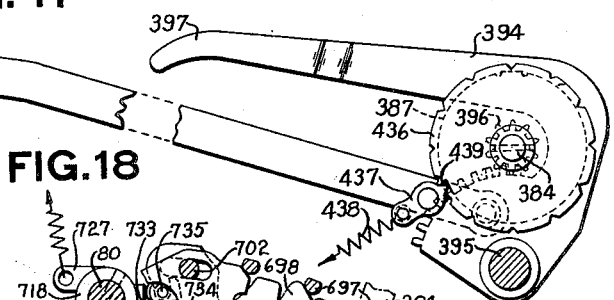
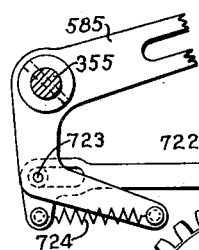
FIG. 18
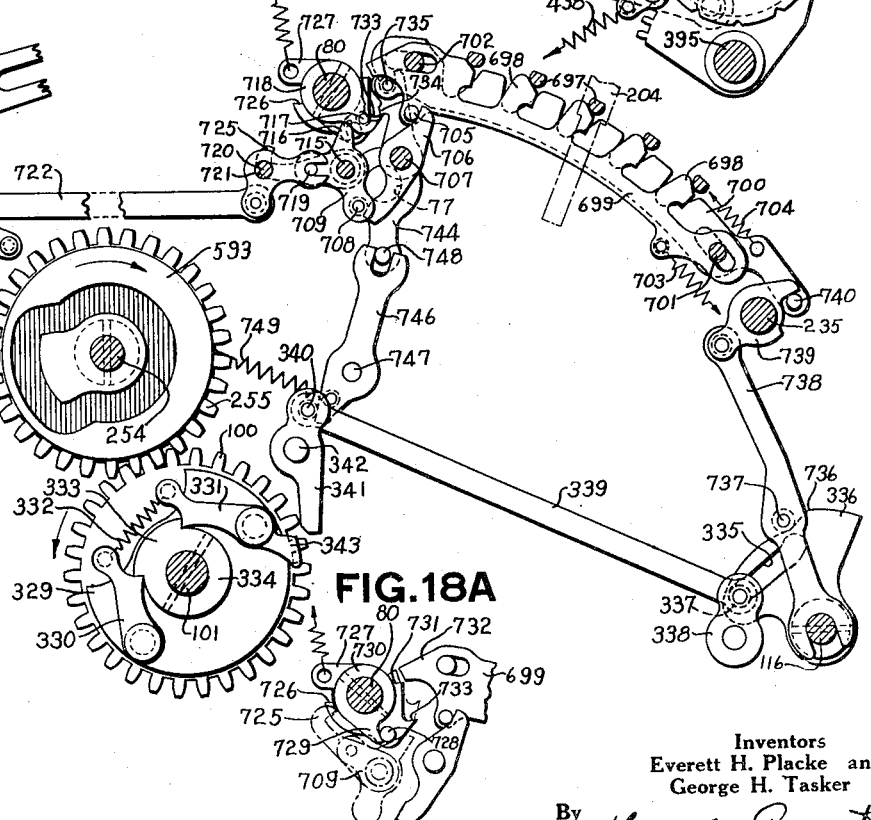
FIG. 18A
Inventors
Everett H. Placke and
George H. Tasker
By *Carl Benst*
Their Attorney Aug. 23, 1938.  E. H. PLACKE ET AL  2,127,652

PAPER FEED MECHANISM FOR CASH REGISTERS

Filed July 27, 1936    19 Sheets-Sheet 9

Inventors
Everett H. Placke and
George H. Tasker
By Earl Benst
Their Attorney

Aug. 23, 1938.   E. H. PLACKE ET AL   2,127,652
PAPER FEED MECHANISM FOR CASH REGISTERS
Filed July 27, 1936   19 Sheets-Sheet 10
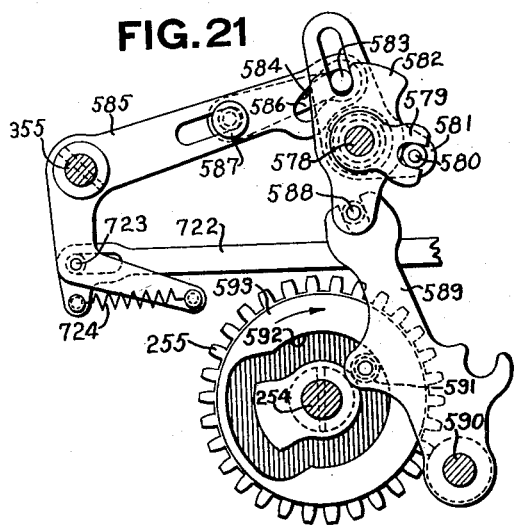
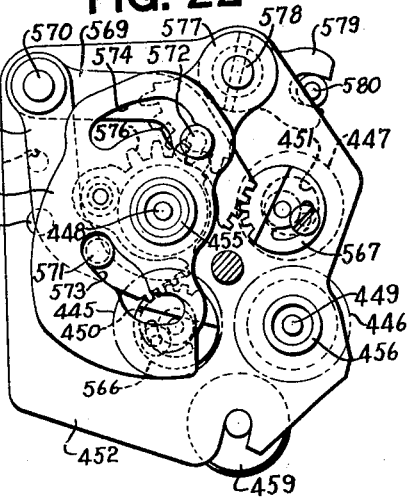
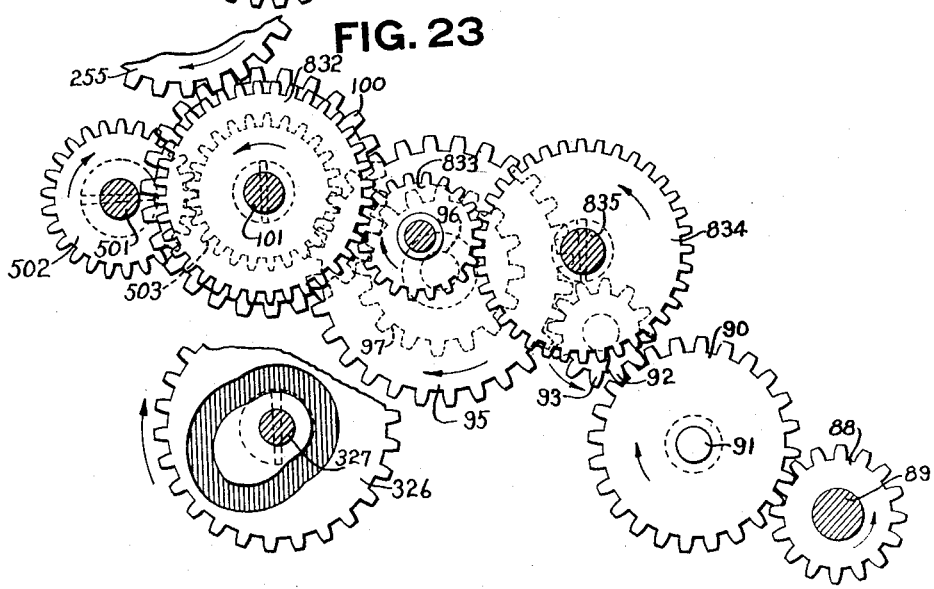
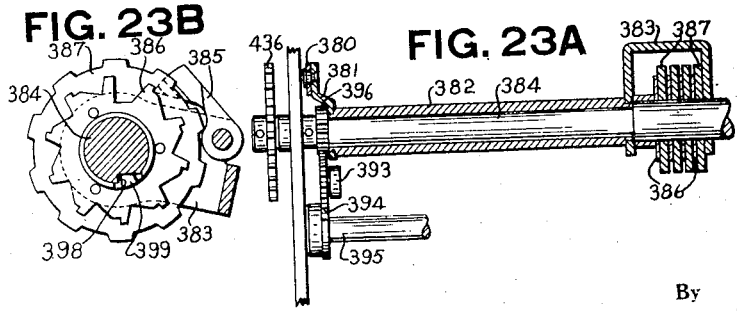
Inventors
Everett H. Placke and
George H. Tasker
By Carl Benst
The - Attorney Aug. 23, 1938.  E. H. PLACKE ET AL  2,127,652
PAPER FEED MECHANISM FOR CASH REGISTERS
Filed July 27, 1936   19 Sheets-Sheet 11
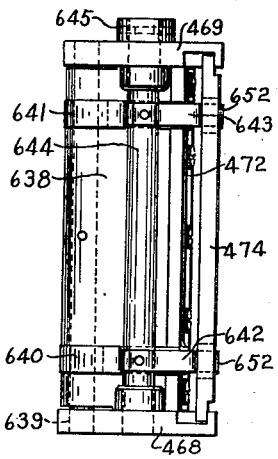
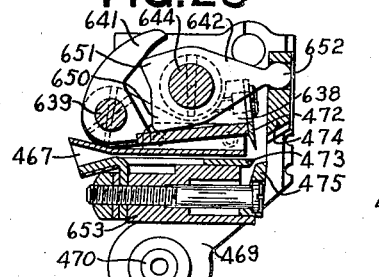
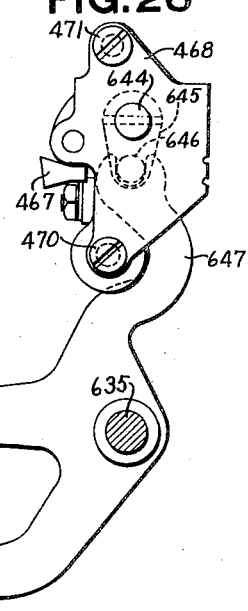
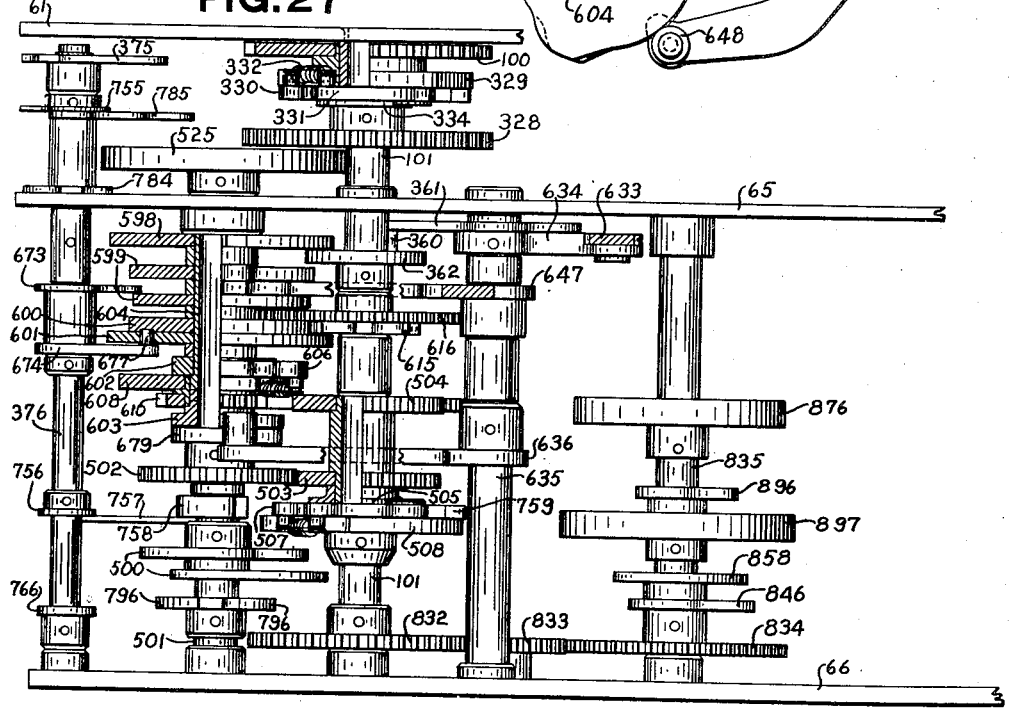
Inventors
Everett H. Placke and
George H. Tasker
By *Hearl Benst*
Their Attorney Aug. 23, 1938.  E. H. PLACKE ET AL  2,127,652
PAPER FEED MECHANISM FOR CASH REGISTERS
Filed July 27, 1936    19 Sheets-Sheet 12

Inventors
Everett H. Placke and
George H. Tasker
By Carl Benst
Their Attorney

Aug. 23, 1938.  E. H. PLACKE ET AL  2,127,652
PAPER FEED MECHANISM FOR CASH REGISTERS
Filed July 27, 1936   19 Sheets-Sheet 13

FIG. 37

Inventors
Everett H. Placke and
George H. Tasker

By *Hearl Benst*

Their Attorney

Aug. 23, 1938.  E. H. PLACKE ET AL  2,127,652
PAPER FEED MECHANISM FOR CASH REGISTERS
Filed July 27, 1936     19 Sheets-Sheet 14

Inventors
Everett H. Placke and
George H. Tasker
By *Kearl Benst*
Their Attorney Aug. 23, 1938.  E. H. PLACKE ET AL  2,127,652
PAPER FEED MECHANISM FOR CASH REGISTERS
Filed July 27, 1936  19 Sheets-Sheet 15

Inventors
Everett H. Placke and
George H. Tasker
By Earl Beust
Their Attorney

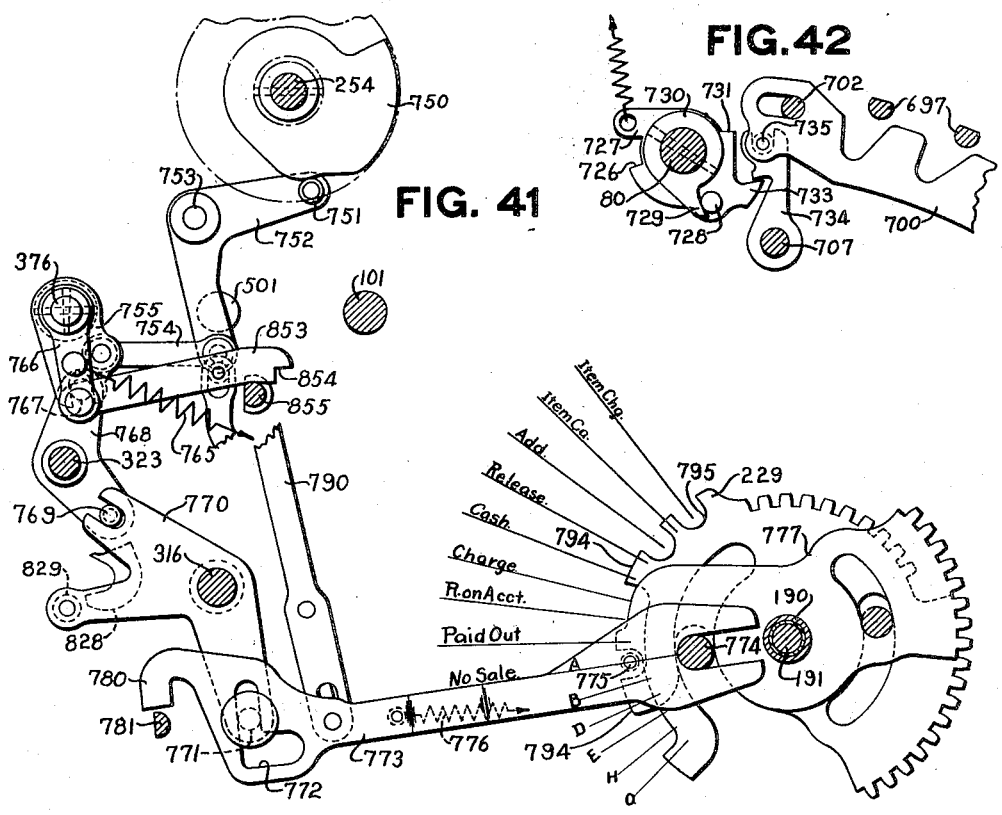
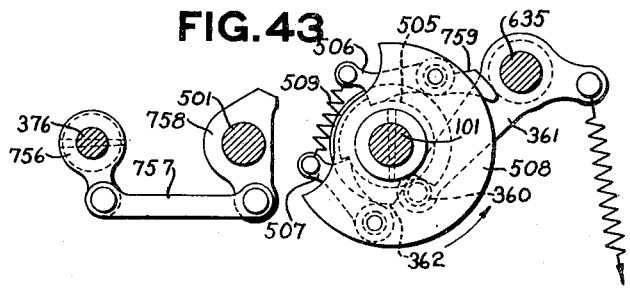

Aug. 23, 1938.  E. H. PLACKE ET AL  2,127,652
PAPER FEED MECHANISM FOR CASH REGISTERS
Filed July 27, 1936   19 Sheets-Sheet 17
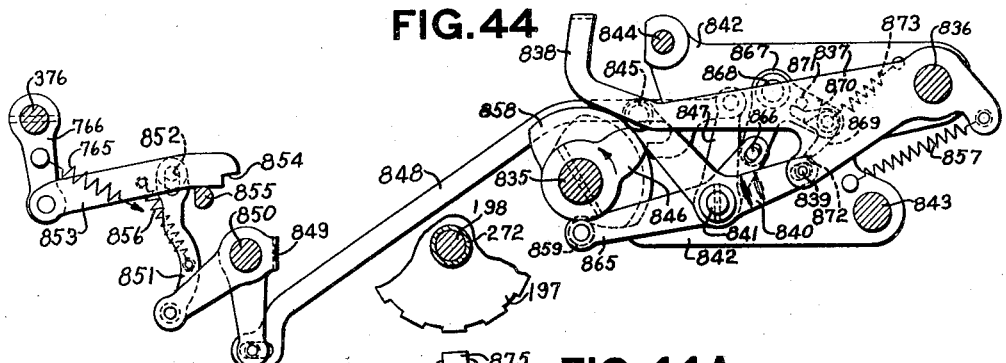
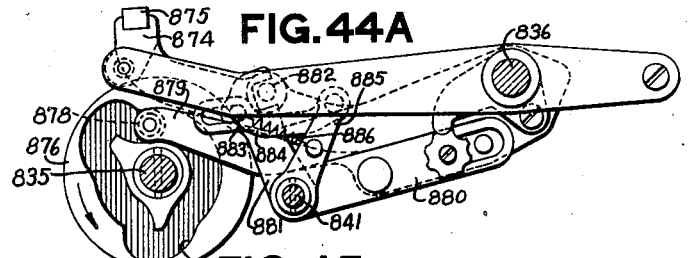
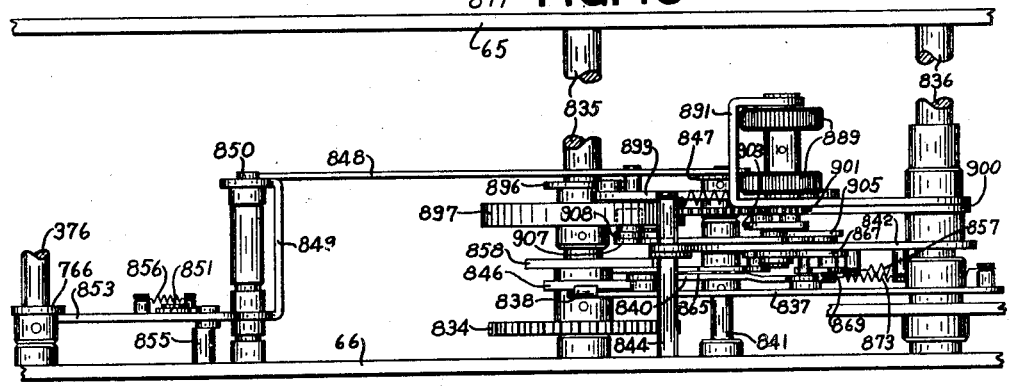
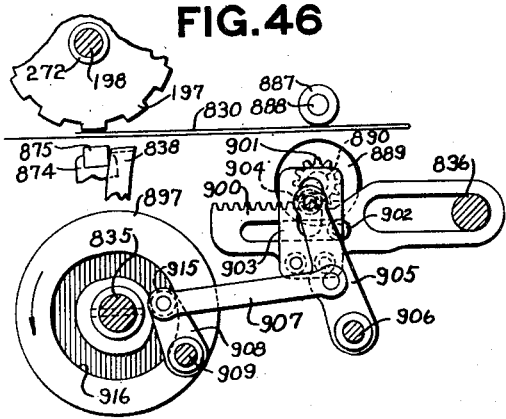
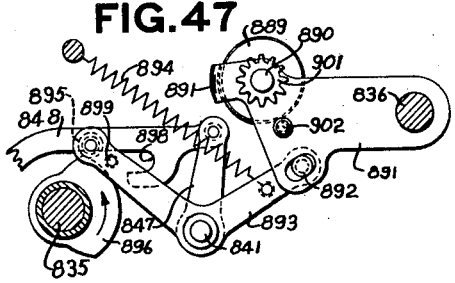
Inventors
Everett H. Placke and
George H. Tasker
By *Pearl Beust*
Their Attorney Aug. 23, 1938.  E. H. PLACKE ET AL  2,127,652
PAPER FEED MECHANISM FOR CASH REGISTERS
Filed July 27, 1936   19 Sheets-Sheet 18

Feeding of the Receipt in Multiple Item Transactions.

FIG. 48

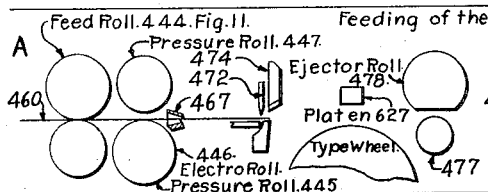

A — Feed Roll 444, Fig.11. Pressure Roll 447. 474, Ejector Roll 478, 472, 467, Platen 627, 446 Electro Roll, Pressure Roll 445, Typewheel 477, 460, 476

I  Receipt will start from knife and first be back fed 1¼" as shown in space B, providing the Receipt was not thrown off in a previous operation.

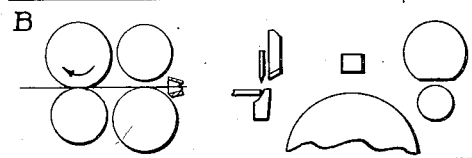

B — 1¼" Back feed of Receipt. When the receipt is thrown off it is nevertheless back fed 1¼" and remains thus until thrown on again, in which case it picks up from its 1¼" back fed position and continues as shown below. Otherwise the receipt feed starts as shown in space A.

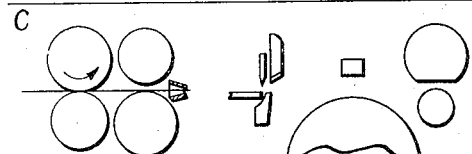

C — 1¾" Idle Pick Up.

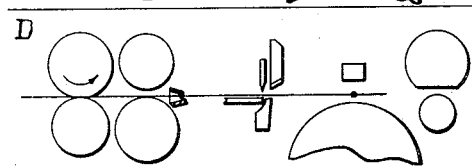

D — 3" Forward Feed. First Item Print.   First Multiple Item.

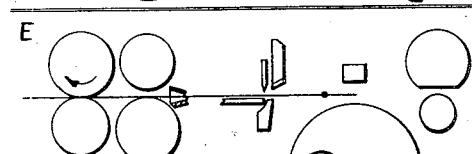

E — II   ½" Back Feed, followed by ¼" idle pickup.

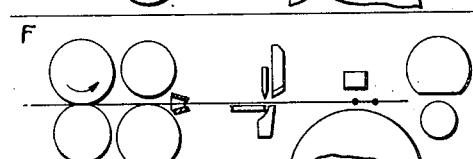

F — ¾" Forward Feed. 2nd Item Print.   2nd and Succeeding Multiple Items

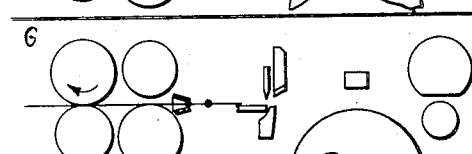

G — III   2½" Back Feed.

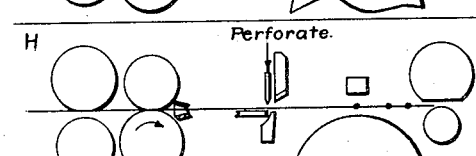

H — Perforate.   3" Forward Feed. Electro & Total Print. Perforate Stub.   Multiple Item Clearing. 2nd Cycle.

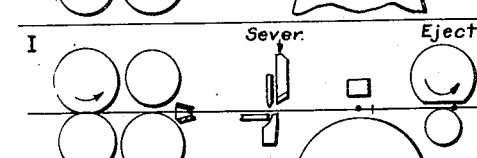

I — Sever.  Eject.   1½" Forward Feed. Total Print on Stub. Sever and Eject Receipt.

Inventors
Everett H. Placke and
George H. Tasker
By *Earl Beust*
Their Attorney

Aug. 23, 1938.  E. H. PLACKE ET AL  2,127,652
PAPER FEED MECHANISM FOR CASH REGISTERS
Filed July 27, 1936  19 Sheets-Sheet 19

Inventors
Everett H. Placke and
George H. Tasker
By *Karl Benst*
Their Attorney

Patented Aug. 23, 1938

2,127,652

UNITED STATES PATENT OFFICE 2,127,652

PAPER FEED MECHANISM FOR CASH REGISTERS

Everett H. Placke and George H. Tasker, Dayton, Ohio, assignors to The National Cash Register Company, Dayton, Ohio, a corporation of Maryland Application July 27, 1936, Serial No. 92,704

24 Claims. (Cl. 197—133)

This invention relates to cash registers and like machines and is particularly directed to the printing mechanisms of machines of the class illustrated and described in Letters Patent of the United States No. 1,619,796, granted March 1, 1927, to B. M. Shipley, and Patents Nos. 1,817,883, and 1,865,147, issued respectively August 4, 1931, and June 28, 1932, to B. M. Shipley.

Broadly it is an object of this invention to provide a machine of the type referred to above, with unique mechanism to feed record material in relation to the imprinting means.

Another object of the present invention is the provision of means to control the printing and issuing of receipts in single item and multiple item transactions.

Another object is to produce a machine of the character illustrated, which will print and issue a single item stub receipt or a multiple item stub receipt.

Another object of this invention is to provide a machine of the character referred to above with novel means for printing the amount of a single item transaction upon the body and the stub of a receipt, for printing each item of a multiple item transaction and the total of all of said items upon the body of the receipt, and duplicate the printing of the total upon the stub of said receipt.

Still another object is to provide means to shift the receipt material back and forth in relation to the printing line to properly space records thereon.

A further object is to provide means to variably feed record material in relation to the imprinting means so that various types of receipts may be issued, depending upon the type of operation being performed.

A still further object is to provide means to feed a receipt a fixed amount forwardly and simultaneously print data thereon and to feed the receipt a varying amount rearwardly and forwardly in relation to the printing line to compensate for the above mentioned fixed feed to properly space the printed records on said receipt.

Another object is to provide a latch device to connect the receipt feed driving means to the receipt feeding means, and to provide means to control the latch device so that single item and multiple item receipts, the latter of varying lengths, may be printed and issued.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a plan view of the keyboard of the machine embodying the instant invention.

Fig. 4 is a detail view of a part of the mechanism for shifting the rear totalizer line laterally in relation to the amount differentials.

Fig. 4—A is a diagrammatic view showing the relation of the receipt to the printing, perforating and severing means.

Fig. 5 is a fragmentary detail view of the total control lever and a part of the mechanism associated therewith.

Fig. 6 is a detail view of the mechanism for initiating operation of the machine.

Fig. 7 is an elevation of the right-hand end of the machine showing the transaction bank, the machine releasing mechanism and the cycle controlling mechanism.

Fig. 8 is a left side elevation of the clerk's bank and its associated differential mechanism.

Fig. 9 is a detail view of the interlock between the amount keys, the total control lever and the machine releasing means.

Fig. 10 is a left side elevation of the mechanism for positioning the clerk's type wheels, said mechanism being operated by the clerk's differential mechanism shown in Fig. 8.

Fig. 10—A is a detail of a part of the clerk's differential mechanism.

Fig. 11 is a left side elevation of the machine illustrating in a general way the receipt printing and issuing mechanism.

Fig. 12 is a facsimile of a single item stub receipt issued by the machine of the instant invention.

Fig. 13 is a left side view of the multiple item counter and a portion of the printer controlling mechanism.

Fig. 14 is a detail view of the mechanism that disables a portion of the receipt hammer platen in multiple item transactions.

Fig. 15 is a detail view of the receipt hammer operating mechanism.

Fig. 16 is a horizontal sectional view of the printer type wheel line, including the date wheel setting knobs and the consecutive number operating yoke.

Fig. 17 is a detail view of the consecutive number resetting mechanism.

Fig. 18 is a left side elevation showing the mechanism for preventing the release of the clerks' keys during multiple item transactions, and the mechanism for unlocking the machine releasing mechanism when the total control lever is moved away from adding position.

Fig. 18—A is a detail view of a part of the mechanism for controlling the depression and the release of the clerks' keys.

Figure 19:
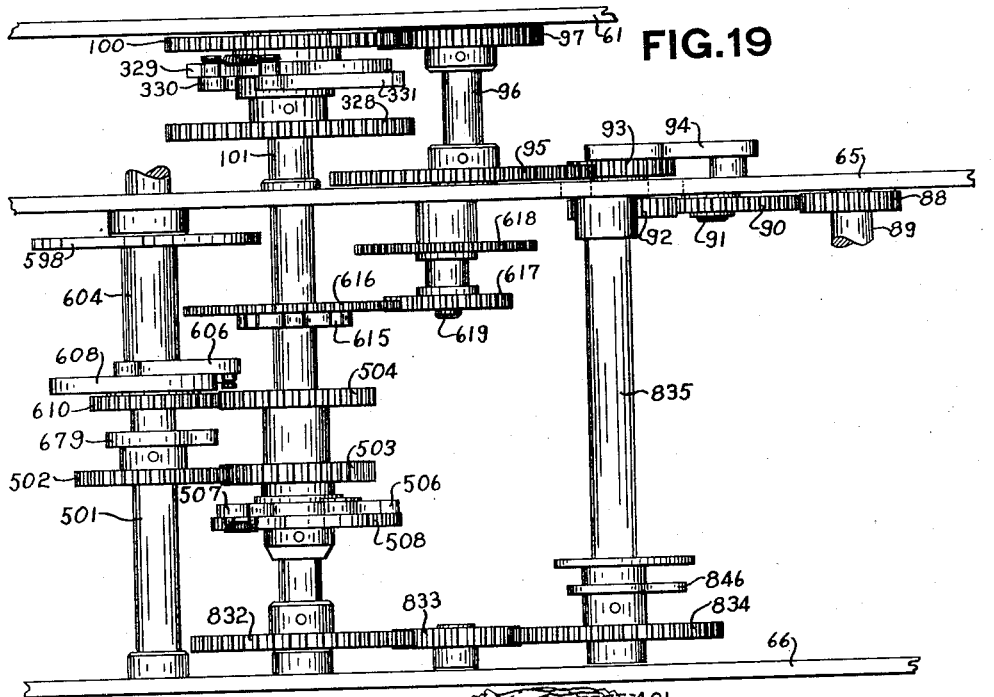

Fig. 19 is a plan view of the printer operating shafts and other mechanism associated therewith.

Figure 20:
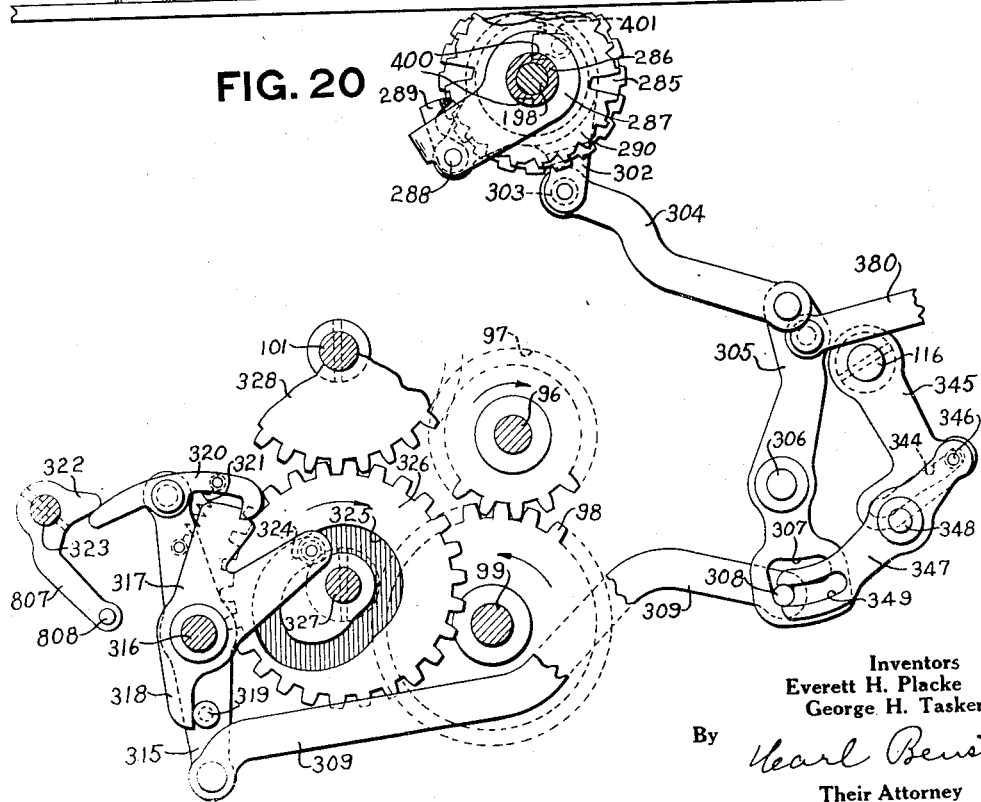

Fig. 20 is a left-hand detail view, showing the consecutive number operating and controlling mechanism.

Fig. 21 is a detail view of the mechanism that controls the receipt feed pressure rolls.

Fig. 22 is a detail view illustrating in particular the cam plate that controls the effectiveness of the receipt feed pressure rolls.

Fig. 23 shows the train of gears that drive the machine and the receipt printing and issuing mechanism.

Fig. 23—A is a detail view, partially sectioned, of the detail printer consecutive number type wheels and the means for resetting same.

Fig. 23—B is an end view of one of the detail printer consecutive number type wheels.

Fig. 24 is a plan view of the receipt knife and perforating mechanism.

Fig. 25 is a sectional end view of the receipt knife and perforating mechanism.

Fig. 26 is a detail view of the driving mechanism for the receipt knife and perforating mechanism.

Fig. 27 is a plan view, partially sectioned, of the printer operating and controlling shafts and the parts assembled thereon.

Figure 28:
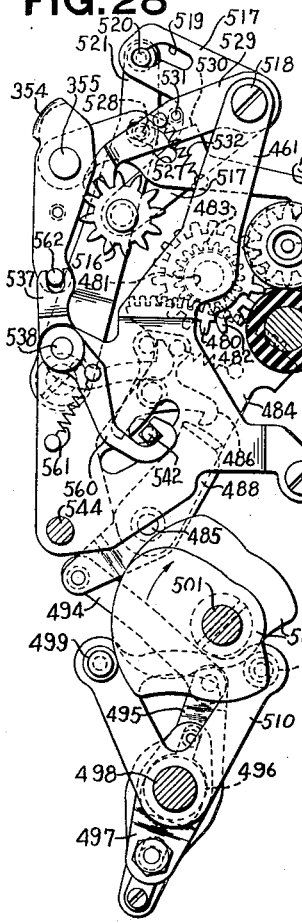

Fig. 28 is a left side elevation of the receipt feeding means and the driving means therefor.

Figure 29:
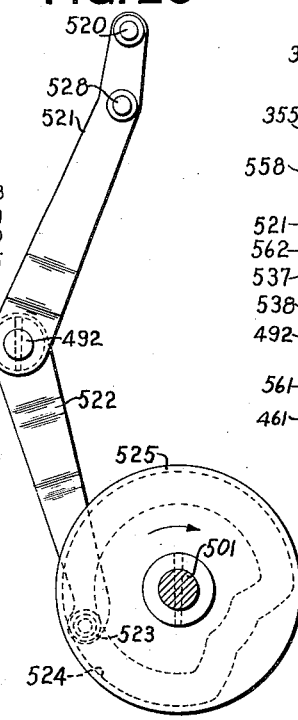

Fig. 29 is a detail view of the cam and arm that control the coupling pinion and the aliner for the receipt feeding means.

Figure 30:
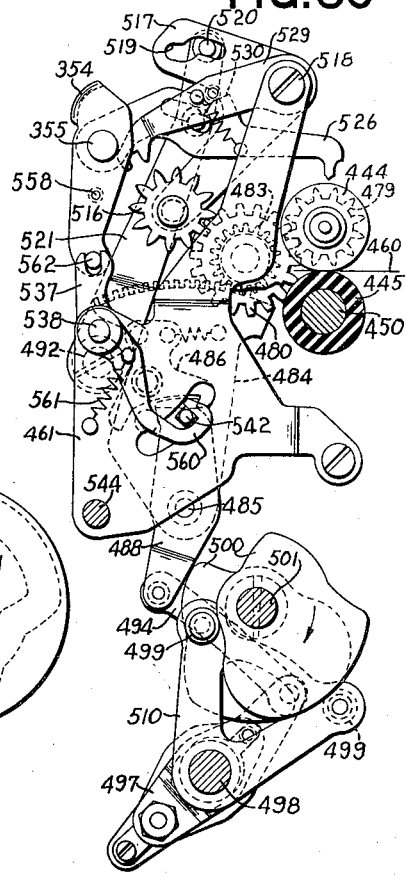

Fig. 30 is a left side elevation showing the receipt feeding mechanism in home position, while Fig. 28 shows said mechanism in moved position.

Figure 31:
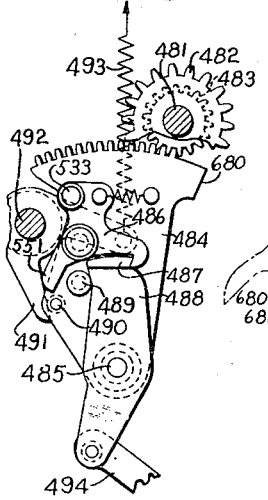

Fig. 31 is a detail view of the receipt feeding segment, the driving arm therefor, and the latch connecting said segment to said driving arm.

Figure 32:
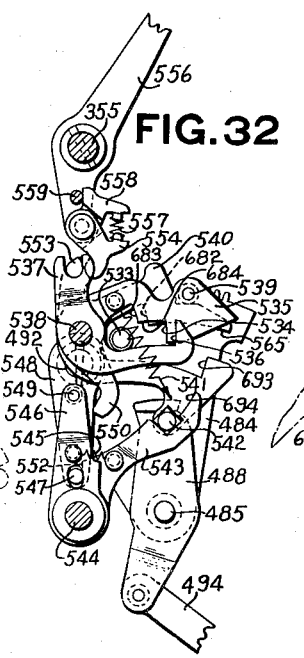

Fig. 32 is a detail view of the receipt feed latch controlling mechanism.

Figure 33:
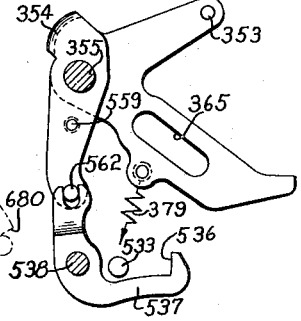

Fig. 33 is a detail view of one of the latch controlling arms and the yoke that governs the positioning thereof.

Figure 34:
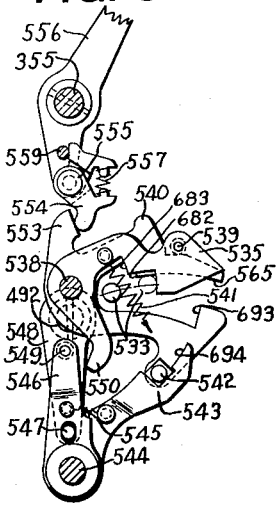

Fig. 34 is a detail view of two of the latch controlling arms, as positioned in single item transactions, and a portion of their controlling mechanism.

Figure 35:
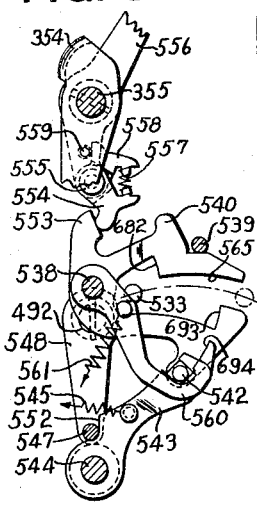

Fig. 35 is a detail view of one of the latch controlling arms and a part of the controlling mechanism associated therewith.

Figure 36:
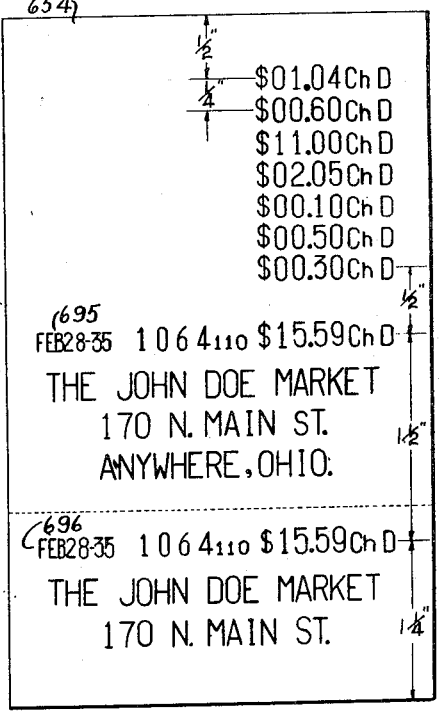

Fig. 36 is a facsimile of a multiple item stub receipt.

Figure 37A:
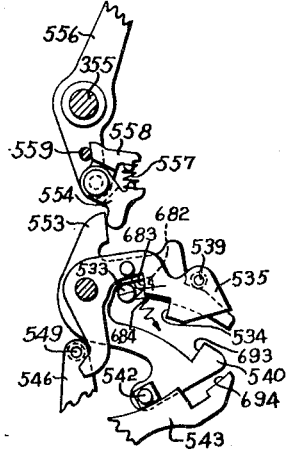

Fig. 37 is a facsimile of a duplicate insertable slip used in connection with the slip printer of the instant machine.

Fig. 37—A shows the mechanism of Fig. 34 positioned for multiple item transactions.

Figure 38:
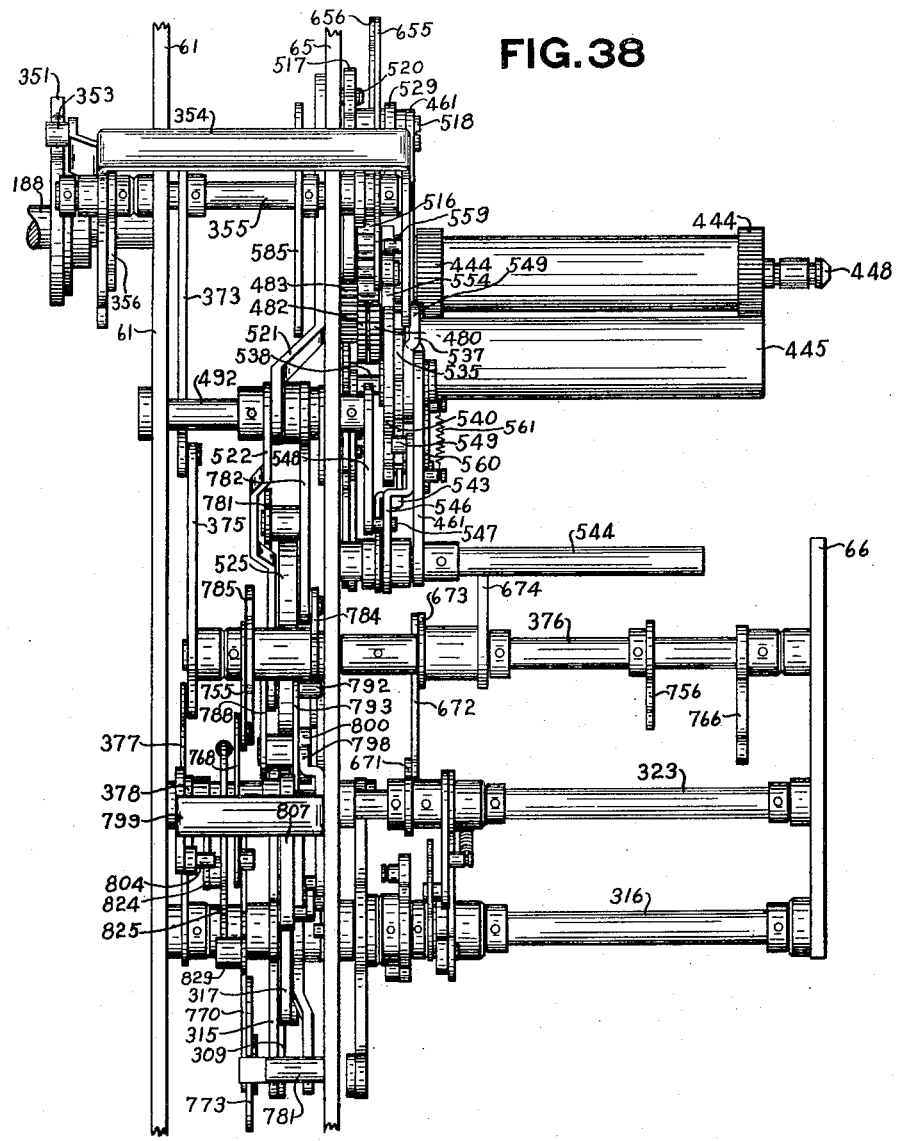

Fig. 38 is an elevation as observed from the rear of the machine, illustrating a portion of the receipt printer operating and controlling mechanism.

Figure 39:
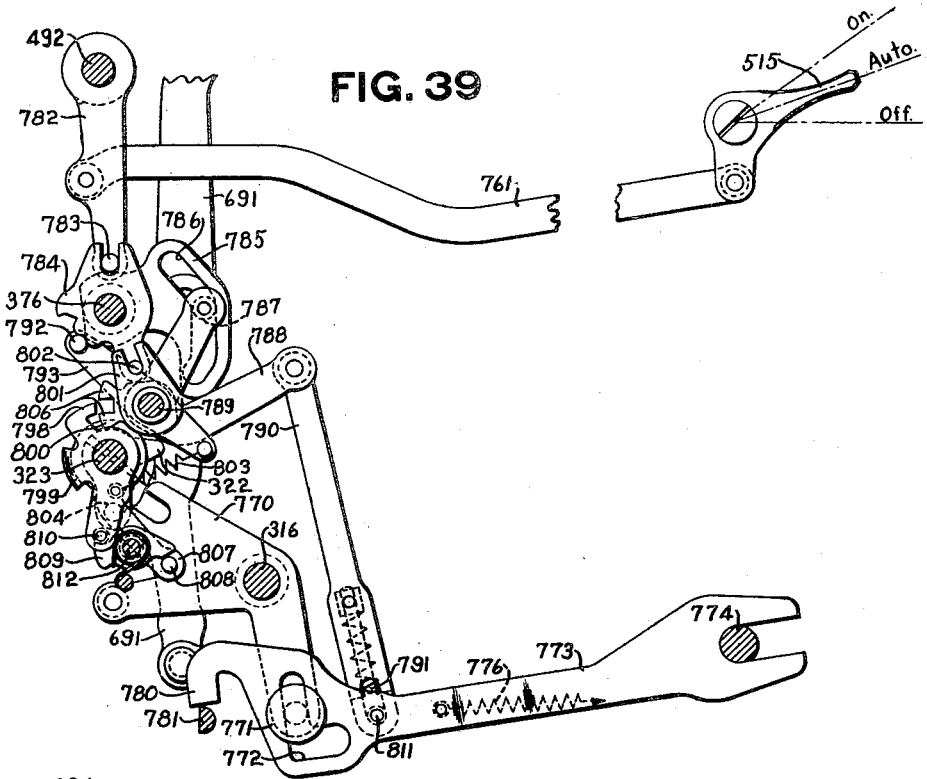

Fig. 39 is a left side elevation of the lever and mechanism associated therewith for controlling the receipt feeding means.

Figure 40:
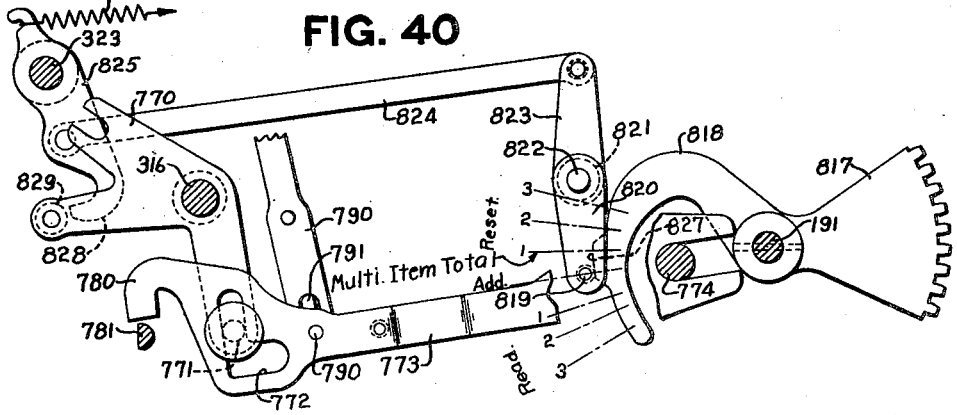

Fig. 40 shows in detail mechanism actuated by the total control lever for automatically controlling the printing and issuing of a receipt.

Fig. 41 illustrates the means whereby the printing and issuing of a receipt is controlled by the transaction and the clerks' keys.

Fig. 42 is a detail of the interlock between the clerk's bank and the machine releasing mechanism.

Fig. 43 is a detail view of the mechanism that clutches the receipt feeding means to its driving mechanism, and a portion of the mechanism for controlling said clutching mechanism.

Fig. 44 is a left side elevation showing the slip printer mechanism and the controlling means therefor.

Fig. 44—A is a detail view of the slip hammer and the means for operating same.

Fig. 45 is a plan view of the slip feeding means and the controlling means therefor.

Fig. 46 is a detail view of the slip feeding mechanism.

Fig. 47 is a detail view of the means for controlling the slip feeding mechanism.

Fig. 48 illustrates diagrammatically the different steps in the printing and issuing of a receipt in multiple item transactions.

Figure 49:
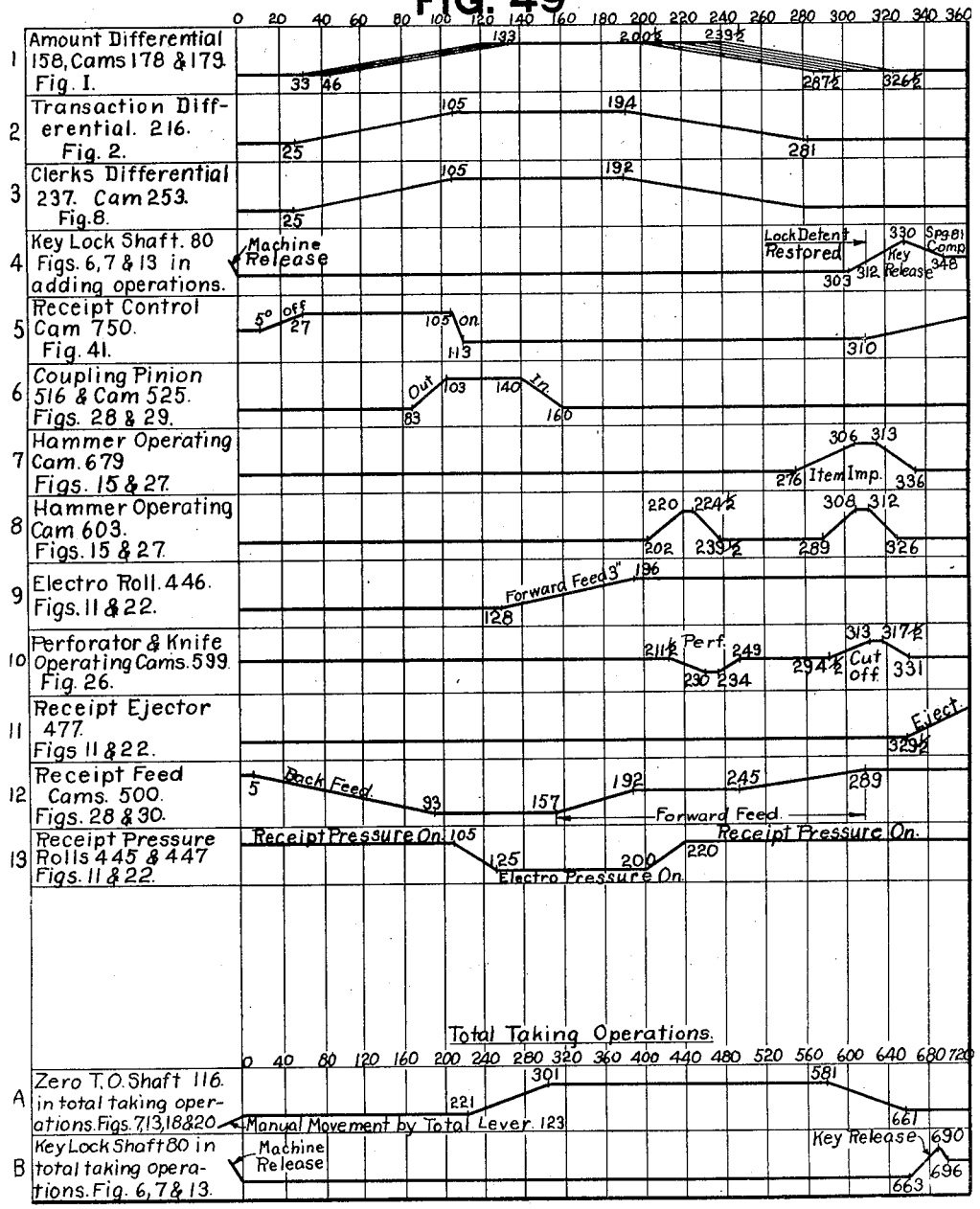

Fig. 49 is a chart depicting graphically the timing of the movements of the various mechanisms embodied in the machine of the instant invention.

General description

The crux of the present invention is a novel printing device in which a single set or line of type wheels is adapted to print upon a main portion and a detachable portion of an issuing stub receipt, and when desirable, to print also upon duplicate portions of an insertable slip.

The type wheel line has a plurality of amount type wheels positioned in adding operations by a plurality of denominational rows of amount keys and in total-taking operations by the wheels of the totalizer being read or reset. There is also a transaction type wheel positioned by a row of transaction keys and a clerk's type wheel positioned by a row of clerks' keys. The type wheel line also supports a plurality of type wheels that print a consecutive number for each single item transaction and a consecutive number for each multiple item transaction, which includes a series of item entering operations and a final clearing operation. The consecutive number wheels are not advanced in total-taking operations.

The type wheel line also includes a group of type wheels which may be manually set to print a number upon the record material for identifying store, department, machine, etc. The type wheel line likewise supports a series of date wheels, which may be manually set by conveniently located telescoping knobs, to the desired date. Each type wheel has two identical sets of numbers or characters, one of which prints upon the issuing receipt and the other upon the insertable slip. Additional data is printed upon the issuing receipt by an electroroll.

The machine embodying the present invention has three lines of totalizers, one line including a set of totalizers for accumulating totals of multiple item transactions, another line including a set of totalizers for accumulating totals of all transactions, and a third line including a set of totalizers for accumulating totals of the various transactions handled by individual clerks. These three sets of totalizers will hereinafter be referred to respectively as the No. 1 or multiple item totalizer line, the No. 2 or clerk's totalizer line, and the No. 3 or transaction totalizer line.

The multiple item totalizer line has a single set of totalizer wheels selected by the multiple item transaction key. The transaction totalizer line has a set of wheels for each of the transaction keys and these sets of wheels are selected by corresponding transaction keys to accumulate the amounts of the various transactions. The clerk's totalizer line has a set of wheels for each clerk's key and is selected by said keys to accumulate the amounts of the transactions handled by the various clerks.

The machine embodying this invention is arranged to perform single item and multiple item transactions. A single item transaction consists of the entering of a single item in the selected transaction and clerk's totalizers and the printing of this item both upon the body and the stub of the issuing receipt.

If desired, single items may be printed both upon the original and the duplicate portions of the insertable slip. However, in this latter case the single item transaction is generally in the form of a total of a bill of goods which has been manually listed and totaled upon the original and duplicate portions of the slip prior to the printing thereof.

In single and multiple item transactions a slip feeler device renders the receipt printing mechanism inoperative when a slip is inserted in the machine and renders the slip printing mechanism inoperative when no slip is inserted in the machine.

A multiple item transaction consists of a series of item entering operations followed by an enforced clearing operation. During the item entering operations the items are accumulated in the multiple item totalizer as well as the proper transaction and clerk's totalizers. Simultaneously the amount of each item is printed upon the main portion or body of the receipt. In the enforced clearing operation following a series of multiple item entering operations the multiple item totalizer is reset to zero and the total is printed upon the main portion and the stub of the receipt. Also during this enforce clearing operation the electroroll functions to imprint desired data upon the face of the receipt.

A novel receipt feeding mechanism is employed to properly position the receipt record material in relation to the printing means and a unique method is employed for controlling the receipt feeding means. In single item transactions the receipt web is first back-fed a certain distance to properly locate said web in relation to the electroroll, after which the electroroll feeds the web forwardly a greater distance to aline said web with the printing means and said electro simultaneously imprints certain data on the face of the receipt. Next the impression means imprints the amount of the transaction, the consecutive number, the date and other data relative to the transaction upon the main portion of the receipt. The receipt web is then perforated to facilitate detaching the stub portion therefrom, after which said receipt web is fed forwardly to aline the stub portion with the impression mechanism. The impression mechanism again functions to imprint the identical data, amount, consecutive number, etc. upon the stub, that was imprinted upon the body of the receipt. The receipt is then severed from the web and ejected forwardly, where it may be easily removed from the machine by the operator.

In the first item entering operation of a multiple item transaction the receipt web is back-fed a certain distance exactly as in single item operations and said web is then fed forwardly a greater distance to properly position said receipt web in relation to the impression mechanism. In this case the electroroll remains inoperative and the forward feeding of the web is accomplished by the receipt feeding mechanism. Next the amount of the first item is printed upon the receipt and simultaneously entered in the clerk's and transaction totalizers. In all succeeding item-entering operations the receipt web is back-fed a certain distance and then forward-fed a greater distance to properly line-space the items.

In the item-entering operations of a multiple item transaction, only the amount of the item, the transaction symbol and clerk's symbol are printed upon the receipt, the consecutive number, date and machine number being omitted therefrom. In the final clearing operation of a multiple item transaction, the receipt web is back-fed sufficiently to provide room for the printing and feeding by the electroroll, which occurs immediately thereafter. The printing mechanism then functions to print the total of the items, the transaction and clerk's symbol, the consecutive number, the machine number, and the date, upon the main portion of the receipt, and immediately thereafter the receipt web is perforated. The receipt web is then fed forwardly to aline the stub portion thereof with the impression mechanism, and said impression mechanism again functions to imprint on the stub the identical data, including the total, consecutive number, date, etc., that was imprinted upon the main portion of the receipt.

A manual control lever is provided for the receipt printing and issuing mechanism. This lever has three positions, namely, "On", "Off" and "Automatic". When the control lever is in "Automatic" position, the receipt printing and issuing mechanism is automatically controlled by the transaction keys and the clerks' keys. A sensing mechanism, in cooperation with mutilated segments positioned by the above control keys, selectively governs the operation of the receipt printing mechanism in accordance with the transaction or clerk's keys depressed. By properly cutting the mutilated segments it is possible to elect which of the above control keys will govern the receipt feeding and issuing mechanism.

When the manipulative control lever is in "On" position, the receipt printing and feeding mechanism functions in all single item and multiple item transactions, irrespective of the control keys. In other words, the control keys do not in any way influence the operation of the receipt mechanism when the manipulative control lever is in "On" position. When the manipulative control lever is in "Off" position, the receipt mechanism does not function in any type of transaction. The receipt control mechanism outlined above has no influence whatever over the slip printing mechanism.

A mutilated segment positioned by the total control lever likewise controls the receipt printing and feeding mechanism. As presently arranged, when the total control lever is in adding or multiple-item clearing positions the receipt mechanism functions. In all other positions of the total control lever the receipt mechanism is disabled. Of course this is a matter of choice and the mutilated segment may be arranged to enable or disable the receipt mechanism when the total control lever is in any desired position.

Normally the clerks' keys are released at the end of each machine operation. However, in multiple item transactions, mechanism becomes effective to prevent the release of these keys until the latter part of the compulsory clearing operation of said multiple item transactions. In a somewhat similar manner the multiple item transaction keys are retained depressed until the final clearing operation of a multiple item transaction. In adding operations it is necessary to depress an amount key, a clerk's key and a transaction key before the machine can be released for operation. However, shifting the total control lever away from adding position to any of its total-taking positions, disables this controlling mechanism and permits the machine to be released for operation when one of the clerks' keys, or one of the transaction keys is depressed. This is obviously necessary to permit the reading or resetting of the various transaction and clerks' totalizers.

The machine embodying the instant invention is provided with a step-by-step counting device for counting and indicating the number of items in a multiple item transaction. Obviously this counting device operates only in multiple item transactions and is automatically reset to zero during the enforced multiple item clearing operation at the end of each multiple item transaction.

In the following detailed description, mechanism pertinent to the instant invention will be fully explained.

Detailed description

The mechanism of the present invention is embodied in the well known type of cash register fully disclosed in the patents referred to at the beginning of this specification. For this reason mechanism of standard construction which is not pertinent to the present invention will be but briefly described.

Machine framework

Most of the mechanism of the instant machine is supported between a right frame 60 (Fig. 7) and a left frame 61 (Figs. 1 and 38) both of which are secured to a machine base 62 in turn attached to the top of a drawer cabinet (not shown). The entire machine is enclosed by a suitable case or cabinet 63, which is secured to the machine base and to various brackets attached to the top of a drawer cabinet, (see also Fig. 11). A back plate 64 (Fig. 1) and various cross rods and bars extending between the frames 60 and 61 assist in supporting the various mechanisms and in holding said frames rigid.

The printer mechanism of the instant machine is supported between the left frame 61, a printer back frame 65, and a printer front frame 66 (Figs. 19, 27 and 38). The frame 65 is secured to the machine base 62 and is connected to the frame 61 by means of various studs. The frame 66 is connected to the frame 65 by various rods and shafts.

Operating mechanism

The machine of the instant invention is preferably operated by means of a suitable electric motor (not shown). However, if desired, or if rendered necessary by failure of the electrical current, the machine may be manually operated by means of a crank 67 (Fig. 7). Whether the machine is operated electrically or manually, the operation is initiated by depression of a starting bar 68 (Figs. 6 and 7). Depressing the starting bar 68, which is removably connected to a plate 69, slidably mounted on the frame 60 by means of parallel slots therein in cooperation with studs 70 secured in said frame, moves said plate 69 downwardly against the tension of a spring 71. Downward movement of the plate 69, by means of a stud 72 carried thereby in cooperation with the bifurcated end of a crank 73, rocks said crank counterclockwise on its pivot 74 secured in the frame 60. Counterclockwise movement of the crank 73 by means of a connecting link 75 imparts similar movement to a release pawl 76 loosely supported on a multiple item or #1 totalizer line reset shaft 77, opposite ends of which are journaled in the frame 60 and 61.

Counterclockwise movement of the release pawl 76 moves the rearward end thereof out of the path of an arcuate surface on a half-round stud 78 secured in the lower end of a crank 79 fast to a key lock shaft 80 journaled in the frames 60 and 61. This releases the key lock shaft 80 to the action of a compression spring 81 (Fig. 7) which imparts a slight clockwise movement to said shaft 80, spaces 4 and B (Fig. 49). The spring 81 fits loosely over a tongue in a slot 82 in a key release link 83, and over a tongue on a link 84, the upper end of which is loosely supported on a stud 85 secured in one arm of a crank 86 secured on the right-hand end of the key lock shaft 80. It is therefore obvious by observing Figs. 6 and 7 that when the release pawl 76 retains the key lock shaft 80 in untripped position, the spring 81 is compressed, and as soon as said release pawl is moved out of the path of the stud 78 by depressing the starting bar 68, the spring 81 immediately rocks the key lock shaft 80 clockwise until such movement is terminated by an extension of the crank 86 contacting a stud 87 secured in the frame 60.

Clockwise movement of the shaft 80 closes the motor switch and causes the motor to be clutched to a driving pinion 88 (Figs. 19, 20 and 23) loose on a stud 89 secured in the printer back frame 65. The pinion 88 meshes with a gear 90 loose on a stud 91 secured in the frame 65 and said gear 90 meshes with a pinion 92 integral with a similar pinion 93, both of said pinions being turnably mounted on a stud secured in a bracket 94 fast to the frame 65. The pinion 93 meshes with a gear 95 secured on a short shaft 96 journaled in the frames 61 and 65 and having secured on its opposite end a gear 97 which meshes with a gear 98 (Fig. 20) secured to a main drive shaft 99 journaled in the frames 60 and 61.

Figure 1:
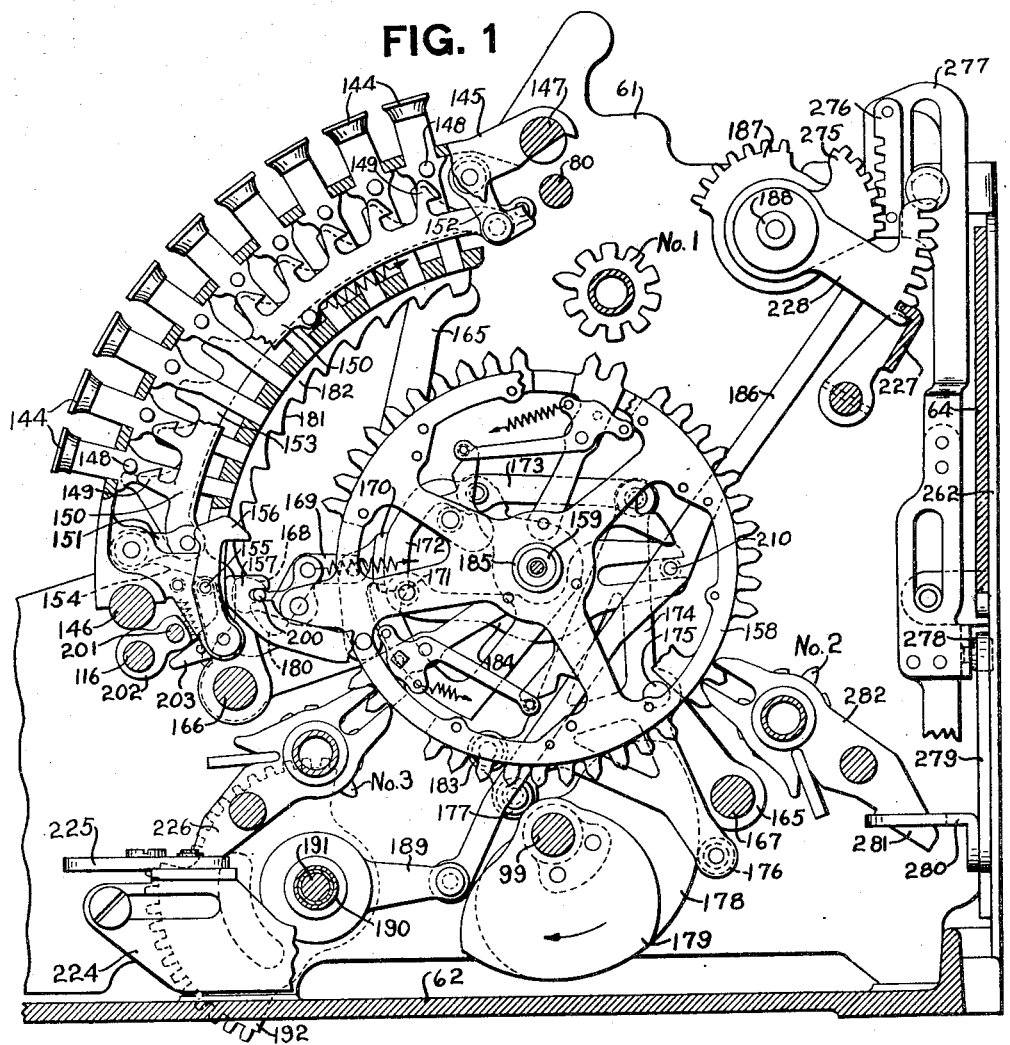
Fig. 1 is a transverse sectional view as observed from the right of the machine, taken through one of the amount banks, and showing in particular said amount bank and its associated differential mechanism.
Figure 2:
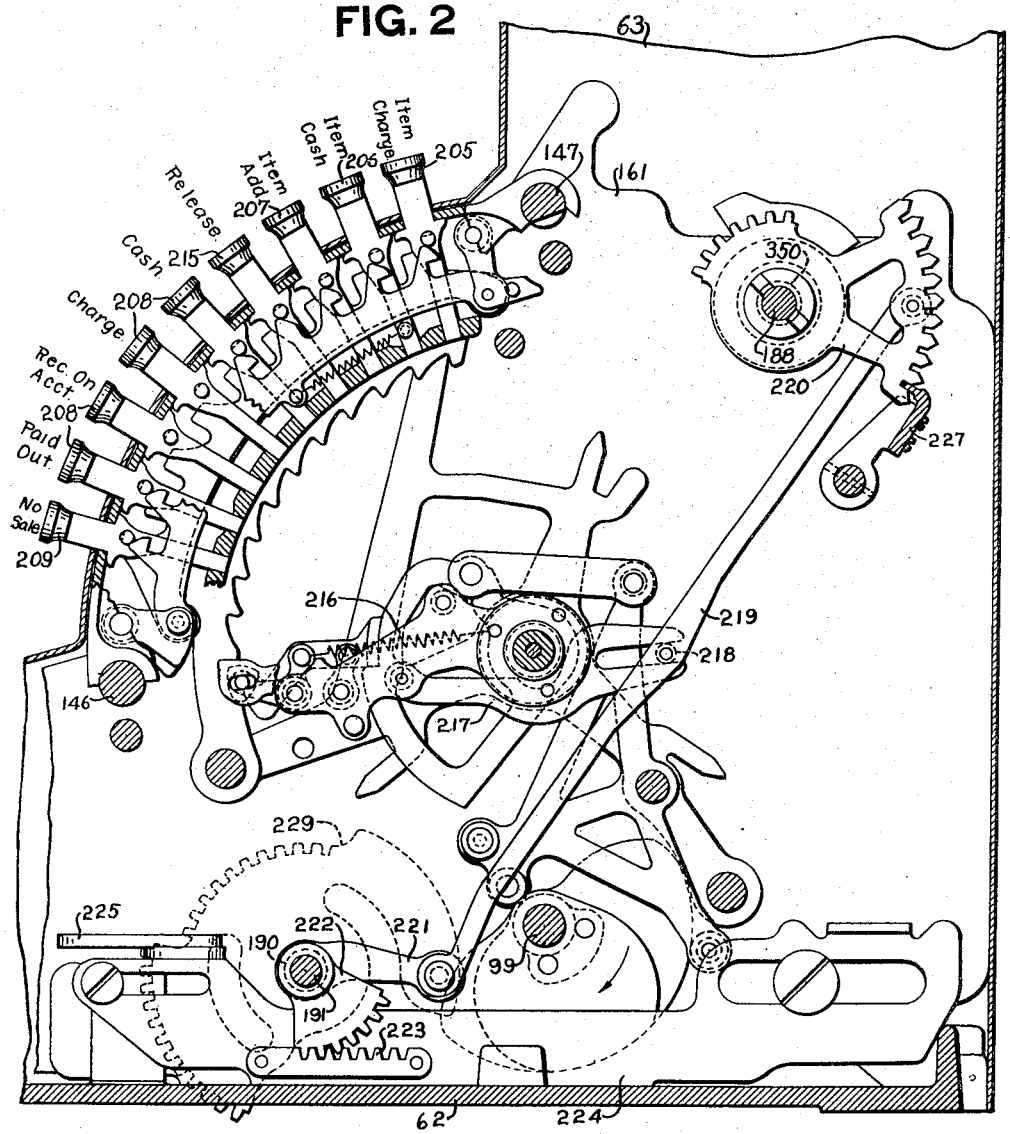
Fig. 2 is a sectional view of the machine as observed from the right and illustrates in particular the transaction bank and its associated differential mechanism.

Operation of the motor through the train of gears just described rotates the main drive shaft 99, counterclockwise as viewed in Fig. 20 and clockwise as viewed in Figs. 1, 2 and 7, one revolution in adding operations and two revolutions in total-taking operations. After the shaft 99 has completed the necessary number of revolutions to effect the type of operation being performed the key lock shaft 80 (Figs. 6 and 7) is restored counterclockwise to untripped position, thus permitting the spring 71 to return the starting bar 68 upwardly and the release pawl 76 clockwise into the path of the stud 78 to restrain releasing movement of the shaft 80. The restoring of the key lock shaft 80 is effected by the cycle-controlling mechanism pictured in Fig. 7, which will be explained later. The gear 97 (Figs. 19, 20 and 23) also meshes with a printer drive gear 100 loose on a main printer shaft 101 journaled in the frames 61, 65 and 66. A clutch device, later to be described, connects the gear 100 to the printer shaft 101 to drive said shaft one counterclockwise revolution as here viewed in adding and total taking operations to operate the printing mechanism.

In case the operator accidentally or inadvertently retains the starting bar 68 (Figs. 6 and 7) depressed at the end of a machine operation, a repeat operation of the machine is prevented by means of a non-repeat pawl 102 fulcrumed on the shaft 77, said pawl being spring-urged into the path of the stud 78, upon restoration of the key lock shaft to obstruct releasing movement of said shaft. This prevents the machine again being set in motion until the starting bar 68 is released and returned upwardly by the spring 71. Upon restoration of the starting bar 68 to undepressed position, a rearward extension of the pawl 76, which overlies the non-repeat pawl 102, returns said pawl clockwise to ineffective position as said pawl 76 is returned into the path of the stud 78. The non-repeat pawl 102 is slightly longer than the release pawl 76, which prevents said pawl 76 from stumbling on the stud 78 upon restoration of the starting bar 68 and causes said stud 78 to obstruct counterclockwise movement of the pawl 102 to prevent said pawl from interfering with the releasing movement clockwise of the key lock shaft 80. The movement of the shaft 80 in adding and total taking operations is shown graphically in spaces 4 and B respectively of the time chart (Fig. 49).

Cycle controlling mechanism

In adding operations the main drive shaft 99 makes one revolution clockwise, or one cycle of movement, as viewed in Figs. 1 and 7, and one counterclockwise revolution as viewed in Fig. 20, and in total taking operations said main drive shaft makes two revolutions or two cycles of movement. Revolution of the shaft 99 is governed by means of a cycle controlling mechanism shown in Fig. 7, and now to be described.

Secured on the right-hand end of the main drive shaft 99 (Fig. 7) is a gear 103, which meshes with a large gear 104 mounted on a stud 105 fast in the frame 60. A pitman 106 is slotted to embace the stud 105, and the lower end of said pitman is pivotally connected to one arm of a lever 107 loose on a stud 108 fast in the frame 60. A link 109 connects another arm of the lever 107 to a crank 115 secured on the right-hand end of a zero stop throw-out shaft 116 journaled in the frames 60 and 61. The zero stop throwout shaft 116 functions only in total-taking operations and the movement of this shaft is depicted graphically in space A of the time chart, Fig. 49.

The pitman 106 carries a stud 117 embraced by the lower bifurcated end of the key release link 83, the upper end of which is slotted to receive the stud 85, as explained earlier herein. The link 83 has an L-shaped slot 118, which cooperates with a stud 119 in a key release lever 120 fulcrumed on the stud 108, and carrying a roller 121 which extends within a cam groove 122 in the face of the gear 104.

The functions of the machine, adding, reading and resetting, are controlled by means of a total control lever or plate 123 (Fig. 5) pivoted on a stud 124, extending between two support plates (not shown) mounted on rods extending between the frames 60 and 61. When the total control lever 123 is in adding position, as here shown, the link 83 is positioned as shown in Fig. 7, so that the forward branch of the slot 118 engages the stud 119.

In adding operations, the main drive shaft 99 and the gear 103 make one clockwise revolution and the gear 104 is driven one-half of a revolution in a counterclockwise direction by said gear 103. The groove 122 in the gear 104 is concentric with the center 105 with the exception of two identical diametrically opposed camming sections thereof. Near the end of an adding operation one of the camming sections of the groove 122 in cooperation with the roller 121 rocks the lever 120 first clockwise and then back to normal position. Clockwise movement of the lever 120 moves the link 83 downwardly, which by means of the stud 85 in the arm 86 imparts counterclockwise movement to the key lock shaft 80 (space 4, Fig. 49) to restore said shaft to untripped position in the manner explained earlier herein. Restoring movement of the shaft 80 also releases the depressed amount, transaction and clerks' keys, opens the switch to the electric motor and disengages the clutch mechanism that connects the motor to drive the various mechanisms in the machine.

In reading or resetting operations the main drive shaft 99 makes two clockwise revolutions in order to operate the machine through the two cycles of movement necessary in total-taking operations. This is effected in the following manner: Moving the total control lever 123 (Fig. 5) away from adding position to either reading or resetting position causes a camming slot 125 therein, in cooperation with a stud 126 in a lever 127 pivoted at 128, to rock said lever 127 counterclockwise. Loose on the pivot 128 is an arm 129 carrying a stud which is normally maintained in contact with an upward extension of the lever 127 by a spring 130, thus forming a flexible connection between said arm 129 and said lever 127. Substantially one-half of a camming slot 131 is formed in the arm 129 and the other half in the lever 127, said slot being arranged to cooperate with a roller 132 carried by an arm 133 secured to the zero stop throwout shaft 116. The slot 131 in cooperation with the roller 132 rocks the shaft 116 a slight distance clockwise when the lever 127 is rocked counterclockwise by shifting the total control lever 123 away from adding position, as explained above (space A, Fig. 49). Clockwise movement of the shaft 116, by means of the arm 115 and the link 109 (Fig. 7), rocks the lever 107 clockwise to shift the pitman 106 fowardly. Forward movement of the pitman 106 shifts the link 83 a slight distance clockwise but not sufficiently to move the forward branch of the slot 118 out of engagement with the stud 119.

The pitman 106 carries two studs 134, which straddle a right-angle projection 135 of a slide 136 loose in an angular slot in the back face of a cam 137 loose in a recess in the face of the gear 104 and rotatable on the stud 105. The cam 137 has a cam groove 138 adapted to cooperate with a roller 139 carried by the pitman 106. A nose 140 of the slide 136 is arranged to engage a recess 141 in the gear 104 to lock the cam 137 to said gear in total taking operations.

When the total control lever 123 is in adding position the pitman 106 is in the position shown in Fig. 7, in which position the nose 140 of the slide 136 is disengaged from the recess 141 and the roller 139 is moved out of the camming groove 138 into engagement with a notch in the heart of the cam 137 to retain said cam stationary. Moving the total control lever away from adding position imparts clockwise movement to the shaft 116 and the lever 107 to shift the pitman 106 forwardly in the manner explained above. Forward movement of the pitman 106 in addition to moving the link 83 shifts the slide 136 forwardly to engage the nose 140 thereof with the recess 141 to lock the cam 137 to the gear 104. Forward movement of the pitman 106 likewise disengages the roller 139 from the notch in the heart of the cam 137 and moves said roller into the cam groove 138. Depressing the starting bar 68 sets the machine in motion in the manner explained above for a total-taking operation.

Near the end of the first clockwise revolution or first cycle of movement of the shaft 99, the cam groove 138 shifts the pitman 106 an additional distance forwardly to move the downwardly extending portion of the slot 118 in the link 83 opposite the stud 119. This provides clearance for said stud and permits the irregular portion of the groove 122 in cooperation with the roller 121 to rock the lever 120 idly back and forth without imparting downward releasing and restoring movement to the link 83 and the key lock shaft 80. This prevents the opening of the switch to the motor and the disengaging of the clutch mechanism and the releasing of the keys, thus causing the machine to begin another cycle.

Near the end of the second cycle of operation the groove 138 returns the pitman 106 rearwardly to reengage the forward branch of the slot 118 with the stud 119. It is therefore obvious that when the second irregular portion of the slot 122 imparts clockwise movement to the lever 120, said lever will move the link 83 downwardly to restore the key lock shaft 80 counterclockwise (space B, Fig. 49) to terminate operation of the machine and to release the depressed clerk or transaction key in a manner to be described hereinafter. Return movement counterclockwise of the lever 120 and the link 83 permits the stud 78 (Fig. 6) to come to rest against the end of the release pawl 76. The link 83 continues to travel upwardly a slight distance independently of the shaft 80 and the stud 85 to compress the spring 81 and to provide clearance for said stud 85, to permit clockwise releasing movement of the shaft 80 when the starting bar 68 is again depressed. Returning the total control lever to adding position disengages the slide 136 from the recess 141 and reengages the roller 139 with the notch in the heart of the cam 137. As previously stated, the machine may be operated manually by means of the crank 67 (Fig. 7). The crank 67 carries a stud which is journaled in a bushing 142 secured to the frame 60. Integral with the crank 67 is a pinion 143, which meshes with the gear 104, thus providing a means for rotating the main drive shaft 99 manually.

*Amount keys and amount differentials*

The machine embodying the instant invention has four rows of amount keys 144 (Figs. 1 and 3), each of said rows being mounted in a key frame 145 supported by rods 146 and 147 extending between the frames 60 and 61. In addition to the four banks of amount keys there are three overflow amount banks, making a total of seven amount banks. There is an amount differential mechanism associated with each of the amount banks. Inasmuch as the amount banks and their associated differential mechanisms are substantially alike it is believed that an explanation of one of the amount banks and its associated differential mechanism will be sufficient for the purpose of this specification.

Each one of the amount keys 144 carries a stud 148 adapted to cooperate with corresponding hooks 149 on a control plate 150, opposite ends of which are pivoted to arms 151 and 152, the upper ends of said arms being pivoted to the key frame 145. Depressing one of the amount keys 144 causes the stud in cooperation with the angular surface of the hook 149 to rock the control plate 150 downwardly. When the stud 148 moves beyond the hook 149 the control plate 150 is spring returned upwardly, causing said hook 149 to latch over the stud 148 to retain the key depressed. Near the end of machine operation an arm (not shown) on the key lock shaft 80, in cooperation with a projection of the arm 152 rocks the control plate 150 downwardly to disengage the hook 149 from the stud 148 whereupon the released amount key is returned upwardly by means of a compression spring (not shown), wound around the lower end of its stem.

The studs 148 extend through the keys 144 and cooperate with camming projections on a control plate 153, mounted on the key frame 145 in a similar manner to the control plate 150. Depressing one of the amount keys 144 causes the stud 148 to shift the control plate 153 downwardly, which movement imparts clockwise movement to an arm 154 that supports the lower end of said control plate. Clockwise movement of the arm 154 in cooperation with a stud 155 in a zero stop pawl 156 rocks said stop pawl counterclockwise to remove the upper end thereof out of the path of a nose of a differential reset spider 157. This prevents the zero stop pawl 156 from engaging the nose of the spider 157 and breaking or releasing the differential latch in zero position, and permits the spider 157 and the latch mechanism to travel upwardly until said latch is broken by the depressed amount key in a manner later to be described. The reset spider 157 is associated with a differential actuator 158 for the particular amount bank being described, and said actuator 158 is rotatably supported on a hub 159 extending between two similar plates 165, only one here shown, supported by rods 166 and 167 extending between the frames 60 and 61.

Depressing one of the amount keys 144 (Fig. 1) moves the lower end of the stem thereof into the path of a latch arm 168 pivotally connected to the actuator 158 and connected by a link 169 to an actuator latch 170 also pivoted on the actuator 158. When the actuator 158 is in home position, as here shown, a foot-shaped rearward extension of the latch 170 is spring urged into communication with a shoulder 171 of a differential operating segment 172 pivoted on the hub 159 and connected by a link 173 to an A-shaped lever 174, pivoted on a stud 175 secured in the plate 165. Downward extensions of the lever 174 carry rollers 176 and 177, which cooperate respectively with companion plate cams 178 and 179, secured to the main drive shaft 99.

It will be recalled that in adding operations the main shaft 99 makes one clockwise revolution, which by means of the cams 178 and 179 rocks the lever 174 and the driving segment 172 first clockwise and then back to normal position (space 1, Fig. 49). Due to the shoulder 171, the segment 172 carries the latch 170 and the actuator 158 clockwise in unison therewith until the latch arm 168 contacts the stem of the depressed amount key. This shifts the latch 170 counterclockwise to disengage the foot-shaped projection thereof from the shoulder 171 and to engage a nose 180 of the link 169 with one of a series of arcuate notches 181 in a curved alining plate 182, secured to extending arms of the plate 165. The driving segment 172 completes its initial movement clockwise independently of the latch 170. An arcuate surface of said segment in cooperation with the foot-shaped extension of said latch retains the nose 180 of the link 169 in the proper notch in the plate 182 to lock the actuator 158 and its associated mechanism in set position.

After the amount actuator 158 has thus been positioned commensurate with the value of the depressed amount key, the corresponding wheel of the selected totalizer or totalizers is engaged therewith under the influence of the transaction and the clerks' keys. When the lever 174 (Fig. 1) nears the terminus of its initial movement clockwise a roller 183 carried thereby engages the arcuate lower surface of a beam 184 pivoted to the actuator 158 and forces a curved recess in the upper surface of said beam into contact with a hub 185 of the actuator 158. This positions the beam 184 in accordance with the depressed amount key and said positioning is transmitted by a slot in said beam in cooperation with a stud 210 to a link 186 which in turn positions an indicator (not shown), and a plurality of type carriers for that particular amount bank. The upper end of the link 186 is connected to an indicator segment 187 rotatably supported by an indicator shaft 188 journaled in the frames 60 and 61, and the lower end of said link 186 is pivotally connected to an arm 189 connected to one of a series of nested tubes 190 rotatably mounted on a printer shaft 191 journaled in the frames 60 and 61.

Secured to the opposite end of the tube 190 (see also Fig. 10) is a segment 192 which meshes with a segment 193 turnably mounted on a rod 194 extending between the frames 61 and 65. The upper end of the segment 193 meshes with a gear 195 connected by one of a series of telescoped tubes 196 (Fig. 16) to one of the amount type wheels 197. The telescoped tubes 196 are rotatably mounted on a shaft 198, opposite ends of which are journaled in the frame 61 and a printer support plate 199, connected to the printer back frame 65 by a plurality of studs.

It is by means of the above described mechanism that the differential positioning of the amount actuator 158 (Fig. 1) and the beam 184 is transmitted to the indicators and type carrier for the particular amount bank here illustrated. The reset spider 157 (Fig. 1) is slotted to embrace a stud 200 in the latch arm 168. When no amount key is depressed the zero stop pawl 156 remains in the path of the nose of the reset spider 157 and engages said nose to break the latch 170 in zero position.

In total taking operations the main shaft 99 makes two revolutions or two cycles of movement as explained above and consequently the differential latch operating segment 172 makes two complete excursions. The first cycle of a total taking operation is utilized to aline the wheels of the selected totalizer with the differential actuators and during this cycle the zero stop pawls 156 (Fig. 1) remain effective and break all the amount latches in zero position. Near the end of the first cycle of a total taking operation the cam 137 (Fig. 7) shifts the link 106 forwardly to rock the lever 107 clockwise, which movement by means of the link 109 is transmitted to the arm 115 and the zero stop throwout shaft 116. Clockwise movement of the shaft 116 (Fig. 1) causes a rod 201, supported by similar arms 202, secured to said shaft 116 to engage forward extensions 203 of the zero stop pawls 156 and rock said pawls counterclockwise to ineffective position. Immediately thereafter the wheels of the selected totalizer are engaged with the actuators 158 and clockwise movement of said actuators reversely rotates said totalizer wheels until a long tooth thereon in cooperation with mechanism not shown, but well known in the art, stops the totalizer wheels at zero and positions the actuators 158, the indicator mechanism and the type carriers commensurate with the amount on said totalizer wheels.

In resetting operations the totalizer wheels are disengaged from the actuators 158 before said actuators are returned counterclockwise and consequently said wheels remain at zero. In reading operations the totalizer wheels remain engaged with the actuators during their return movement and are consequently returned to their original position. The manually positioned total control lever 123 (Figs. 3 and 5) controls the selecting and the engaging of the different totalizer lines with the amount actuators in total taking operations.

Totalizers and transaction keys

The machine embodying this invention has three lines of totalizers, namely a #1 or multiple item line, a #2 or clerk's line, and a #3 or transaction line (see Fig. 1). The #1 totalizer line has one set of wheels and is used in multiple item operations to accumulate the total amount of a plurality of items. The #2 line has five sets of wheels selected by means of a row of corresponding clerks' keys 204 (Figs. 3 and 8) to accumulate, for each of the clerks, the total of "Cash" and "Received-on-account" transactions. The #3 totalizer line has four sets of wheels, selected by means of a row of transaction keys (Figs. 2 and 3).

The keys of the transaction bank are divided into two groups. One of said groups consists of three multiple item keys, namely, an Item charge key 205, an Item cash key 206, and an Item add key 207. The Item add key 207 does not select a set of wheels on the #3 totalizer line but is, as its name implies, merely an adding key, and enters amounts into the single set of wheels on the No. 1 line, as will be more fully explained later. The other group of transaction keys consists of four single item keys 208, namely, Cash, Charge, Received-on-account, and Paidout. The bank of transaction keys also includes a No-sale key 209 and a Release key 215. The No-sale key has no influence over the totalizers but is merely a printing and an indicating key, and the Release key is used for manually releasing depressed transaction keys.

Depressing one of the transaction keys moves the lower end of the stem thereof into the path of a differential device 216, similar in many respects to the amount differential explained above, and upon operation of the machine, the depressed transaction key breaks the latch of the transaction differential in a position corresponding to said key. The differential 216 has a beam 217 positioned commensurate therewith, and said differential positioning is transmitted, by means of a bifurcated end of said beam in cooperation with a stud 218 in a link 219, to said link 219.

The upper end of the link 219 is pivotally connected to an indicator segment 220 loose on the indicator shaft 188, and the lower end of said link 219 is pivotally connected to an arm 221, secured to a segment 222 loose on the shaft 191 (see also Fig. 1). The segment 222 (Fig. 2) meshes with a rack 223, secured to a totalizer selecting bar 224, mounted for horizontal sliding movement on upwardly extending portions of the machine base 62. The bar 224 imparts transverse sliding movement to a corresponding slide 225, which, in cooperation with an arm 226 (Fig. 1) of the #3 totalizer line, shifts said totalizer line laterally to aline the wheels thereof, corresponding to the depressed transaction key, with the amount differentials 158. Obviously the pitman 217 and the link 219 differentially position the transaction indicator segment 220 and its associated indicator commensurate with the depressed transaction key. An indicator aliner 227 (Figs. 1 and 2) in cooperation with alining teeth in the transaction indicator segment 220 and the amount segments 187, and a similar segment 228 for the clerks' bank, retains said segments and their associated mechanisms in set positions during machine operation.

The three multiple item keys 205, 206 and 207 (Fig. 2) select the single set of wheels on the #1 totalizer line to accumulate the total amount of multiple items, and in addition the Item charge key 205 and the Item cash key 206, respectively, select the same totalizers on the #3 or transaction line as the Cash and Charge keys 208.

The printer arm 221 (Figs. 1 and 2) is connected by one of the tubes 190 to a printer positioning segment 229 (see also Fig. 10) which meshes with a segment 230 similar to the amount segment 193. The teeth in the upper edge of the segment 230 mesh with a gear 231 (Fig. 16) connected by one of the tubes 196 to a transaction type wheel 233. The train of mechanism just described positions the transaction type wheel commensurate with the value of the depressed transaction key.

*Clerks' keys and differential mechanism therefor*

As previously stated, the machine embodying this invention has a row of clerks' keys 204 (Figs. 3 and 8) located on the extreme left-hand side of the keyboard. These keys are used to select corresponding sets of totalizer wheels on the No. 2 or clerk's totalizer line either for adding or total-taking operations. An interlocking mechanism between the total control lever, the clerks' keys and the machine releasing mechanism makes it necessary to depress one of the clerks' keys before the machine can be released for adding operations. However, this interlocking mechanism is rendered ineffective in total-taking operations. In single item transactions the clerks' keys are released near the end of each operation, while in multiple item transactions the depressed clerk's key remains depressed during the item-entering operations and is released in the final compulsory multiple item clearing operation.

The clerks' keys 204 are mounted in a frame 234 supported by the rod 147 and a stud 235 extending between the left frame 61 and the printer frame 65. Depressing one of the clerks' keys 204 moves the lower end thereof into the path of a projection 236 of a differential control lever 237 loose on a stud 238 in the left frame 61. The lever 237 is connected by a link 239 to a differential latch lever 240 loose on the indicator shaft 188. An upward extension of the lever 240 carries a stud 241 loose in an upward extension of a latch 242 pivotally supported by a latch plate 243 rotatably mounted on the shaft 188. A spring 244 connected between the stud 241 and an upward extension of the latch plate 243 urges the latch 242 counterclockwise to normally maintain a projection 245 thereof in communication with a notch in the periphery of a latch operating plate 246, loose on the shaft 188. The plate 246 has integral therewith a crank 247 connected by a link 248 to a cam lever 249 fulcrumed on a stud 250 fast in the frame 61. The lever 249 carries a roller 251 which enters a cam race 252 in a box cam 253 fast on a short shaft 254 journaled between the frames 61 and 65. In adding operations the shaft 254 is driven one clockwise revolution and in total-taking operations said shaft is driven two clockwise revolutions by means of a gear 255 secured on said shaft 254 which meshes with the gear 100, which as previously explained is driven by the train of gears shown in Fig. 23.

When the shaft 254 and the cam 253 (Fig. 8) rotate, configuration of the groove 252 is such that the lever 249, the crank 247 and the latch operating plate 246 are oscillated first counterclockwise and then back to normal position for each revolution of the cam 253 (space 3, Fig. 49). In its initial movement counterclockwise the plate 246 in cooperation with the projection 245 carries the latch 242, the plate 243 and the lever 240 counterclockwise therewith. Counterclockwise movement of the lever 240 by means of the link 239 rocks the lever 237 clockwise until the projection 236 thereof contacts the lower end of the stem of the depressed clerk's key 204. This obstructs further movement of the lever 237 and mechanism connected thereto, including the plate 243 and the latch 242, and causes the notch in the plate 246 in cooperation with the projection 245 to force the latch 242 clockwise against the tension of the spring 244 to disengage said latch 242 from its drive plate 246 and to engage an alining tooth 256 thereon with one of a series of notches 257 in a curved alining plate 258 integral with the frame 61. The periphery of the plate 246 in cooperation with an arcuate surface of the projection 245 locks the tooth 256 in one of the notches 257 until return movement of said plate 246. This differentially positions the plate 243 commensurate with the value of the depressed clerk's key and this differential positioning is transmitted to the clerks' type carriers and indicating mechanism in a manner now to be described.

Pivoted at 259 to the plate 243 is a clerk's differential beam 265 (Figs. 8 and 10—A), one end of which has a slot 266 through which extends a stud 267 secured in a crank 268 fast on the indicator shaft 188. A link 269, the upper end of which is fulcrumed on the stud 267, connects the beam 265 and the crank 268 to a clerk's printer segment 270 fulcrumed on the stud 238. Teeth in the upper edge of the segment 270 mesh with similar teeth in a segment 271 (Figs. 10 and 16) connected by a tube 272 to a clerk's type wheel 273. The tube 272 is nested with the transaction and the amount tubes 196, all of which are rotatably supported by the shaft 198.

When the cam lever 249 (Fig. 8) nears the end of its initial movement counterclockwise, a roller 274 carried thereby engages the lower curved surface of the beam 265 and forces an inner arcuate surface of said beam into contact with a collar on the shaft 188. This differential positioning of the beam 265 is transmitted by means of the crank 268 and the link 269 to the indicator shaft 188 and the clerk's segment 270, respectively, and the segment 270 rotates the gear 271 (Figs. 10 and 16), the tube 272 and the clerk's type wheel 273 to position said clerk's type wheel in accordance with the depressed clerk's key. Differential positioning of the indicator shaft 188 (Fig. 1) by means of a segment secured thereon, similar to the amount segment 187, (here shown) positions the clerk's indicator mechanism in accordance with the depressed clerk's key.

The indicator shaft 188 also shifts the #2 or clerk's totalizer line laterally to aline the selected set of totalizer wheels with the amount differentials 158 and this lateral shifting is accomplished in the following manner: Integral with the clerk's indicator aliner segment 228 is a gear sector 275 fast to the shaft 188 and having teeth which mesh with a rack 276 secured to a slide 277 mounted to shift vertically on a sub-plate 262 (Figs. 1 and 4) secured to the machine back plate 64. The slide 277 carries a roller 278 which engages an angular slot in another slide 279 mounted for horizontal sliding movement on the plate 64. The slide 279 has an extending bracket 280 bifurcated to receive an extension 281 of an arm 282, which is an integral part of the #2 or clerk's totalizer assembly. The mechanism described above under influence of the clerk's differential mechanism shifts the clerk's totalizer line laterally to aline the set of clerk's totalizer wheels corresponding to the depressed clerk's key with the amount differential 158.

When no clerk's key is depressed, for example in transaction total-taking operations, the clerk's differential mechanism is stopped in a neutral position by means of a surface 283 (Fig. 8) of the lever 237 engaging a stationary stud 284 in the frame 61. The clerk's differential mechanism includes a minimum movement mechanism which moves directly from the position in which it was set in the immediately preceding operation to its new position without returning to a neutral or zero position.

Return movement clockwise of the cam lever 249 (Fig. 8) and the latch plate 246 causes a forward projection of said latch plate to contact a stud 264 secured in the plate 243 and return said plate and connected mechanism to normal position. Upon return movement of the plate 246, when the notch therein passes beyond the projection 245 of the latch 242, the spring 244 disengages the tooth 256 from the plate 258 and reengages said projection 245 with the notch in the plate 246. In total-taking operations the cam 253 (Fig. 8) makes two clockwise revolutions, and consequently the clerk's differential mechanism makes two excursions of movement. The setting of the clerk's type wheels, the indicator mechanism, and the selection of the clerk's totalizer is effected during the first excursion of movement of said differential mechanism and the second excursion of movement is but an idle operation thereof.

There are various interlocks between the machine releasing mechanism, the total control lever, the transaction keys, the amount keys and the clerk's keys, to enforce proper operation of the machine. The interlocking mechanism pertinent to the present invention will be described later herein.

*Printer mechanism*

The machine embodying the instant invention is provided with a receipt and slip printing mechanism located on the left-hand side of the machine. The type wheels are mounted upon a single line and each type wheel has two identical sets of characters, one for printing upon an issuing stub recepit and the other for printing upon an insertable slip. The receipt and the slip each has its respective impression hammer and each hammer has its operating and controlling mechanism. The receipt supply roll is situated above the type wheels and the web thereof is threaded around various guide studs between a feed roll, an electroroll and their respective pressure rolls, thence between the perforating and severing mechanism and finally between the type wheels and the impression hammer. A suitable slip chute is provided for guiding the insertable slip between the type wheels and the slip impression hammer. The receipt web is guided above the type wheels to be printed upon by one set of the characters on the type wheels, and the slip is guided below the type wheels to be printed upon by the other set of characters on said type wheels.

A reversible inking ribbon supported in a removable frame is guided around the type wheels and serves as an inking means for both the receipt and the slip. A slip feeler device disables the slip hammer and slip feed when no slip is inserted in the machine and disables the receipt feed and receipt impression mechanism when a slip is inserted in the machine.

The receipt feeding and impression mechanisms are also under the control of a manipulative member with three positions, namely, "On", "Off", and "Automatic". When the member is in "On" position, the receipt feeding and impression mechanisms work at all times, except when a slip is inserted in the machine. When the lever is in "Off" position the receipt feeding and impression mechanisms are disabled at all times. When the lever is in "Automatic" position the control of the receipt feeding and impression mechanisms is automatic and subject to the control of the transaction and clerks' keys. The feeding and printing of a receipt is also automatically controlled by the position of the total control lever.

The machine embodying this invention issues either a single item stub receipt or a multiple item stub receipt. The electroroll is arranged to print desired data both upon the main portion and the stub of the single item and double item receipts.

The receipt feeding mechanism functions differently in single item and multiple item operations and this difference in functioning is controlled by the transaction keys and the total control lever which causes said receipt feeding means to automatically back-feed and forward-feed the receipt material varying amounts, as the operation progresses, to properly position said receipt material in relation to the electroroll, the type wheel line, the perforating mechanism, and the severing mechanism. The printing mechanism will now be described in detail.

Consecutive number, date and machine number type wheels

Directing attention to Fig. 16, the manner in which the amount type wheels 197, the transaction type wheel 233, and the clerk's type wheel 273 are positioned, has been fully explained earlier herein, and no further description thereof will be given. The present machine has a plurality of consecutive number type wheels 285 loosely mounted on a sleeve 286 secured to the type wheel shaft 198. The consecutive number type wheels 285 are straddled by the arms of a yoke 287, said arms being turnably mounted on the sleeve 286 (see also Fig. 20). A stud 288 in the yoke 287 turnably supports a consecutive number type wheel actuating pawl 289 having graduated actuating teeth—one for each of the consecutive number type wheels, and urged into communication with the teeth of ratchet wheels 290, one of which is secured to each of the consecutive number type wheels, by a spring 291 wound around the stud 288 (Fig. 16). A plurality of retaining pawls (not shown) in cooperation with the teeth of the ratchets 290 retain the consecutive number type wheels 285 in set positions.

Located on the left-hand end of the type wheel line (Figs. 11 and 16) is a plurality of date type wheels 292 loose on a bushing 293 rotatably supported by the sleeve 286. The bushing 293 is secured in a plate 294 having secured thereto a stud 295 which forms an axle for a plurality of knurled setting knobs 296 telescoped within each other and connected by tubes 297 to gears 298 which mesh with teeth cut in the periphery of the date type wheels 292 and thus provide a means of setting said date wheels to the desired date. A plurality of retaining pawls (not shown) in cooperation with the teeth of the gears 298 retain the date wheels in set positions.

The type wheel line of the present machine includes a plurality of number wheels 299 rotatable on the shaft 198 and adapted to be manually set to the desired number by means of a pencil or any suitable instrument. These type wheels are retained in set positions by means of a plurality of spring-pushed retaining pawls (not shown). The number wheels 299 may be used for printing an identifying number for any desired purpose, for example, for identifying a certain store or a certain department in a store, or for identifying a certain cash register.

Consecutive number driving and resetting mechanism

As stated previously, the machine embodying the present invention is capable of single item and multiple item transactions. A single item transaction is one in which one item is entered in a single operation of the machine, and a multiple item transaction is one in which several items are entered in as many operations of the machine, all of said items being entered under one transaction heading, such as "Item cash" or "Item charge". Each multiple item transaction includes a final clearing operation in which the multiple item or #1 totalizer is cleared or reset. The consecutive number type wheels count each single item transaction and each multiple item transaction, which it is understood may include any number of item entering operations and a final multiple item clearing operation. The consecutive number type wheels do not count the total-taking operations.

Obviously it is necessary to control the consecutive number type wheel actuating mechanism to meet these varying conditions, and this is accomplished in the following manner:

The stud 288 carried by the consecutive number type wheel actuating yoke 287 (Fig. 16) has secured to its right end an arm 300 rigidly connected by a hub 301 to an arm 302, said hub 301 being journaled on a bushing secured in the frame 65, said bushing assisting the shaft 198 in supporting the nested tubes 196 and 272 for driving the amount, transaction and clerks' type wheels. The arm 302 (Figs. 16 and 20) carries a stud 303 which extends through an opening in the printer frame 65 and pivotally supports one end of a link 304, the other end of which is connected to the upper end of a lever 305 fulcrumed on a stud 306 fast in the frame 65. The lower end of the lever 305 has an L-shaped slot 307 which cooperates with a stud 308 in the right-hand end of a link 309, the left-hand end of which is pivotally connected to the lower end of a lever 315 loose on a shaft 316 journaled in the frames 61, 65 and 66 (Fig. 38).

Also loose on the shaft 316 is a cam arm 317 operatively connected to the lever 315 by means of a stud 319 in said lever in cooperation with an extension 318 of said arm, and by means of a latch 320 pivoted to the upper end of said lever 315 in cooperation with a notch in a sector of said arm 317. The latch 320 is normally maintained in engagement with the notch in the arm 317 by means of a spring 321. The latch 320 is rocked counterclockwise out of engagement with the notch in the arm 317, to disable the feed of the consecutive number type wheels in a manner presently to be described, by means of a tappet 322 secured on a shaft 323 journaled in the frames 61, 65 and 66 (Fig. 38), in cooperation with an arcuate upper surface on a tail of said latch 320. A forward extension of the arm 317 carries a roller 324 which extends within a camming groove 325 cut in the face of a gear 326 secured to a shaft 327 journaled in the frames 61, 65 and 66. The gear 326 meshes with a similar gear 328 secured to the shaft 101. The gear 328 and the shaft 101 (Figs. 18, 19 and 27) are operatively connected to the gear 100 by means of a clutch device comprising a plate 329 secured to the gear 100 and pivotally supporting clutch dogs 330 and 331, the teeth of which are urged by a spring 332, stretched between said dogs, into communication with abrupt surfaces formed by a raised segmental portion 333 of a clutch disk 334 secured to the shaft 101.

In adding operations the gear 100 (Fig. 18) makes one counterclockwise revolution and in total-taking operations said gear makes two counterclockwise revolutions. However, it is desirable that the shaft 101 make only one counterclockwise revolution to drive the gear 326 and the shaft 327 (Fig. 20) one clockwise revolution each machine operation. During the first cycle of a total-taking operation the clutch dog 331 (Fig. 18) is disengaged from the segmental portion 333 of the disc 334 to permit the gear 100 to complete its first revolution without imparting movement to the shaft 101. The clutch dog 331 is disengaged in the following manner:

Shifting the total control lever 123 from adding to reading or resetting position imparts slight clockwise movement to the zero stop throwout shaft 116, as viewed in Fig. 5, and counterclockwise movement to said shaft as viewed in Fig. 18, causing a camming slot 335 in a cam 336, secured to said shaft 116, in cooperation with a stud 337 in an arm 338 pivoted to the frame 61, to rock said arm 338 clockwise. Clockwise movement of the arm 338 by means of a link 339, connected between the stud 337 and a stud 340 in a clutch dog control pawl 341 pivoted at 342 to the frame 61, rocks said pawl 341 clockwise to move a downwardly extending portion thereof into the path of a foot shaped projection 343 of the clutch dog 331. Initial rotation of the gear 100 causes the foot 343 to engage the pawl 341 to disengage the dog 331 from the segmental portion of the disc 343 to prevent rotation of the shaft 101 during the first cycle of a total taking operation. The shaft 101, when thus disconnected from its driving means, is held stationary by a roller 360, (Fig. 43) carried by a spring pulled arm 361 loose on a shaft 635 journaled in the frames 65 and 66, in cooperation with a notch in a disc 362 fast on the shaft 101.

Prior to the second cycle of a total-taking operation the mechanism shown in Fig. 7 and explained earlier herein imparts additional counter-clockwise movement to the zero stop throwout shaft 116 and the cam 336, as viewed in Fig. 18. The contour of the cam slot 335 is such that additional counterclockwise movement of the cam 336 shifts the arm 338 and the pawl 341 counterclockwise to move the downward extension of said pawl 341 out of the path of the foot 343. This permits the dog 331 to reengage the segment 333 and carry the shaft 101 and the gear 328 (Fig. 20) one counterclockwise revolution in unison with said gear 100 during the last cycle of a total taking operation. Inasmuch as the gear 328 drives the gear 326 it is obvious that said gear 326 receives one clockwise revolution each machine operation.

In single item operations the latch 320 remains effective as shown in Fig. 20 and the stud 308 remains in the downward branch of the slot 307 in the lever 305, as here shown. It is therefore evident that the cam groove 325 oscillates the arm 317 and the lever 315 first counterclockwise and then back to normal position, which movement is imparted, by the link 309, to the lever 305. Initial movement counterclockwise of the lever 305, by means of the link 304 and connected mechanism, rocks the yoke 287 clockwise to cause the pawl 289 to advance the consecutive number type wheels 285 one increment of movement. Return movement of the lever 305 and the yoke 287 is an idle take-up movement for the pawl 289. It is therefore evident that the consecutive number type wheels advance one step in single item operations.

It will be recalled by referring to Fig. 18 that the pawl 341 in cooperation with the dog 331 disconnects the gear 100 from the shaft 101 and consequently the gear 326 (Fig. 20) and the levers 317 and 315 that drive the consecutive number type wheels remain stationary during said first cycle of a total-taking operation. It is desirable that the consecutive number type wheel actuating mechanism remain idle during total-taking operations and to accomplish this, mechanism under the control of the zero stop throwout shaft 116 has been devised to disconnect the actuating mechanism from the lever 315 and the cam arm 317. Counterclockwise mechanical movement imparted to the zero stop throwout shaft 116 by the cycle controlling mechanism pictured in Fig. 7, causes a cam slot 344 (Fig. 20) in an arm 345 secured to said zero stop throwout shaft 116 in cooperation with a stud 346 in a lever 347 fulcrumed on a stud 348 in the frame 61, to rock said lever 347 clockwise. Clockwise movement of the lever 347 causes a curved slot 349 therein, which embraces the stud 308, to lift said stud upwardly out of the downward branch of the slot 307 and into alinement with the substantially horizontal portion of said slot 307. Clockwise rotation of the gear 326 during the second cycle of a total taking operation rocks the arm 317 and the lever 315, back and forth, causing the stud 308 to reciprocate idly in the horizontal portion of the slot 307 without imparting any movement whatever to the lever 305 and connected mechanism. It is therefore evident that, in total taking operations the consecutive number type wheels remain stationary. Return movement clockwise of the shaft 116 and the arm 345 causes the lever 347 to reengage the stud 308 with the downward branch of the slot 307, after the arm 317 and lever 315 have been returned to normal position, as here shown.

In multiple item transactions it is desirable that the consecutive number type wheels be advanced only one step for the complete multiple item transaction, which includes a series of item entering operations and a compulsory final clearing operation. During the first item entering operation of a multiple item transaction, rotation of the gear 326 (Fig. 20) causes the cam arm 317 in its initial movement counterclockwise and by means of the projection 318 thereof, in cooperation with the stud 319, to impart similar counterclockwise movement to the lever 315 to advance the consecutive number type wheels one step. Before the arm 315 and the lever 317 start their return movement clockwise, the shaft 323 is rocked clockwise, causing the tappet 322 in cooperation with the tail of the latch 320 to disengage said latch from the notch in the segmental portion of the arm 317, thus causing the lever 315 and connected mechanism to remain in moved position when the cam arm 317 is returned clockwise to normal position.

Clockwise movement to disengage the latch 320 is imparted to the shaft 323 by means of mechanism shown in Fig. 13 and which operates in the following manner: The indicator segment 220 (Fig. 2), which is differentially positioned by means of the transaction keys, as explained previously, is operatively connected, by a tube 350 rotatably supported by the indicator shaft 188, to a plate cam 351, (Fig. 13) the periphery of which is adapted to cooperate with a roller 353 in one arm of a yoke 354 turnably mounted on a shaft 355 journaled in the frames 61 and 65. The yoke 354 is operatively connected to an arm 356, secured on the shaft 355, by means of a roller 357 in a link 358, which roller extends through a slot 359 in said arm 356, and a slot 365 in a downwardly extending arm of the yoke 354. The other end of the link 358 is pivotally connected to an arm 366 fulcrumed on a stud 367 in the frame 61. An extension of said arm 366 is normally maintained in contact with an abutment 368 by a spring 369.

One end of a link 370 is pivotally connected to the arm 366 and the other end of said link is slotted to embrace a stud 371 in a crank 372 secured to the zero stop throwout shaft 116. Secured on the shaft 355 (Fig. 13) is an arm 373 with a stud 374 embraced by the bifurcated upper end of a bell crank 375 loose on a shaft 376 journaled in the frames 65 and 66 (Fig. 27). The bell crank 375 is connected by a link 377 to a crank 378 fast on the shaft 323. A spring 379 urges the yoke 354 clockwise to normally maintain the roller 353 in contact with the periphery of the cam 351.

In single item transactions and in total taking operations the single item keys 208 (Fig. 2) position the plate cam 351 (Fig. 13) so that the low portion of the periphery thereof is opposite the roller 353, and this positioning, by means of the roller 357 (see also Fig. 14), the arm 356, shaft 355, arm 373, bell crank 375, link 377 and crank 378, positions the shaft 323 and the tappet 322 as shown in Fig. 20 to maintain the latch 320 in engagement with the cam arm 317.

In multiple item transactions, depressing one of the multiple item keys 205, 206 or 207 (Fig. 2) by means of the differential mechanism here shown, positions the plate cam 351 (Fig. 13) so that the high portion of the periphery thereof is opposite the roller 353, to rock the yoke 354 counterclockwise. This movement of the yoke 354 by means of the train of mechanism pictured in Figs. 13 and 14, rocks the shaft 323 and the tappet 322 (Fig. 20) clockwise to disengage the latch 320 from the arm 317 in the manner explained earlier herein. The latch 320 remains thus disengaged until during the latter part of the first cycle of the compulsory clearing operation following the multiple item entering operations, at which time mechanical movement counterclockwise of the zero stop throwout shaft 116 (Fig. 13) is effected by the cycle controlling mechanism shown in Fig. 7 which, by means of the link 370, rocks the arm 366 counterclockwise to shift the link 358 downwardly, causing the roller 357 (see also Fig. 14) in the upper end thereof, guided by the slot 365 and due to the contour of the slot 359, to shift the arm 366 and the shaft 355 clockwise. Clockwise movement of the shaft 355, by means of the train of mechanism shown in Fig. 13, rocks the shaft 323 and the tappet 322 (Fig. 20) counterclockwise to permit the latch 320 to be returned clockwise by the spring 321 to normal position. This permits the arm 317 to reengage the latch 320 and return the lever 315 and connected mechanism, which it will be recalled was left in moved position in the first multiple item entering operation, to normal position as here shown. The zero stop throwout shaft 116 (Fig. 20) and the arm 345 rock the lever 347 to move the stud 308 into alinement with the horizontal portion of the slot 307 during the compulsory clearing operation of a multiple item transaction the same as in ordinary total taking operations. However, this is but an idle operation of said arm 347, as the lever 305 and connected consecutive number type wheel actuating mechanism are in moved or actuated position and remain thus until the latch 320 becomes effective, as explained above, to return the consecutive number type wheel actuating mechanism to normal position.

Restoration clockwise of the zero stop throwout shaft 116 (Figs. 13 and 20) in the last cycle of the multiple item clearing operation permits the link 358 to be returned upwardly by the spring 369, causing the roller 357 (see also Fig. 14) to return the arm 356 and the shaft 355 counterclockwise, which movement by means of the connections shown in Fig. 13 rocks the shaft 323 and the tappet 322 clockwise to move the latch 320 to ineffective position, in which position it remains until a subsequent single item or totaltaking operation.

The mechanism that drives the consecutive number wheels 285 for the receipt and slip printer also drives a similar set of consecutive number wheels for a detail printer located at the front of the machine. The consecutive number wheel drive is transmitted to the detail consecutive number wheels by means of a link 380 (Figs. 20 and 23—A) which connects the lever 305 to a crank 381 connected by a tube 382 to a consecutive number wheel drive yoke 383 rotatably supported by a detail type wheel shaft 384 journaled in the frames 61 and 65, and a printer front frame (not shown). The detail type wheel shaft 384 likewise rotatably supports the tube 382. Mounted between the side members of the yoke 383 is a consecutive number actuating pawl 385 (Fig. 23—B) having graduated teeth which are spring-urged into cooperation with the teeth of ratchets 386, one of which is secured to each of a series of consecutive number type wheels 387 turnably mounted on the shaft 384.

Oscillation of the lever 305 (Fig. 20) is transmitted by the link 380, crank 381 (Fig. 23—A) and tube 382, to the detail feed yoke 383, which, by means of the pawl 385, (Fig. 23—B) advances the detail consecutive number type wheels in exactly the same manner as described for the receipt and slip printer consecutive number wheels 285. Furthermore the advance of the detail consecutive number wheels 387 is controlled in exactly the same manner and by the same mechanism as the receipt printer consecutive number wheels 285.

*Consecutive number resetting mechanism*

A novel device is provided for resetting both sets of consecutive number type wheels. One stroke of a manipulative member resets one set of type wheels and the other stroke of said manipulative member resets the other set of consecutive number wheels. This resetting mechanism will now be described.

Directing attention to Figs. 16 and 17, secured on the shaft 198 is a gear 388 which meshes with the teeth of a gear sector 389 connected by a sleeve 390, turnably supported by a stud 391 secured in the frame 61, to a crank 392. The crank 392 is connected by a link 393 to a reset lever 394 (see also Fig. 23A) pivoted on a shaft 395 journaled in the frames 61 and 65 and the detail printer front frame (not shown). A segmental portion of the lever 394 has teeth which mesh with a pinion 396 secured to the detail type wheel shaft 384.

Moving the lever 394 upwardly or clockwise, by means of a convenient finger-piece 397, rotates the shaft 384 one counterclockwise revolution and the sleeve 286 (Figs. 16 and 20) and the shaft 198 one-half a counterclockwise revolution, or 180 degrees. Counterclockwise rotation of the shaft 384 (Figs. 23A and B) causes a lateral groove 398 therein to engage the teeth of reset pawls 399, one of which is carried by each of the consecutive number type wheels 387, and return said consecutive number wheels to zero. Counterclockwise movement of the sleeve 286 causes one of two diametrically opposed lateral grooves 400 therein to by-pass a series of spring-pushed reset pawls 401, one of which is carried by each of the consecutive number wheels 285.

Return movement counterclockwise of the lever 397 rotates the shaft 384 and the sleeve 286 clockwise, causing the groove in the shaft 384 to bypass the pawls 399 carried by the consecutive number wheels 387, and causing one of the grooves 400 in the sleeve 286 to engage the pawls 401 (Fig. 20) to reset the consecutive number type wheels 285 to zero. One-half a revolution of the sleeve 286 is sufficient to reset the wheels 285, as it will be recalled that each of these wheels has two complete sets of characters thereon. By utilizing both strokes of the lever 394 to reset the two sets of consecutive number type wheels, less strain is placed on the resetting mechanism and less effort is required to reset said consecutive number wheels.

*Interlocking mechanism for consecutive number resetting mechanism*

An interlock is provided between the consecutive number resetting mechanism and the machine releasing mechanism to prevent release of the machine for operation while the consecutive number is being reset or turned to zero. Clockwise movement of the consecutive number resetting lever 394 (Fig. 17) moves the resetting segment 389 clockwise, which in turn rotates the gear 388 counterclockwise. Counterclockwise rotation of the gear 388 rotates a similar gear 429 and its integral locking disc 430 clockwise. The gear 429 and the disc 430 are pivoted on a stationary stud 431 in the frame 61. Clockwise movement of the disc 430 causes a notch therein in cooperation with a stud 432 to rock a latch 433, journaled on the No. 1 reset shaft 77, counterclockwise to engage the hook-shaped upper end thereof with a locking finger 434 secured to the key lock shaft 80.

It will be recalled by referring to Figs. 6 and 7 that depressing the starting bar 68 releases the key lock shaft 80 to the action of the spring 81, which urges said shaft clockwise as here viewed and counterclockwise as viewed in Fig. 17, to close the motor switch and set the machine in motion. However, the latch 433 prevents this counterclockwise releasing movement of the shaft 80 until the consecutive number reset lever 394 has completed a full resetting stroke and has returned to normal position as here shown. When the lever 394 and connected mechanism approach the end of their return movement to normal position, a projecting wall 435 of the notch in the disc 430 engages the stud 432 to rock the latch 433 out of the path of the finger 434 and to reengage said stud 432 with the notch in the disc 430. It is evident that the periphery of the disc 430 in cooperation with the stud 432 retains the latch 433 in locking position until the reset lever 394 is fully returned to normal or starting position.

*Full stroke device for the consecutive number*

A full-stroke device prevents backing up the consecutive number reset lever 394 during either its initial movement clockwise or its return movement counter clockwise. This full stroke mechanism consists of a full-stroke disc 436 secured on the shaft 384 (Figs. 17 and 23A) having in the periphery thereof a plurality of equally spaced identical V-shaped notches adapted to cooperate with the teeth of a full-stroke pawl 437 fulcrumed on a fixed stud. The pawl 437 is so held by a spring 438 that it will yield in either direction upon rotation of the disc 436. When the lever 394 and the disc 436 are in home position, as here shown, a clearance recess 439 in said disc 436, which permits the pawl 437 to reverse its direction, is opposite the tooth of said pawl 437.

Initial movement clockwise of the lever 394 rotates the shaft 384 and the disc 436 one revolution counterclockwise to reset the detail printer consecutive number wheel 387 (Fig. 23A). The pawl 437 in cooperation with the V-shaped notches in the disc 436 prevents backing up the lever 394 until the shaft 384 has been rotated one revolution. Revolution of the shaft 384 and the disc 436 again places the recess 439 opposite the tooth of the pawl 437 and permits the spring 438 to return said pawl to neutral position, which in turn permits said pawl to reverse its direction when the lever 394 is returned counterclockwise and the shaft 384 and disc 436 are rotated thereby in a clockwise direction. As before, the tooth of the pawl 437 in cooperation with the V-shaped notches in the periphery of the disc 436 prevents backing up the lever 394 until it is fully returned to home position.

*Multiple item counter*

In multiple item transactions the items or the item entering operations are counted and visibly indicated by means of a roller type indicator 402 (Fig. 13) rotatably supported by a stud 403 in the frame 61. The bent-over rim of the indicator 402 is sequentially numbered, and these numbers are visible through an opening 404 in a keyboard cover plate 405. The indicator 402 is urged to and retained in normal or zero position by means of a torsion spring 406, the body of which is coiled around the stud 403, and has symmetrical extensions which in cooperation with a stud 407 in the indicator 402 and a stationary stud 408 in the frame 61, yieldingly urge the indicator 402 from either direction to its zero position, in which it is here shown. The indicator 402 is retained in moved position by means of a retaining pawl 409 turnably mounted on a stud 415 in the frame 61 and having two identical teeth 416 which are urged by a torsion spring 417 into communication with similar teeth 418 of a ratchet 419 integral with the indicator 402. The multiple item indicator 402 is fed by means of a pawl 420 pivotally mounted on an arm 421 rotatably supported by the reset shaft 77 for the #1 or multiple item totalizer. A spring 423 urges a tooth of the feed pawl 420 into communication with the teeth of the ratchet 419. An extension 424 of the arm 421 cooperates with a shaft 425 which forms a part of the #1 or multiple item totalizer assembly and reciprocates down and up, in the direction indicated by the oblique dot and dash line, each time the multiple item totalizer is engaged with the actuators 158.

A spring 426 urges the arm 421 clockwise to normally maintain the extension 424 in contact with the shaft 425. As the shaft 425 reciprocates down and up, during multiple item entering operations, the arm 421 is rocked thereby first counterclockwise and then back to normal position, which causes the pawl 420 in cooperation with the ratchet 419 to advance the multiple item indicator 402 one step for each multiple item entering operation. In the enforced resetting operation of the multiple item totalizer, at the end of a multiple item transaction, the retaining pawl 409 is disengaged from the ratchet 419 by means of a camming lug 427 on the link 358 in cooperation with the rounded nose of an extension 428 of said retaining pawl 409 when said link 358 is shifted downwardly, as explained earlier herein, by counterclockwise mechanical movement of the zero stop throwout shaft 116 during the clearing operation of a multiple item transaction. This counterclockwise disengaging movement of the retaining pawl 409 moves the rounded upper end thereof into contact with the lower edge of the feed pawl 420. Consequently when the arm 421 is rocked counterclockwise by the shaft 425 the inclined lower edge of the feed pawl 420 engages the rounded upper end of the retaining pawl 409 and is rocked upwardly thereby out of engagement with the teeth of the ratchet 419 before said feed pawl 420 reaches the end of its feeding stroke. This permits the spring 406 to return the multiple item indicator 402 to normal or zero position.

In the present machine it is not intended that the No. 1 or multiple item totalizer be read. However, this is possible, and if for any reason the multiple item totalizer is read, the multiple item indicator will be released and returned to zero in exactly the same manner as explained for a multiple item clearing operation. It is obvious that as the No. 1 or multiple item totalizer is engaged with the actuators only in multiple item operations, the multiple item indicator 402 will function only in such operations.

Receipt feeding mechanism

Directing attention to Fig. 11, a receipt supply roll 440 is rotatably supported on a stud 441 in the frame 65. From the supply roll the web 460 of the receipt is threaded between guide plates 442 and 443, thence between a receipt feed roller 444 and its pressure roller 445 and then between an electroroll 446 and its pressure roller 447. The feed roller 444 and the electroroller 446 are rotatably mounted upon rods 448 and 449, respectively, secured in the frame 65. The pressure rollers 445 and 447 (Fig. 11) are turnably mounted respectively on eccentric bushings 450 and 451 journaled between a front plate 452 (Fig. 22) and back plates of the pressure roll frame assembly. The eccentric bushings 450 and 451 are geared together in such a manner that when the roll 445 is in contact with the feed roll 444 the roll 447 is out of contact with the electro 446 and vice versa. The manner in which the pressure rolls are controlled will be explained later herein.

The pressure roll assembly shown in Figs. 11 and 22 is removably attached to the machine by means of studs 453 and 454, fast in the plate 65, which pass through holes in the center of the eccentric bushings 450 and 451, and by means of the rods 448 and 449, the left-hand ends of which pass through holes in bushings 455 and 456, in the plate 452. Annular grooves in the ends of the rods 448 and 449, in cooperation with notches in a locking plate (not shown) mounted on the plate 452, lock the pressure roll assembly in place on the machine. The guide plates 442 and 443 (Figs. 11 and 22) are supported by studs 457 and 458 fast in a plate 461 secured to the frame 65 by various studs, and said studs 457 and 458 engage corresponding holes in the plate 452 to assist in supporting the pressure roll assembly. The electroroll 446 is inked by means of an inking roll 459 rotatably mounted in a swinging frame 465 supported on a rod 466, extending between the front plate 452 and one of the back plates of the pressure roll assembly. The inking roll 459 is yieldingly urged into contact with the electroroll 446 by torsion springs (not shown) wound around the rod 466 and tensioned to urge the frame 465 counterclockwise.

From the electroroll 446 (Fig. 11) and its pressure roll 447, the web 460 of the receipt material is guided through a chute 467 supported between plates 468 and 469 (Figs. 24, 25 and 26), connected in fixed relation by means of various studs and shafts, removably mounted on rods 470 and 471 fast in the frame 65, and secured in place by means of screws threaded in the ends of said rods 470 and 471. The chute 467 guides the receipt web between a movable blade 472 and a stationary blade 473 of a perforating device, thence between a movable blade 474 and a stationary blade 475 of a receipt knife mechanism. The perforating mechanism operates at the proper time to perforate the line of division between the stub and the body of the receipt, and near the end of machine operation the knife mechanism functions to separate the finished receipt from the receipt web.

From the knife mechanism the receipt is guided by a chute 476, detachably mounted on the frame 65, to a receipt impression hammer 464 and then between a pair of ejector rollers 478 and their associated pressure rollers 477 (Fig. 11). The pressure rollers 477 are yieldingly urged into engagement with the peripheries of the ejector rollers 478. However, cut-away portions of the peripheries of said rollers 478 are located opposite the rollers 477 when the receipt ejecting mechanism is at rest, thus permitting the receipt to be advanced between said rollers 477 and 478. After the receipt has been printed and severed from the web 460, the rollers 478 are driven one counterclockwise revolution to eject the completed receipt. The receipt ejector mechanism is old in the art, and further description thereof is deemed unnecessary. The manner in which the receipt perforating, knife mechanism and the receipt hammer function will be explained later herein.

Driving and controlling mechanism for the receipt feed roll

The receipt feeding mechanism is arranged to feed the receipt web back and forth varying distances to meet the requirements of single and multiple item transactions and to compensate for an over-feed forwardly by the electroroll.

The receipt feed roll is driven back and forth by an oscillating member connected thereto by a coupling pinion. The oscillating member is connected to its operating means by a latch, which is controlled by graduated abutments or steps on a plurality of automatically positioned arms. Said abutments are arranged to disconnect the oscillating member from its operating means in predetermined stages of movement of said member to regulate the feeding of the receipt. Initial movement of the oscillating member back-feeds the receipt and after back feeding is completed said member is uncoupled from the feed roll and in some cases receives additional initial movement or idle pick-up independently of said feed roll. After the independent movement is completed the oscillating member is again coupled to the feed roll and return movement of said member causes the receipt web to be fed a greater distance forwardly than it was fed backwardly to properly space the printing thereon. The receipt feeding mechanism will now be described in detail.

Directing attention particularly to Figs. 28, 30 and 31, integral with the feed roller 444 is a gear 479, which meshes with a gear 480 loose on a stud 481 in the frame 65. Rotatably supported by the stud 481 and mounted adjacent the gear 480 is an identical gear 482 having integral therewith a pinion 483 which meshes with the teeth of a segment 484 fulcrumed on a stud 485 in the frame 65. The segment 484 carries a latch 486, a hook-shaped portion of which is spring-urged into communication with a right-angled projection 487 of a segment operating arm 488 journaled on the stud 485. When the latch 486 is effective it confines the arm 488 between a stud 489 in the segment 484 and between the hook-shaped portion of said latch, thus holding said arm 488 in fixed relation to said segment 484. The segment 484 is yieldingly urged clock-wise by means of a stud 490 therein in cooperation with a downward extension of a bell crank 491 loose on a shaft 492 journaled in the frames 61 and 65 (Fig. 38). A spring 493 tensioned between the forward extension of the bell crank 491 and a stationary stud urges said bell crank 491 counterclockwise, which in turn urges the segment 484 clockwise.

Normally during machine operation the arm 488 is moved first clockwise from the position shown in Fig. 30 to the position shown in Fig. 28, and then back to normal position (space 12, Fig. 49). The connections for oscillating the arm 488 comprise a link 494, which pivotally connects the lower end of said arm 488 to the upper end of an arm 495 loose on a sleeve 496 loose on a rod 498 extending between the frames 65 and 66. Secured to the sleeve 496, adjacent the arm 495 and adjustably connected thereto is an arm 497. Secured to the other end of the sleeve 496 is a V-shaped lever 510 carrying two rollers 499, which cooperate respectively with the peripheries of companion plate cams 500, secured on a shaft 501 journaled in the printer frame 65 and 66 (Figs. 19 and 27).

The shaft 501 (Figs. 23, 27 and 43) is driven by the shaft 101 in the following manner: Secured on the shaft 501 is a gear 502 which meshes with a similar gear 503 integral with a Geneva gear 504 and a clutch disc 505. The teeth of clutch dogs 506 and 507, pivotally mounted on a clutch plate 508 secured to the shaft 101, are urged by a spring 509, into cooperation with a segmental portion of the clutch disc 505. It will be recalled by referring to Fig. 23 that the shaft 101 is driven by the gears 88, 90, 93, 95, 97 and 100. In adding and total-taking operations the shaft 101 makes one counterclockwise revolution. Ordinarily, in total taking operations, said shaft would make two revolutions, however, the mechanism pictured in Fig. 18 disconnects the clutch mechanism driven by the gear 100 and said gear moves idly during the first cycle of said total-taking operations. In the last cycle of total-taking operations the clutch mechanism is rendered effective and causes the gear 100 to drive the shaft 101 one counterclockwise revolution, as previously explained.

Normally the shaft 101 (Fig. 27) by means of the gear 503 in cooperation with the gear 502, drives the shaft 501 in unison therewith one clockwise revolution each machine operation. However, the drive of the shaft 501 is subject to the control of receipt control lever 515 (Fig. 39) which governs the clutch mechanism shown in Fig. 43 in a manner to be described later. Clockwise rotation of the shaft 501 causes the cams 500, in cooperation with the mechanism pictured in Figs. 28 and 30, to rock the arm 488 and the segment 484 first clockwise to the position shown in Figs. 28, and then counterclockwise, in two steps of movement, back to normal position, as shown in Fig. 30. See also space 12, Fig. 49.

The segment 484 drives the pinion 483 and the gear 482 and the movement of the gear 482 is transmitted to the gear 480 by a coupling pinion 516, which simultaneously meshes with both of said gears. The coupling pinion 516 is mounted on a stud in one arm of a lever 517 pivoted on a stud 518 (Fig. 38) extending between the frame 65 and the plate 461. Another extension of the arm 517 has therein a cam slot 519 through which extends a stud 520 in the upper end of an arm 521 secured on the shaft 492. Also secured on the shaft 492 is an arm 522, (Fig. 29) carrying a roller 523, which cooperates with a camming groove 524 in a cam 525 secured on the shaft 501.

When the coupling pinion 516 is disengaged from the gears 480 and 482, said gears, the gear 479 and the receipt feed roll 444 are retained stationary by means of an aligning pawl 526 in cooperation with the teeth of said gear 479. The alining pawl 526 is pivoted on the shaft 355 and has a cam slot 527 through which extends a stud 528 in the arm 521 (Figs. 28 and 29). When the coupling pinion 516 is disengaged from the gears 480 and 482 its teeth are maintained in alinement with the teeth of said gears by means of an alining pawl 529 pivoted on the stud 518.

After the segment 484 has completed its initial movement clockwise, the cam 525 (Fig. 29 and space 6, Fig. 49) rocks the arms 522 and 521 counterclockwise to cause the stud 520 in cooperation with the slot 519 (Figs. 28 and 30) to rock the arm 517 clockwise to disengage the coupling pinion 516 from the gears 480 and 482. However, prior to the disengaging of the coupling pinion 516, the stud 528 in the arm 521, in cooperation with the slot 527 rocks the pawl 526 clockwise to engage the tooth thereof with the teeth of the gear 479. When the pawl 526 is out of engagement with the gear 479 a shoulder 530 thereon in cooperation with a stud 531 in the clutch pinion alining pawl 529 retains said pawl clockwise, against the action of a spring 532, out of engagement with the pinion 516. When the pawl 526 moves into mesh with the gear 479, as explained above, the shoulder thereon in cooperation with the stud 531 permits the pinion alining pawl 529 to be spring-urged into engagement with the teeth of said pinion 516 to maintain said pinion in alinement with the gears 480 and 482.

The amount of feeding movement that is imparted to the receipt feeding roll 444 (Figs. 28, 30, 31 and 32) by the segment 484 is determined by the latch 486. In singe item transactions the latch 486 is controlled by means of a stud 533 therein, in cooperation with a shoulder 534 of an arm 535 and a shoulder 536 of an arm 537, both of said arms being loosely mounted on a stud 538 fast in the plate 461 (Fig. 28). Normally a stud 539 in the arm 535 in cooperation with a shoulder on the top surface of a latch control arm 540 pivoted on the stud 538 positions said arm 535 so that the shoulder 534 is in the path of the stud 533. A spring 541 urges the arm 535 clockwise to normally maintain the stud 539 in engagement with the arm 540. The arm 540 is urged clockwise by means of a stud 542 (Figs. 28 and 35) therein, in cooperation with the hook-shaped end of an arm 560 pivoted on the stud 538 and urged in a clockwise direction by a spring 561.

When the machine is at rest, the arm 540 is latched in normal position, as shown in Fig. 32, by means of a notch in a latch arm 543 rotatable on a stud 544 extending between the frame 65 and the plate 461, in cooperation with a square portion of the stud 542. A spring 545 flexibly connects the arm 543 to an arm 546 loose on the stud 544 and slotted to embrace a stud 547 in the lower end of a crank 548 secured on the shaft 492.

Single item transactions

Directing attention to Figs. 28 to 35 inclusive, at the beginning of single-item transactions the pinion 516 couples the gears 480 and 482 and the pressure roller 445 presses the web 460 of the receipt material against the feed roller 444. Initial movement of the shaft 501 and the companion cams 500, through the connections shown in Fig. 30, rock the segment drive arm 488 first clockwise, and due to the latch 486 (Fig. 31) the segment 484 moves in unison therewith until the stud 533 engages the surface 534 of the arm 535, as indicated by dot and dash lines in Fig. 34. This disengages the latch 486 from the projection 487 and permits the arm 488 to continue its clockwise movement independent of said segment 484. Movement of the segment 484 prior to the time the latch 486 is disengaged rotates the gears 482 and 480, which in turn rotate the feed roller 444 clockwise to back-feed the web 460 of the receipt material approximately 1¼". After the arm 488 reaches the terminus of its initial movement clockwise, the cam 525 (Fig. 29) through the arm 522, rocks the shaft 492 and the arm 521 counterclockwise causing the stud 520 in cooperation with the slot 519 to disengage the coupling pinion 516 from the gears 480 and 482 and causes the stud 528 to engage the aliner 526 with the gear 479, which in turn permits the pawl 529 to engage the teeth of the pinion 516.

Initial movement counterclockwise of the shaft 492 (Figs. 32 and 34) and the crank 548, by means of the stud 547, rocks the arm 546 clockwise to cause a stud 549 in the upper end thereof to engage a hook-shaped extension 550 of the arm 535 and rock said arm counterclockwise to disengage the shoulder 534 from the stud 533 of the latch 486. This frees the segment 484 to the action of the spring 493 (Fig. 31) which moves said segment 484, the pinion 483 and the gear 482 independently of the feed roller 444, for what will be termed an "idle pickup" until the stud 533 contacts the surface 536 (Figs. 32 and 33) of the latch arm 537. Disengaging movement counterclockwise of the latch 486 (Fig. 31) is terminated by means of an extension 551 thereof contacting the stud 489, thus causing the segment 484 to be accurately positioned when the stud 533 engages one of the locating shoulders of the latch arms.

In single-item transactions the arm 537 (Fig. 33) is positioned, so that the surface 536 is in the path of the stud 533 of the latch 486, by means of a bifurcated upward extension of said latch arm 537 which straddles a stud 562 in a downward extension of the yoke 354 which, it will be recalled by referring to Fig. 13, remains in its clockwise position, as here shown, in single item transactions. However, in multiple item transactions, the high portion of the cam 351 rocks said yoke 354 counterclockwise which in turn rocks the arm 537 clockwise to move the shoulder 536 thereof out of the path of the latch stud 533. It is therefore obvious that the arm 537 is effective only in single item transactions.

Counterclockwise initial movement of the shaft 492 and the crank 548 (Figs. 32 and 35) causes the stud 547 to engage a shoulder 552 of the latch 543 to rock said latch clockwise to disengage the notch therein from the square portion of the stud 542. This, it would seem, releases the arms 540 and 535 to the action of the spring member 560, and the spring 541, respectively. However, this spring action is counteracted by an upward extension 553 of the arm 540 in cooperation with the rounded nose of a flexible pawl 554 fulcrumed on a stud 555 in a downward extension of an arm 556, secured on the shaft 355. A spring 557 flexibly connects the pawl 554 to a companion pawl 558, an abrupt surface of which is normally maintained in contact with a stud 559 in the yoke 354. The spring 557 is sufficiently strong to counteract the action of the member 560 and the spring 541 and maintain the square portion of the stud 542 in alinement with the notch in the latch 543, so that return movement of the crank 548 permits the notch in the latch 543 to reengage the stud 542. In single item transactions the flexible pawls 554 and 558 position the arm 540 so that a slight clearance is maintained between the latch stud 533 and an arcuate surface 565 of said arm 540. This is for a purpose later to be described in connection with multiple item transactions.

After the arm 488 (Fig. 28) reaches the terminus of its initial movement clockwise the cam 525 (Figs. 29 and 30) returns the arm 522, the shaft 492 and the arm 521 clockwise to reengage the pinion 516 with the gears 480 and 482 and to disengage the aliner 526 from the gear 479. Return movement of the shaft 492 and the crank 548 (Figs. 32, 34 and 35) returns the arm 546 to normal position. However, return movement of the arm 535 is obstructed by the latch stud 533 in cooperation with the surface 564 and said arm yieldingly engages said stud until the segment 484 is returned counterclockwise. Return movement of the crank 548 also permits the latch 543 under influence of the spring 545 to reengage the square portion of the stud 542 to latch the arm 540 in normal position, as here shown. By consulting space 12 of the time chart Fig. 49 it will be seen that the contour of the companion cams 500 (Fig. 28) permits the segment operating arm 488 to dwell in its extreme clockwise position for a period of time, and during this time the pressure roll 445 is moved out of contact with the feed roller 444 and the pressure roller 447 (Fig. 11) is moved into contact with the electroroll 446. This shifting of the pressure from one pressure roller to the other is accomplished by means of the mechanism pictured in Figs. 21 and 22.

Pressure roll shifting mechanism

Referring to Figs. 11 and 22, the eccentrics 450 and 451, which rotatably support the pressure rollers 445 and 447 respectively, have adjustably connected thereto partial gears 566 and 567, which mesh respectively with gear sectors 568 and 569 fulcrumed on a stud 570 in the plate 452. The sectors 568 and 569 carry respectively rollers 571 and 572 which are embraced by camming slots 573 and 574 in a plate 575 turnable on the hub 455, which forms a bearing for the outer end of the shaft 448. Integral with the plate 575 is a gear sector 576 which meshes with a similar sector 577 secured to the outer end of a shaft 578 journaled in the plate 452 and an associated plate (not shown). Secured on the shaft 578 is a crank 579 bifurcated to straddle a stud 580 (see also Fig. 21) carried by a bell crank 581 rotatable on a hub that forms a bearing for the inner end of the shaft 578. The bell crank 581 is operatively connected to a drive plate 582 by means of a stud 583 which extends through a substantially vertical slot in said crank 581 and engages a U-shaped notch in a segmental portion of said plate 582. The stud 583 extends through a curved slot 584 in the end of a lever 585 secured on the shaft 355 and said stud 583 is secured in one end of a link 586 shiftably connected to the lever 585 by means of a stud 587 in the other end of said link which extends through a slot in the lever 585. The drive plate 582 carries a stud 588 straddled by the forked upper end of a cam lever 589 pivoted on a stud 590 fast in the printer frame 65. The lever 589 carries a roller 591 which cooperates with a camming groove 592 in the face of a box cam 593 secured on the shaft 254, which also carries the gear 255 which meshes with and is driven by the gear 100 (Fig. 23) one clockwise revolution each machine operation.

Clockwise rotation of the cam 593 (Figs. 21 and 22) through the lever 589 rocks the plate 582 first counterclockwise and then back to normal position. In single item transactions the stud 583 always connects the drive plate 582 to the crank 581. Consequently said crank moves in unison with said plate first counterclockwise and then back to normal position, which movement, by means of the stud 581, is transmitted to the crank 579 and the shaft 578. Initial movement counterclockwise of the shaft 578 carries the sector 577 in unison therewith to rotate the sector 576 and the plate 575 clockwise to cause the cam slots 573 and 574 to rock the segments 568 and 569 clockwise and counterclockwise respectively. This movement of the sectors 568 and 569, by means of the partial gears 566 and 567, rotates the eccentrics 450 and 451 counterclockwise and clockwise respectively to move the pressure roller 445 (Fig. 11) out of contact with the feed roller 444 and to simultaneously move the pressure roller 447 into contact with the electroroll 446. In single item transactions the stud 583 (Fig. 21) aways remains effective, as here shown, to couple the bell crank 581 to the drive plate 582. However, in multiple item transactions clockwise movement of the shaft 355 and arm 585 at the beginning thereof shifts the stud 583 upwardly out of engagement with the U-shaped slot in the plate 582 thus disconnecting the crank 581 from its drive arm 582. This causes the feed roller 477 to remain out of engagement with the electroroll 446 until in the final clearing operation of said multiple item transaction, at which time the arm 585 is returned clockwise to reengage the stud 583 with the notch in the driving plate 582. This will be more fully explained in connection with the description of the receipt feeding mechanism in multiple item transactions. It is obvious from the foregoing description that when one of the pressure rollers is effective the other pressure roller is ineffective.

*Drive for the electroroll*

Referring to Fig. 11, secured to the electroroll 446 is a gear 594, meshing with a gear 595 pivoted on a stud 596 extending between the printer back frame 65 and the plate 461 (Fig. 38). Integral with the gear 595 is a Geneva gear 597, which cooperates with a Geneva gear 598 assembled in a cluster with a pair of knife operating cams 599 (Fig. 27), a check ejector Geneva gear 600, an alining plate 601, a clutch disc 602, and a hammer cam 603, all of which are fast on a sleeve 604 rotatably supported by the shaft 501. A segmental portion 605 of the clutch disc 602 (Figs. 13 and 27) is arranged to be clutched between the teeth of clutch dogs 606 and 607 fulcrumed on a clutch plate 608 and urged toward each other by a spring 609. The plate 608 is turnable on the sleeve 604 and has fixed thereto a Geneva gear 610 (Fig. 27) which cooperates with the Geneva gear 504, which as previously explained is integral with the gear 503 and is driven by the clutch plate 508.

In single item transactions the clutch dogs 606 and 607 remain effective to drive the disc 602 and connected mechanism. However, in multiple item transactions the dog 606 is disengaged from the segmental portion of the disc 602 for a purpose and in a manner later to be described. Rotation of the Geneva gear 504 (Fig. 27) drives the Geneva gear 610 and the clutch plate 608, which by means of the clutch dogs 606 and 607 (Fig. 13) in cooperation with the segmental portion 605 of the disc 602 carries the sleeve 604 and the cluster of gears and cams mounted thereon in unison with said clutch plate 608 one revolution each machine operation. Revolution of the electro Geneva gear 598 (Fig. 11) in cooperation with the Geneva gear 597, the gear 595, and the gear 594, imparts one clockwise revolution to the electroroll 446 to print desired data on the main and stub portions of a single item receipt 614 (Figs. 4A and 12) and to forward feed the receipt web 460 three inches (space 9, Fig. 49). Substracting the 1¼" back-feed of the receipt web, effected by the mechanisms shown in Figs. 30 and 32, from the 3" forward feed by the electroroll, we have a mean forward feed of 1¾", which puts the receipt web in position to receive the first impression, the center of which it will be seen by referring to Fig. 4—A is ½" from the upper margin of the receipt web. Immediately thereafter the impression mechanism (Fig. 14 and space 8 Fig. 49) functions to make the first imprint upon the body of the receipt. After the impression mechanism functions, the perforating mechanism (Fig. 25) functions to perforate the separating line between the body and the stub of the receipt 614 (space 10 Fig. 49).

Immediately after the first imprint is made upon the receipt the arm 488 (Figs. 31 and 32) starts its return movement counterclockwise and picks up the segment 484 from the position in which it was located by means of the latch stud 533 in cooperation with the shoulder 536 of the latch arm 537 and returns said segment counterclockwise to normal position. Prior to the return movement counterclockwise of the segment 484, the cam 593 (Fig. 21) in cooperation with the lever 589 returns the plate 582 and the bell crank 581 clockwise to rotate the shaft 578 also clockwise back to normal position, which by means of the mechanism pictured in Figs. 11 and 22 disengages the pressure roller 447 from the electrorolls 446 and reengages the pressure roller 445 with the feed roller 444.

Return movement counterclockwise of the segment 484 (Figs. 28 and 31) in cooperation with the gears 480 and 482 which are clutched together by the pinion 516, rotates the feed roller 444 (see also Fig. 11) counterclockwise to feed the receipt web 460 forwardly a distance of 1½" in preparation for the second impression (Fig. 4-A) which is a duplicate of the first impression and is made upon the stub portion of the receipt. The hammer 464 (Fig. 11) then makes its second impression stroke and simultaneously therewith the knife mechanism functions to sever the finished receipt 614 from the receipt web 460. The feeding of the receipt material, as explained above, advances the forward end thereof through the chute 476 and between the ejector rollers 478 (Fig. 11) and their cooperating pressure rollers 477. A cut-away portion of the ejector rollers 478 which are opposite the pressure rollers 477 when said ejector rollers are at rest permits the receipt material to be fed between said ejector and pressure rollers.

After the finished receipt has been severed, the ejector Geneva gear 600 (Fig. 27) in cooperation with a Geneva gear 615 integral with a gear 616 journaled on the shaft 101 drives said gears 615 and 616 counterclockwise as viewed in Fig. 11. Counterclockwise movement of the gear 616 drives a gear 617 which meshes therewith and its attached companion gear 618, rotatable on a stud in the frame 65, in a clockwise direction. Clockwise movement of the gear 618 by means of a connecting chain of gears 620, 621, 622, 623, and a gear 624, fixed to the ejector rollers 478 rotates said ejector rollers in a counterclockwise direction to eject the completed receipt towards the front of the chute 476 space 11, Fig. 49. A spring member 625 prevents the receipt from being thrown out of said guide chute 476.

Receipt impression hammer

The impression hammer 464 (Figs. 11 and 14) supports a platen 627 which in cooperation with a reversible inking ribbon 628 supported in a removable frame 629 is adapted to make imprints upon the receipt material. The platen 627 is divided into two parts, one of which is movable relatively to the other to omit the printing of certain data in multiple item transactions. However, in single item transactions the complete data is printed both upon the body and the stub of the receipt, as shown in Figs. 4A and 12. The shiftable portion of the platen 627 is mounted in a holder 630 slidably contained in a slot in the body of the hammer 464. The stationary portion of said platen 627 is mounted in a holder similar to the holder 630, which is secured by set screws in the horizontal slot in the hammer 464. Two upright extensions of the hammer 464 support a rod 631 which pivotally connects the body of the hammer 464 to a pair of arms of a hammer operating bracket 632 turnable on the rod 471, which it will be recalled assists in supporting the knife assembly (Fig. 26).

The bracket 632 (Figs. 11, 14, 15 and 27) is connected by a link 633 to a crank 634 secured on a shaft 635 journaled in the frames 65 and 66. Also secured on the shaft 635 is an arm 636 carrying a roller 637 adapted to cooperate with the periphery of the hammer operating cam 603, which it will be recalled is a part of the integral group of cams and Geneva gears driven by the clutch mechanism (see also Fig. 13) including the disc 602, clutch plate 608 and the clutch dogs 606 and 607. The cam 603 has two nodes, which, in cooperation with the roller 637, impart two impression strokes to the hammer 464 each single item transaction to record the date, consecutive number, machine number, amount, transaction symbol, and clerk's symbol upon the main portion and the stub of the receipt 614 (Fig. 12 and space 8, Fig. 49).

Perforating and knife mechanism

In single item transactions immediately after the amount and other data are imprinted upon the main portion of the receipt, the perforating mechanism shown principally in Figs. 24, 25 and 26, functions to perforate a dividing line between the stub and the body of the receipt so that these two portions may be easily separated. Immediately thereafter the receipt material is fed forwardly, by the mechanism and in the manner described above and the impression mechanism again functions to imprint the identical data upon the stub that was imprinted upon the body of the receipt, after which the knife mechanism functions to separate the finished receipt from the web of the receipt material. A common driving mechanism operates both the perforating and the knife mechanisms.

The perforating blade 472 (Figs. 24, 25 and 26) is secured by means of screws to the front of a supporting bracket 638 secured on a shaft 639 journaled in the plates 468 and 469. Also secured on the shaft 639 are similar arms 640 and 641 adapted to cooperate respectively with camming nodes on two similar knife operating arms 642 and 643 secured on a shaft 644 journaled in the plates 468 and 469. Also secured on the shaft 644 is a crank 645 carrying a roller 646 straddled by a U slot in the upper end of a lever 647 rotatable on the shaft 635. Y-shaped arms of the lever 647 carry respectively rolls 648 and 649, which cooperate with the peripheries of the knife operating cams 599 (see also Fig. 27) which form a part of the cluster of cams and Geneva gears mounted on the sleeve 604.

During a single item transaction the cams 599 (space 10, Fig. 49) make one clockwise revolution, to rock the lever 647 first clockwise and back to normal posittion, as shown in Fig. 26, and then counterclockwise and back to normal position. Initial movement clockwise of the lever 647 rotates the shaft 644 counterclockwise, causing camming nodes 650 on the arms 642 and 643 in cooperation with the bottom of identical recesses cut in the bracket 638, to receive the arms 640, 641, 642 and 643, to rock said bracket and the upper perforating blade 472 clockwise. Clockwise movement of the upper blade 472 moves the teeth of said blade into engagement with the teeth of the bottom or lower perforating blade 473 to perforate the receipt material. After the receipt material has been perforated the upper perforating blade 472 is returned counterclockwise to open position by means of camming nodes 651 on the arms 642 and 643 in cooperation with upward extensions of the arms 640 and 641.

The rounded ends 652 of the arms 642 and 643 enter identical openings in the movable knife blade 474 mounted to reciprocate in vertical slots in the plates 468 and 469. The stationary perforating blade 473 and the stationary knife blade 475 are secured to a tie bar 653 secured between the plates 468 and 469. Counterclockwise movement of the shaft 644 and the arms 642 and 643 to perforate the record material moves the knife blade 474 idly to an extreme upward position. When the cams 599 return the upper perforating blade and the knife 474 counterclockwise and clockwise respectively, after the receipt has been perforated, there is ample clearance between the perforating blades and the knife blades to permit the receipt material to be fed. The receipt material is then fed forwardly in preparation for the second impression or second stroke of the impression mechanism which imprints the stub of the receipt, after which continued clockwise rotation of the cams 599 rocks the lever 647 counterclockwise to impart clockwise movement to the shaft 644 and arms 642 and 643 to move the knife 474 downwardly to cause said knife, in cooperation with the stationary knife blade 475 to sever the completed receipt from the receipt web. Afterwards the check ejector mechanism pictured in Fig. 11 and explained earlier herein functions to eject the receipt.

Briefly summarizing the control of the receipt mechanism in single item transactions, by referring to Fig. 4—A it will be seen that from the center of the impression hammer 464 and the center of the type wheels to the knife is 1¼″ and that the cutting surfaces of the knife blades and the center of the perforating blades are approximately one-eighth of an inch apart. Likewise it will be observed that from the forward edge of the receipt 614 to the center of the first impression is one-half inch. Moreover from the center of the first impression to the perforation is 1⅜″ and from the center of the first impression to the center of the second impression is 1½″ and from the center of the second impression to the end of the receipt is 1¼″. Obviously at the beginning of a single item transaction the forward end of the receipt is in alinement with the cutting surfaces of the knife blades.

First the receipt is back-fed 1¼″ in preparation for the printing by the electroroll. Next the electroroll forward feeds the receipt three inches, which by subtracting the 1¼″ back-feed leaves a mean forward feed of 1¾″, which positions the receipt web so that the first impression will be made ½″ from the forward end of the receipt. Immediately after the first impression the receipt is perforated and as the blades of the perforating mechanism are 1⅜″ from the center of the impression hammer and type wheels, obviously the perforation will be 1⅜″ from the center of the first impression. Next the receipt is forward fed 1½″ in readiness for the second impression which is made upon the stub portion of said receipt and after the second impression the knife mechanism functions to sever the complete receipt from the web thereof. Inasmuch as it is 1¼″ from the center of the impression hammer and type wheels to the cutting surfaces of the knife blades it will likewise be the same distance from the center of the second impression to the end of the receipt.

Multiple item transactions

Calling attention to Fig. 3, depressing one of the multiple item keys 205, 206 or 207 conditions the machine for a multiple item transaction, which consists of a series of item listing or entering operations followed by an enforced clearing operation in which the multiple item transaction totalizer is cleared. In multiple item transactions, the depressed transaction, and clerks' keys remain depressed until near the end of the enforced multiple item clearing operation. In the item entering operations of a multiple item transaction the items are listed in vertical alinement upon the body of a multiple item receipt 654 (Fig. 36) and simultaneously added in the No. 1 or multiple item totalizer. In the final clearing operation of a multiple item transaction the multiple item totalizer is cleared and the total amount of the items, together with the date, the consecutive number, machine number, and transaction and clerks' symbols, are printed both upon the body and the stub of the multiple item receipt.

In addition to selecting the multiple item totalizer the Item cash key 206 likewise causes the amounts of the listed items to be simultaneously accumulated in the proper set of wheels of the No. 3 or transaction totalizer and the depressed clerk's key 204 causes the items to be added in the corresponding set of wheels of the No. 2 or clerk's totalizer. The Item charge key 205 (Fig. 3) in addition to selecting the multiple item totalizer for addition likewise causes the amounts of the listed items to be entered in the transaction totalizer corresponding to the Item charge key. The Item add key 207 selects only the multiple item totalizer for addition.

By observing Fig. 36 it will be noted that during the listing of the items in multiple item transactions, the printing of the date, consecutive number, and machine number is omitted. This is accomplished by moving the shiftable portion 630 (Fig. 14) of the platen 627 upwardly to a position where it will not move the receipt material and inking ribbon into contact with the type carriers. Depressing any one of the keys 205, 206 or 207 by means of the transaction differential mechanism 216, link 219, segment 220 and tube 350 (Figs. 2 and 13) positions the cam 351 so that the high portion thereof is opposite the roller 353 carried by the yoke 354. This rocks said yoke 354 counterclockwise, which movement, by means of the roller 357 and the arm 356 is transmitted to the shaft 355.

A lever 655 (Fig. 14) secured to the shaft 355 moves counterclockwise in unison therewith and by means of a link 656, pivotally connecting said lever to an arm 657 pivoted on an upward extension 658 of the hammer operating bracket 632, rocks said arm 657 clockwise. The arm 657 has therein a slot which embraces a stud 659 in an arm 665 rotatable on the shaft 471 and having therein a cam slot which cooperates with a stud 666 in a crank 667 secured on a shaft 668 supported in extensions of the hammer frame 464. Clockwise movement of the arm 657 rocks the arm 665 counterclockwise causing the cam slot therein in cooperation with the stud 666 to rock the crank 667 and shaft 668 counterclockwise. Two arms 669, only one here shown, secured on the shaft 668 move counterclockwise in unison therewith and by means of bushings 670 secured on the ends thereof in cooperation with recesses in tenons 664, secured to the shiftable holder 630 and slidably supported in holes in the hammer frame 464, shifts the platen 627 upwardly out of engaging relationship with the type carriers.

In the final clearing operation of a multiple item transaction the mechanism shown in Fig. 7, which, as previously explained, imparts mechanical clockwise movement to the zero stop throwout shaft 116, as viewed in Fig. 7, and counterclockwise movement to said shaft as viewed in Fig. 13, causes the crank 372 in cooperation with the link 370 and the arm 366 to shift the link 358 downwardly in the manner explained earlier herein. This causes the stud 357 in the upper end of said link 358 in cooperation with the slots 365 and 359 to shift the arm 356 and the shaft 355 clockwise back to normal position independently of the yoke 354, which by means of the mechanism pictured in Fig. 14 shifts the platen 627 back to printing position, so that when the total of the items is printed upon the body and the stub of the receipt 654, (Fig. 36) the date, consecutive number and machine number will also be printed in unison therewith.

Counterclockwise movement of the yoke 354 under influence of the cam 351, through shaft 355, the arm 373, the bell crank 375 (Fig. 13), the link 377, and the crank 378, rocks the shaft 323 clockwise. Fast on the shaft 323 is a crank 671 connected by a link 672 to a similar crank 673 integral with a clutch dog throwout pawl 674 rotatable on the shaft 376. These connections cause clockwise movement of the shaft 323 to be transmitted to the throwout pawl 674 to cause an arcuate surface 675 thereof, in cooperation with a stud 676, to rock the clutch dog 606 counterclockwise out of engagement with the segmental portion 605 of the clutch disc 602. This disengages the clutch mechanism, comprising the plate 608, dogs 606 and 607, and the Geneva gear 610 (Fig. 27) from the integral cluster of cams and Geneva gears that control the receipt printing and issuing mechanism. This cluster of cams and gears includes the hammer operating arm 603, (Fig. 27) alining plate 601, the check ejector Geneva gear 600, the two knife and perforator cams 599 and the electro Geneva gear 598. These cams and gears remain disabled until during the final clearing operation of a multiple item transaction when downward movement of the link 358 (Fig. 13) through the connections here shown rocks the pawl 674 counterclockwise to permit the clutch dog 606 to reengage the segmental portion of the disc 602 to render the controls for the receipt printing and issuing mechanism effective.

Clockwise disabling movement of the pawl 674 causes a stud 677 carried thereby to enter a notch 678 in the periphery of the disc 601 (see also Fig. 27) to lock the cam and gear cluster stationary when the drive therefor is disabled. The disabling of the hammer cam 603 (Fig. 15), however, does not prevent the impression hammer from receiving one impression stroke during each item entering operation of the multiple item transaction. This one impression stroke is imparted to the hammer by means of a hammer cam 679 fixed to the gear 502 (Fig. 27) and driven thereby one clockwise revolution each machine operation (see space 7, Fig. 49).

*Receipt feed during multiple item transactions*

Inasmuch as the drive to the electroroll 446 (Fig. 11) is crippled during the item entering operations of a multiple item transaction it is necessary to use the receipt feeding mechanism shown in Figs. 28 to 35 inclusive, to feed the receipt material during the multiple item entering operations. As in single item transactions, the receipt web 460 is back-fed 1¼" by the feed roller 444 (Fig. 28), under control of the receipt feeding segment 484 (see also Figs. 31 and 32) in the first item entering operation of a multiple item transaction. The stud 533 on the latch 486 engaging the shoulder 534 of the latch arm 535 disconnects the segment 484 from its driving arm 488 in exactly the same manner as explained for single item transactions. Afterward the coupling pinion 516 is disengaged from the gears 480 and 482 and the stud on the arm 546 (Fig. 32) engages the extension 550 and rocks the latch arm 535 counterclockwise to move the shoulder 534 out of engagement with the stud 533. This frees the segment 484 to the action of the spring 493 and inasmuch as the latch arm 537 (Figs. 32 and 33) has been rocked out of the path of the latch stud 533 by counterclockwise movement of the yoke 354 under influence of the cam 351, (Fig. 13) said spring 493 moves the segment 484 full distance clockwise until such movement is terminated by an abrupt surface 680 thereof striking an abutment 681, thus effecting an idle pickup of the segment 484 of 1¾", (see spaces A, B and C of section 1, Fig. 48).

After the 1¾" idle pickup, the pinion 516 again couples the gears 480 and 482 together and the arm 488, during its return movement counterclockwise, engages the stud 489 and returns the segment 484 in unison therewith to revolve the feed roller 444 counterclockwise to forward-feed the web of the receipt 3" in two equal steps of 1½", space D section I, Fig. 48. This intermittent forward feed of the receipt web is effected by the contour of the cams 500 (see space 14 Fig. 49) to permit the printing hammer to make two impression strokes in the final clearing operation of a multiple item transaction, as will be described later. Discounting the back-feed of 1¼" there is a total forward feeding of the receipt material of 1¾" which moves the forward edge of said web ½" beyond the center of the printing line, in position to receive the first impression (Fig. 4—A). Immediately thereafter the hammer cam 679 (Figs. 15 and 27) imparts an impression stroke to the hammer 464 (Figs. 11 and 14) to print the first item on the multiple item receipt 654 (Fig. 36).

Counterclockwise movement of the shaft 355 (Fig. 13) under influence of the cam 351, the yoke 354, and the arm 356, rocks the arm 585 (Fig. 21) in unison therewith to move the stud 583 upwardly out of engagement with the notch in the pressure roller shifting plate 582. This occurs before the cam 593 imparts movement to the lever 589 to shift the pressure roller 445 (Figs. 11 and 22) out of engagement with the feed roller 444 and to shift the pressure roller 447 into engagement with the electroroll 446. It is therefore evident that the pressure rolls remain in the position here shown, with the pressure roller 445 effective and the roller 447 ineffective, until the shaft 355 is returned clockwise in the final clearing operation of a multiple item transaction. It is therefore obvious that the receipt web is fed entirely, at this time, by the roller 444.

Counterclockwise movement of the shaft 355 (Fig. 32) and the arm 556 moves the flexible pawls 554 and 558 out of engagement with the extension 553 of the latch arm 540 and releases this arm and the arm 535 to the action of the springs 561 and 541. However, the square stud 542 in the arm 540, in cooperation with the latch 543, prevents clockwise movement of the arms 535 and 540 until the stud 533 in the latch 486 passes under the arcuate surface 565 and this further obstructs clockwise movement of the arm 540 when the stud 547 on the arm 548 rocks the latch 543 out of engagement with the stud 542 and the arm 546 (Fig. 32) rocks the latch arm 535 counterclockwise to permit the idle pickup of 1¾" in the first item entering operation of a multiple item transaction, as explained above. However, normally there is a slight clearance between the latch stud 533 and the arcuate surface 565. Consequently when the latch 543 is rocked out of engagement with the stud 542 the spring 561 rocks the latch arm 540 clockwise sufficiently to put the lower edge of the square stud 542 in the path of the raised surface of the latch 543 and thus blocks counterclockwise return movement of said latch.

When the segment 484 and the latch 486 are returned counterclockwise to feed the receipt web forwardly 3", as explained above, the stud 533 moves out of the path of the arcuate surface 565 and thus releases the arm 540 to the action of the spring 561, which rocks said arm clockwise or downwardly until a shoulder 682 (Fig. 37—A) thereof is in the path of the latch stud 533. Return movement of the arms 548 and 546 permits the latch arm 535 to be returned clockwise, by the spring 541, until the stud 539 comes into contact with the top surface of the latch arm 540, to place a shoulder 683 of the arm 535 in the path of the latch stud 533.

In the second and succeeding item entering operations of a multiple item transaction it is necessary to forward-feed the receipt web one-quarter of an inch to properly space the printing of the items. This is accomplished by back-feeding the receipt web one-half inch, followed by one-quarter inch idle pickup, and finally a forward feed of three-quarters of an inch which, discounting the one-half inch back-feed, makes a mean forward feed of one-quarter of an inch. With the coupling pinion 516 (Figs. 28 and 30) connecting the gears 480 and 482, the receipt feed segment 484 is carried clockwise by the arm 488 (Figs. 31, 32, 34 and 35) until the stud 533 engages the shoulder 683 of the arm 535, to disengage the latch 486 from the drive arm 488. This back-feeds the receipt web one-half inch. Immediately thereafter the pinion 516 is rocked out of engagement with the gears 480 and 482, as shown in Fig. 28, and the arms 548 and 546, through stud 549, rock the latch arm 535 counter-clockwise to disengage the shoulder 683 from the latch stud 533 thereby releasing the segment 484 to the action of its spring 493, which moves said segment clockwise until the stud 533 engages the shoulder 682 of the latch arm 540 (Fig. 37—A) to effect one-quarter of an inch idle pick-up of the receipt feeding mechanism. The pinion 516 again couples the gears 480 and 482 and return movement of the arm 488 and the segment 484 rotates the receipt feed roll 444 counterclockwise to forward-feed the receipt web three-quarters of an inch.

After the receipt web has been forward fed three-quarters of an inch the hammer operating cam 679 (Figs. 15 and 27) imparts an impression stroke to the hammer 464 to print the amount, the transaction, and the clerks' identification symbols of the second item-entering operation on the receipt 654 (Fig. 36). When the arm 546 is returned counterclockwise so that the stud 549 is moved away from extension 550 of the latch arm 535, an arcuate surface 684 between the shoulders 683 and 534 of the latch arm 535 restrains return movement clockwise of said arm 535 until the segment 484 (Fig. 31) is returned counterclockwise to move the stud 533 beyond the shoulder 683. Subsequent item-entering operations, of which there may be any number, are effected in exactly the same manner as described above for the second item-entering operation.

As previously stated, in order to initiate a multiple-item transaction it is necessary to depress one of the multiple item keys 205, 206 or 207 (Fig. 3), one or more of the amount keys 144, and one of the clerks' keys 204. In order to enforce a multiple-item clearing operation at the end of each multiple-item transaction, the depressed multiple-item key and the depressed clerks' key remain locked in depressed position and are not released until during the final clearing operation of said multiple-item transaction. After all the items have been entered in a multiple-item transaction, the operator shifts the total control lever 123 (Fig. 3) from adding position to "Multiple-item total" or reset position, and depresses the motor bar 68 to start the machine operating. During this multiple-item clearing or resetting operation, the #1 or multiple-item totalizer is reset to zero and the amount standing thereon, in this case $15.59 (Fig. 36), is printed both upon the body and the stub portion of the receipt 654. Also, in this multiple-item clearing operation the portion of the platen that prints the date, consecutive number, and machine number, is rendered effective and prints this data along with the amount, on the body and the stub of the receipt. It is probably well to here state that during multiple-item transactions the total control lever 123 (Fig. 3) is locked out of all positions except "Add" and "Multiple-item total". In multiple-item total or clearing operations the mechanism shown in Fig. 7 functions as in other total-taking operations to rock the zero stop throwout shaft 116 back and forth (space A, Fig. 49) the first movement being counterclockwise as viewed in Fig. 13.

Moving the total control lever 123 from "Add" to "Multiple-item total" position imparts a slight counterclockwise movement to the zero stop throwout shaft 116 (Fig. 18) and the cam 336, causing the cam slot 335 in said cam, in cooperation with the roller 337, to rock the crank 338 clockwise. Movement of the crank 338 is transmitted by the link 339 to the pawl 341 and rocks the lower end of said pawl into the path of the projection 43 of the clutch dog 331. This, as previously brought out, causes the dog 331 to be disengaged from the segmental portion 333 of the disc 334 to disconnect the printer drive shaft 101 from its drive gear 100, which is operatively connected to the operating motor by means of the train of gears shown in Figs. 19 and 23. This disables the entire receipt printer mechanism during the first cycle of the multiple-item clearing operation, near the end of which further counterclockwise movement is mechanically imparted to the zero stop throwout shaft 116, causing the slot 335 in the cam 336 to rock the lower end of the pawl 341 out of the path of the dog 331 to cause the drive gear 100 to be coupled to the printer drive shaft 101 during the last cycle of a multiple-item clearing operation.

Counterclockwise mechanical movement of the shaft 116 (Fig. 13), near the end of the first cycle of a multiple-item clearing operation, through the crank 372, link 370, and arm 366, shifts the link 358 downwardly, causing the stud 357 in the upper end of said link, in cooperation with the slots 365 and 359 in the yoke 354 and arm 356, respectively, to shift the arm 356 and shaft 355 clockwise, independently of the yoke 354. The link 358 is locked in its downward position by means of a projection 663 thereon, in cooperation with a flat surface on a half-round stud 685 carried by an arm 686 loose on the shaft 188 and urged clockwise by a spring 687 to normally maintain a stud 688 therein in contact with the top surface of a link 689 pivotally connecting a crank 690, secured on the key lock shaft 80, to the upper end of a lever 691 fulcrumed on a stud 692 in the frame 61.

Depressing the starting bar 68 (Figs. 6 and 7) releases the key lock shaft 80 to the action of the spring 81, which urges said key lock shaft counterclockwise, as viewed in Fig. 13, to set the machine in motion. This counterclockwise movement of the shaft 80 and the crank 690 shifts the inclined top edge thereof away from the stud 688 to permit the spring 687 to move the stud 685 into resilient contact with the top surface of the projection 663. Consequently when the link 358 is shifted downwardly, in the manner explained above, the stud 685 drops behind the projection 663 to block return movement upwardly of said link until the key lock shaft 80 is restored near the end of the multiple-item clearing operation (see space B of the chart—Fig. 49). Restoring movement counterclockwise of the key lock shaft 80, under influence of the mechanism shown in Fig. 7, shifts the link 689 rearwardly (Fig. 13) causing the inclined upper surface thereof to engage the stud 688 and rock the arm 686 counterclockwise to disengage the stud 685 from the projection 663 to permit the link 358 to be returned upwardly by the spring 369. The zero stop throwout shaft 116 is restored before the key lock shaft 80 and the slot in the link 370 permits the link 358 to remain stationary while said shaft 116 is being restored. Compare spaces A and B of the chart—Fig. 49.

Initial movement downwardly of the link 358, as explained above, rocks the shaft 355 and the arm 373 clockwise, which movement by means of the bell crank 375 and the link 377 imparts counterclockwise movement to the crank 378, the shaft 323 and the crank 671. Counterclockwise movement of the crank 671, by means of the link 672, rocks the crank 673 and the pawl 674 also counterclockwise to disengage the stud 677 from the notch in the alining disc 601 and to move the arcuate surface 675 of said pawl out of the path of the clutch dog 606 to permit the cluster of cams and Geneva gears mounted on the sleeve 604 (Fig. 27) to be operatively connected to their driving gear 504.

Clockwise movement of the shaft 355 under influence of the link 358 (Figs. 13, 18 and 21) moves the lever 585 in unison therewith to cause the stud 583 to engage the notch in the plate 582 to connect said plate to the bell crank 581, which operates the shaft 578 to control the pressure rollers for the receipt feed roll and the electroroll. Clockwise movement of the shaft 355 (Figs. 35 and 37A) moves the arm 556 and the flexible pawls 554 and 558 in unison therewith. The stud 559 in the yoke 354 remains stationary at this time, and in cooperation with an upward extension of the pawl 558 imparts additional clockwise movement to said pawls 554 and 558 causing them, in cooperation with the upward extension 553 of the latch arm 540 to shift said arm counterclockwise its full distance, which movement by means of the stud 539 is transmitted to the latch arm 535. This moves the shoulders 682 and 683 out of the path of the latch stud 533 and moves a shoulder 693 into the path of said latch stud 533. In this counterclockwise movement of the latch arm 540, the square stud 542 therein jumps the notch in the latch 543 and is resiliently engaged by an arcuate surface 694 on the upper end of said latch 543, adjacent the notch, therein.

Near the end of the first cycle of a multiple-item clearing operation the mechanical movement counterclockwise of the zero stop throwout shaft 116 (Fig. 18) causes the cam groove 335 in the cam 336 to rock the pawl 341 to ineffective position, permitting the clutch dog 331 to reengage the segmental portion of the clutch disc 334, to cause the shaft 101 to be driven by the gear 100 during the second cycle of said multiple-item clearing operation. It is therefore obvious that in the second cycle of the multiple-item clearing operation the shaft 101 (Fig. 27) through the gear 503 drives the gear 502 and the shaft 501, and through the gear 504 and its associated gear 610 drives the cluster of cams and gears assembled on the sleeve 604.

Initial movement clockwise of the shaft 501 and the cams 500 (Figs. 28 and 30 and space 12, Fig. 49) imparts clockwise movement to the drive arm 488, which by means of the latch 486 carries the segment 484 in unison therewith until the stud 533 engages the surface 693 of the arm 540 (Fig. 37A) to disengage said latch 486 from said arm 488. This initial movement clockwise of the segment 484, by means of the gears 480 and 482, which are coupled together by the pinion 516, drives the receipt feed roller 444 clockwise to back-feed the web of the receipt 2½". (See space G of Section III, Fig. 48.) The contour of the cams 500 is such that the segment drive arm 488 dwells at the end of its initial movement clockwise, and during this dwell the cam groove 592 (Figs. 11, 21 and 22) and associated mechanism rocks the shaft 578 counterclockwise to disengage the tension roller 445 from the feed roller 444 and to engage the tension roller 447 with the electroroller 446. (Compare spaces 9, 12 and 13 of the time chart, Fig. 49.) The electroroller 446 is then revolved clockwise to print the desired data upon the body and the stud of the multiple-item receipt 654 (Fig. 36) and to simultaneously feed said receipt three inches forwardly which, discounting the back-feed of 2½", results in a total forward-feed of one-half inch, which positions said receipt so that the printing of the multiple item total upon the main portion or body thereof will be properly spaced from the last item thereon.

Immediately after the electroroll has completed its movement the hammer cam 603 (Figs. 14 and 15) imparts an impression stroke to the hammer 464 to print the total of the multiple items upon the body of the receipt as indicated at 695 (Fig. 36). Clockwise movement of the shaft 355 (Fig. 13) during the first cycle of a multiple item clearing operation, under influence of the link 358 causes the arm 655 and connected mechanism to move the shiftable portion of the platen 627 downwardly into printing position. It is therefore evident that the date, consecutive number, and machine number will be printed along with the multiple item total. For the timing of the impression strokes of the hammers 464 in multiple item clearing operations, see space 8, Fig. 49.

During the feeding movement of the electroroll 446 and while the pressure roller 445 (Fig. 11) is out of engagement with the receipt feed roller 444, the receipt feed drive arm 488 (Figs. 28 and 30) is returned counterclockwise about halfway, and due to the configuration of the cams 500 (space 12, Fig. 49) dwells in this position until the mechanism pictured in Figs. 21 and 22 shifts the tension from the electroroll back to the receipt feed roller 444. It is therefore obvious that the return movement imparted to the segment 484 and the feed roller 444 thus far will not feed the receipt, due to the disabling of the pressure roller 445. After the pressure roller 445 is re-engaged with the feed roller 444 (space 14, Fig. 49) the cams 500 complete return movement of the arm 488 and the segment 484 to forward feed the receipt 1½" in preparation for the printing of the multiple item total upon the stub, said printing being in every respect a duplication of the total printing upon the body of the receipt. After the receipt has been thus forward-fed 1½", the cam 603 (Figs. 14 and 15) imparts a second stroke to the impression hammer 464 to print the total of the multiple items upon the stub of the receipt, as indicated at 696 (Fig. 36). See also space 8, Fig. 49.

Simultaneously with the first printing of the multiple item total upon the body of the receipt, the perforating and severing mechanism shown in Figs. 24, 25, and 26 functions to perforate a separating line between the body and the stub of the receipt. Immediately after the second printing of the total upon the stub of the multiple item receipt this mechanism again functions to sever the completed receipt from the web thereof.

In the present embodiment, mechanism later to be described which works in conjunction with the total control lever 123, (Figs. 3 and 5) disables the receipt mechanism when the total control lever is moved to positions other than "Add" or "Multiple Item total". However, this receipt disabling mechanism is so constructed that any position of the total control lever may be arranged to control the issuing of a receipt.

*Interlocking mechanism for the clerks' keys*

An interlocking device between the clerks' keys and the key lock shaft prevents releasing the machine for operation in all adding transactions unless a clerk's key is depressed. However, shifting the total control lever away from adding position unlocks the key lock shaft, the same as depressing one of the clerk's keys, and thereby permits reading or resetting. Shifting the total control lever away from adding position likewise makes it unnecessary to depress one of the amount keys in order to release the machine for operation. In single-item transactions the depressed clerk's key is released automatically at the end of each machine operation. However, in multiple item transactions, mechanism controlled by the transaction keys disables the automatic releasing mechanism and locks the clerk's key depressed until the compulsory multiple item clearing operation. This mechanism is shown best in Figs. 9, 18 and 18A, and will now be described.

Each of the clerks' keys 204 (Figs. 8 and 18) carries a stud 697 adapted to cooperate with hook-shaped projections 698 of a locking detent 699 and inclined camming surfaces of a plate 700, both of which are mounted for radial movement on studs 701 and 702 fast in the clerk's key frame 234. Springs 703 and 704 urge the detent 699 and the plate 700, respectively, clockwise and counterclockwise to normally maintain the ends of radial slots therein in contact with the studs 701 and 702.

Depressing one of the clerks' keys 204 causes the stud 697 in cooperation with an angular camming surface on the projection 698 to shift the detent 699 counterclockwise until said stud 697 passes beyond the hook-shaped portion of the projection 698. The spring 703 then returns said detent 699 clockwise to cause the hook-shaped portion thereof to latch over a flat surface of the stud 697 to retain the clerk's key depressed. In case the wrong clerk's key is inadvertently depressed, depressing the desired key releases the previously depressed key by shifting the detent 699 counterclockwise and return movement clockwise of said detent under action of the spring 703 retains the desired key depressed.

The detent 699 carries a stud 705 which cooperates with the upper end of a lever 706 fulcrumed on a stud 707 secured in the key frame 234 (Fig. 8). The other end of the lever 706 cooperates with a stud 708 in an extension of a lever 709 rotatable on a stationary stud 715 in the frame 65. An extension 716 of the lever 709 cooperates with a stud 717 in a crank 718 fast on the key lock shaft 80. The lever 709 carries a stud 719 embraced by a bifurcated arm of a bell crank 720 pivoted on a stud 721 in the frame 65. Another arm of the bell crank 720 has connected thereto one end of a link 722, the other end of which is slotted to receive a stud 723 in a downward extension of the lever 585 (see also Fig. 21). A spring 724 stretched between the link 722 and an extension of the lever 585 urges said link 722 forwardly to normally maintain the stud 723 in contact with the end of the slot in said link to position the bell crank 720 and the lever 709, as shown in Fig. 18.

When the mechanism shown in Fig. 7 imparts clockwise movement to the key lock shaft 80, as viewed in Fig. 18, near the end of machine operations to release the depressed keys, such movement causes the stud 717 in the crank 718 to engage the projection 716 and rock the lever 709 counterclockwise against tension of the spring 724. Counterclockwise movement of the lever 709 causes the stud 708 to rock the lever 706 also counterclockwise, to cause the upper end of said lever, in cooperation with the stud 705, to shift the detent 699 rearwardly or counterclockwise to release the depressed clerk's key. The clerks' keys are automatically released in this manner in all single-item transactions and in all reading and resetting operations. However, in multiple item transactions counterclockwise movement of the shaft 355, (Fig. 13) caused by the high portion of the periphery of the cam 351, which is positioned opposite the roller 353 by the depression of any of the multiple item transaction keys 205, 206 or 207, (Figs. 2 and 3), rocks the lever 585 (Figs. 18 and 21) in unison therewith to shift the link 722 forwardly. This by means of the bell crank 720 rocks the key releasing lever 709 clockwise to move the projection 716 thereof out of the path of the stud 717 and to move the stud 708 out of contact with the lower end of the lever 706. This prevents the depressed clerk's key from being released upon clockwise releasing movement of the key lock shaft 80 near the end of multiple item entering operations.

However, it is desirable to have the depressed clerk's key released in the final clearing operation of a multiple-item transaction, and this is accomplished by the downward shifting of the link 358 (Fig. 13) under influence of the zero stop throwout shaft 116, which, as brought out hereinbefore, shifts the shaft 355 and the lever 585 (see also Fig. 18) indpendently of the yoke 354. Clockwise movement of the shaft 355 and the lever 585 returns the release lever 109 counterclockwise to again move the projection 716 thereof in the path of the stud 717 so that clockwise releasing movement of the shaft 80 will release the depressed clerk's key during the last cycle of a multiple item clearing operation.

A hook-shaped projection 725 (Figs. 18 and 18A) of the lever 709 is adapted to cooperate with an abrupt surface 726 cut in the periphery of a locking plate 727 loose on the key lock shaft 80 and spring-urged clockwise to normally maintain a stud 728 therein in contact with a finger 729 of an arm 730 secured on the shaft 80. Counterclockwise releasing movement of the shaft 80, caused by the spring 81 (Fig. 7) when the starting bar 68 is depressed, causes the arm 730 in cooperation with the stud 728 to move the locking plate 727 in unison therewith to move the abrupt surface 726 thereof below the hook of the lever 709, whereupon clockwise movement of said lever 709 under influence of the shaft 355 and the lever 585, in the first item-entering operation of a multiple-item transaction, causes said hook 725 to latch over the abrupt surface 726 to latch the plate 727 in the position indicated by dot and dash lines in Fig. 18A. This retains a projection 731 of the plate 727 in the path of an extension 732 of the locking detent 699 to obstruct counterclockwise releasing movement of said detent to lock the depressed clerk's key and to prevent the depression of another clerk's key during a multiple-item transaction. In the final clearing operation of a multiple item transaction, clockwise movement of the shaft 355 and the lever 585 under influence of the link 358 (Fig. 13) disengages the hook 725 on the lever 709 from the abrupt surface 726 and permits the locking plate 727 to be spring-returned clockwise until the stud 728 again contacts the projection 729.

When the machine is at rest the projection 731 (Fig. 18A) in cooperation with the extension 732 likewise prevents releasing the machine for operation when a clerk's key is partially depressed. Partially depressing a clerk's key 204 (Figs. 18 and 18A) rocks the detent 699 counterclockwise to move the extension 732 above and in the path of the projection 731, which by means of the stud 728 and the projection 729 obstructs counterclockwise releasing movement of the shaft 80 until the clerk's key is fully depressed.

In all adding operations, including single-item operations and the item-entering operations of multiple-item transactions, a tooth 733 (Figs. 18, 18A and 42) of the plate 727 in cooperation with the tooth of a latch 734 pivoted on the stud 707 and bifurcated on its upper end to straddle a stud 735 in the plate 700, obstructs clockwise releasing movement of the shaft 80 unless a clerk's key 204 is depressed. Depressing a clerk's key 204 causes the pin 697 therein, in cooperation with the inclined camming surface of the corresponding notch in the plate 700, moves said plate clockwise to shift the tooth of the latch 734 out of the path of the tooth 733, to permit the machine being released for operation.

Moving the total control lever 123 (Fig. 5) away from adding position, by means of the mechanism here shown, imparts a slight counterclockwise movement to the zero stop throwout shaft 116, as viewed in Fig. 18, causing a raised surface 736 of the cam 336, secured on said shaft, in cooperation with a roller 737 on a pitman 738, to shift said pitman upwardly. The pitman 738 is bifurcated at its lower end to straddle the shaft 116, while the upper end thereof is connected to a lever 739 loose on the rod 235 (Fig. 8), which supports the lower end of the clerk's key frame 234. Upward movement of the pitman 738 rocks the lever 739 clockwise, causing a projection thereof in cooperation with a stud 740, secured in an extension of the plate 700, to move said plate clockwise or downwardly to rock the tooth of the latch 734 (Fig. 42) out of the path of the tooth 735 in the plate 727 to permit releasing of the machine for total taking operations without the necessity of depressing a clerk's key.

Depressing one of the amount keys 144, (Figs. 1 and 3) in the well known manner, rocks a yoke 741 (Fig. 9) counterclockwise causing a stud 742 in said yoke in cooperation with a bifurcated arm 743 to rock said arm and a latch 744 integral therewith, and loose on the shaft 77, clockwise. Clockwise movement of the latch 744 moves the upper end thereof out of the path of a finger 745 secured on the key lock and release shaft 80, to permit counterclockwise releasing movement of said shaft in adding transactions after one or more amount keys have been depressed.

In total-taking transactions it is desirable to be able to release the machine for operation without the necessity of depressing an amount key, and moving the total control lever 123 (Figs. 5 and 18) rocks the shaft 116 and the cam 336 counterclockwise causing the camming slot 335 in cooperation with the roller 337 to shift the arm 338 clockwise, which movement is transmitted by the link 339 to the pawl 341 and the stud 340. Clockwise movement of the pawl 41 causes the stud 340, in cooperation with an arm of a lever 746, to rock said lever counterclockwise on its pivot 747 fast in the frame 61. A bifurcated arm of the lever 746 straddles a stud 748 secured in an extension of the latch 744 (Fig. 9), consequently counterclockwise movement of said lever 746 rocks the latch 744 clockwise out of the path of the finger 745 to permit the releasing of the machine in total-taking operations without the necessity of depressing one or more of the amount keys. When the total control lever is returned to adding position, a spring 749 (Figs. 9 and 18) returns the lever 746 clockwise in unison therewith to restore the latch 744 counterclockwise to effective position, as here shown.

*Control of the receipt mechanism*

As stated earlier herein, the receipt mechanism is under the control of the manipulative lever 515 (Fig. 39) which has three positions, namely, "On", "Automatic" and "Off". When the lever 515 is in "Automatic" position the receipt mechanism is subject to the control of mutilated segments differentially positioned by the transaction keys and the clerks' keys. However, the control by the transaction keys and clerks' keys is superseded by the total control lever which, when in certain positions, disables the receipt mechanism irrespective of the automatic control thereof. When the lever 515 is in "On" position the receipt mechanism functions irrespective of the mutilated segments positioned by the transaction and clerks' keys. However, in this case as before, the total control lever 123 supersedes the control by the lever 515 and, when moved to certain predetermined positions, disables the receipt mechanism. When the lever 515 is in "Off" position the receipt mechanism is disabled at all times irrespective of the transaction and clerks' keys and the total control lever. A description of the receipt controlling mechanism follows:

The shaft 254 (Figs. 18 and 41) which is driven by the gear 100, has secured thereon a plate cam 750 the periphery of which is yieldingly engaged by a roller 751 secured on one arm of a bell crank 752 rotatable on a stud 753 in the frame 61. The other arm of the bell crank 752 is connected by a link 754 to a crank 755 secured on the shaft 376. Also secured on the shaft 376 (Fig. 43) is a crank 756 connected by a link 757 to a rockable tappet 758 loose on the shaft 501 and having a nose adapted to cooperate with a foot 759 on the clutch dog 506.

The shaft 254 and the cam 750 make one clockwise revolution each machine operation to oscillate the bell crank 752, the shaft 376 and the tappet 758 first clockwise to move the nose of said tappet in the path of the foot 759, then counterclockwise full distance to move the nose of said tappet 758 out of the path of the foot 759, and finally counterclockwise to an intermediate position, as shown in Figs. 41 and 42, in which the nose of the tappet 758 continues out of the path of the foot 759 of the dog 506. For the timing of the cam 750 see space 5 of the time chart, Fig. 49. A spring 765 (Fig. 41), one end of which is connected to an arm 766 secured to the shaft 376, urges said shaft and connected mechanism counterclockwise to normally maintain the roller 751 in engagement with the edge of the cam 750. If the shaft 376 and the tappet 758 are retained in their clockwise positions, by mechanism presently to be described, under control of the transaction and clerks' keys, the nose of said tappet 758 engages the foot 759 to rock the dog 506 out of engagement with the segmental portion of the clutch disc 505, (see also Fig. 27). This uncouples the gears 503 and 504 from their driving mechanism, including the shaft 101, and therefore disables the drive of the shaft 501 and the cluster of gears and cams on the sleeve 604, which it will be recalled drives and controls the receipt printing and issuing mechanism.

The crank 755 (Fig. 41) is bifurcated to receive a stud 767 in the upper arm of a bell crank 768 rotatable on the shaft 323 and carrying a stud 769 embraced by the slotted arm of a lever 770 loose on the shaft 316. An arm of the lever 770 carries a stud 771 which extends through an L-shaped slot 772 in a pitman 773 the forward end of which is slotted to straddle a shaft 774 journaled in the frames 60 and 61. The pitman 773 has a stud 775 urged by a spring 776 into communication with mutilated segmental portions of the transaction gear sector 229 and a clerk's gear sector 777.

The sector 777 (Fig. 10) meshes with another sector 778 loose on a rod 779 extending between the frames 61 and 65, and said sector 778 is connected by a link 760 to the gear segment 270, which, it will be recalled by referring to Fig. 8, is differentially positioned under control of the depressed clerk's key 204. It is therefore obvious that the differential positioning of the segment 270 is transmitted to the sector 777. It will likewise be recalled by observing Fig. 2 that the transaction sector 229 is connected by one of the nested tubes 199 to the arm 221 which, by means of the link 219 and beam 217, is differentially positioned under control of the depressed transaction key.

The manipulative lever 515 (Fig. 39) is connected by a link 761 to an arm 782 loose on the shaft 492 and carrying a stud 783 embraced by a slot in a plate 784 free on the shaft 376. The plate 784 is integral with a cam plate 785 having a cam slot 786 adapted to receive a roller 787 mounted on one arm of a two-armed lever 788 loose on a stud 789 fast in the frame 65. The upper end of a link 790 is pivotally connected to the other arm of the lever 788, while the lower end of said pitman is slotted to receive a stud 811 in the pitman 773. A spring-pushed plunger 791 in the slot in the lower end of the link 790 in cooperation with the stud 811 makes a resilient connection between said link 790 and the pitman 773 so that said link 790 may be moved independently of the pitman 773. The lever 515, the plate 784 and associated parts are retained in set positions by means of three notches in the edge of the plate 784, corresponding to the three positions of the lever 515, in cooperation with a stud 792 in a spring-pulled lever 793, loose on the stud 789.

When the lever 515 is in "Automatic" position, as shown in Fig. 39, the cam 785, the lever 788 and the link 790 position the pitman 773 so that a hook 780 thereof is above a half round stud 781 fast in frame 65 and the substantially vertical portion of the slot 772 engages the stud 771 in the lever 770. Initial movement clockwise of the cam 750 (Fig. 41) rocks the shaft 376 also clockwise, which movement by means of the bell crank 768 is transmitted to the lever 770 causing this lever to shift the pitman 773 rearwardly to move the stud 775 beyond the mutilated segmental portions of the gear sectors 229 and 777. The contour of the cam 750 retains the pitman 773 rearwardly until the gear sectors 229 and 777 have been positioned in accordance with the depressed transaction and clerks' keys. After the gear sectors have thus been positioned, continued clockwise movement of the cam 750 causes the high surface thereof to move beyond the roller 751, thereby releasing the shaft 376 and connected mechanism to the action of the spring 765. The spring 765 instantly returns said shaft and connected mechanism counterclockwise to again shift the pitman 773 forwardly or to the right as here observed, unless differential positioning of either of the sectors 229 or 777 has placed one of several high portions 794 of the mutilated sections thereof opposite the stud 775. In this case return movement forwardly of the pitman 773 is obstructed and the shaft 376 is thereby retained in clockwise position to hold the nose of the tappet 758 in the path of the foot 759 to disengage the clutch dog 506 from the disc 505 (Figs. 43 and 27) to disable the drive of the shaft 501 and the sleeve 604 to render the receipt mechanism inoperative.

If the sectors 229 and 777 (Fig. 41) are so positioned that notches 795 in the mutilated sections thereof are opposite the stud 775, return movement forwardly of the pitman 773 is unobstructed and consequently the shaft 376 rocks the nose of the tappet 758 out of the path of the foot 759 to prevent disabling of the receipt mechanism. The location of the tappet 758 (Fig. 43) in relation to the foot 759 permits the gear 503 to drive the gear 502 and the shaft 501 (Fig. 27) part of a revolution before the clutch mechanism is disconnected, which movement rotates the cams 500, (Figs. 28 and 30) sufficiently to impart full initial movement clockwise to the receipt feed segment 484, which movement it will be recalled back-feeds the web of the receipt material. This is what is referred to in spaces A and B of Section I (Fig. 48) and the receipt web remains in its back-fed position until the receipt mechanism is again thrown on. The receipt mechanism, when again thrown on, picks up from where it left off when disabled and continues to function in the usual manner. The Geneva gear 504 (Figs. 19 and 27) is integral with and moves in unison with the gear 503, however, the gear 504 and its associated Geneva gear 610 are so constructed that movement of said gear 504, prior to the disengaging of the clutch mechanism by the tappet 758, imparts no movement to the sleeve 604. After the tappet 758 disengages the clutch mechanism that drives the shaft 501 and the sleeve 604, an alining notch in a disc 796 (Fig. 11) secured on said shaft 501 in cooperation with a roller carried by a spring-pulled lever 797 rotatable on the shaft 498, retains the shaft 501 in position until the drive for the receipt mechanism again becomes effective. A portion of the periphery of the Geneva gear 504 (Fig. 27), in cooperation with the Geneva gear 610 locks the sleeve 604 and parts assembled thereon against movement until the receipt mechanism is rendered effective.

Moving the manipulative lever 515 (Fig. 39) to "On" position rocks the cam 785 clockwise, causing the slot 786 to rock the lever 788 counterclockwise to lift the link 790, which in turn lifts the pitman 773 so that the substantially horizontal and enlarged portion of the L-shaped slot 772 is opposite the stud 771. This provides clearance for the stud 771 and permits the lever 770 to rock back and forth under influence of the cam 750 (Fig. 41), regardless of where the pitman 773 is positioned by the mutilated portions of the gear sectors 229 and 777. It is therefore obvious that when the lever 515 is in "On" position the mechanism that drives the receipt mechanism remains effective at all times and is not influenced by the pitman 773.

Moving the lever 515 (Fig. 39) to "Off" position rotates the cam 785 counterclockwise, causing the slot 786 to impart clockwise movement to the lever 788 to shift the link 790 downwardly. Downward movement of the link 790, due to the resilient plunger 791, causes the hook 780 of the pitman 773 to resiliently engage the top surface of the stud 781 until the pitman 773 is shifted rearwardly by initial movement clockwise of the lever 770 in cooperation with the cam 750 (Fig. 41), the shaft 376 and associated mechanism. When the pitman 773 is thus shifted rearwardly or toward the left, as viewed in Fig. 39, the spring plunger 791 urges the hook 780 downwardly, when said hook moves beyond the stud 781, and latches said hook over said stud. The stud 781 then retains the pitman 773, the lever 770, the shaft 376 (Figs. 41 and 43) and the tappet 758 in their disengaging positions irrespective of the position of the transaction sector 229 and the clerk's sector 777, to cause the nose of said tappet 758 to disengage the dog 506 to disable the drive for the receipt mechanism.

The lever 515 (Fig. 39) and associated mechanism are locked in set position by means of a tooth 798 on an extension of a yoke 799 loose on the shaft 323, in cooperation with a notched disc 800 integral with a crank 801 loose on the shaft 789, said crank being bifurcated to straddle a stud 802 in the plate 784. A spring 803 stretched between the lever 793 and the yoke 799 urges said yoke counterclockwise to normally maintain a stud 804 (Fig. 13) in an extension thereof in contact with a projection 805 on the lower end of the lever 691, which it will be recalled is connected by a link 689 to a crank 690 secured to the key lock shaft 80. Counterclockwise releasing movement of the key lock shaft 80 rocks the lever 691 clockwise, which in turn rocks the yoke 799 clockwise to engage the tooth 798 with a notch formed by two projections 806 of the disc 800 when the lever 515 is in "Automatic" position (Fig. 39) or in the path of one of said projections 806 when the lever 515 is in "On" or "Off" position, to lock the cam 785 and the lever 515 in set positions until the key lock line 80 is restored near the end of machine operation.

In multiple item transactions, which, as previously stated, consist of a series of item-entering operations followed by a multiple-item clearing operation, it is desirable to lock the lever 515 in set position for the duration of the complete multiple item transaction, and this is accomplished as follows: In other than multiple item transactions an arm 807 of the tappet 322 (Fig. 20) secured on the shaft 323, by means of a stud 808 therein in cooperation with an extension of a blocking arm 809 loose on a stud 812 in the frame 65, restrains said arm 809 against clockwise movement under the influence of a torsion spring to maintain a rearward extension thereof out of the path of a stud 810 in a downwardly extending arm of the yoke 799. When one of the multiple item keys 205, 206 or 207 (Fig. 2) is depressed, the transaction differential mechanism positions the cam 351 (Fig. 13) so that the high portion of the periphery thereof engages the stud 353 and rocks the yoke 354, the arm 356 and shaft 355 counterclockwise. Counterclockwise movement of the shaft 355 by means of the arm 373, the bell crank 375, the link 377, and the crank 378 rocks the shaft 323 and the arm 807 (Fig. 39) clockwise to move the stud 808 out of the path of the extension of the arm 809. This permits said arm 809 to be rotated clockwise by the torsion spring connected thereto until the rearward or left-hand extension thereof is in the path of the stud 810 in the yoke 799, which under the influence of the key lock shaft 80 and the lever 691, has previously been rocked clockwise into locking engagement with the disc 800. The arm 809 in cooperation with the stud 810 prevents return movement counterclockwise of the yoke 799 when the key lock shaft is restored at the end of an item-entering operation of a multiple-item transaction. This locks the lever 515 in set position until the final clearing operation of a multiple item transaction.

In the final clearing operation of a multiple item transaction downward movement of the link 358, (Fig. 13) caused by counterclockwise movement of the zero stop throw-out shaft 116, as explained herein before, rocks the shaft 355 and the arm 373 independently of the yoke 354. Clockwise movement of the arm 373, by means of the connections here shown, rocks the shaft 323 and the arm 807 (see also Fig. 39) counterclockwise to cause the stud 808 to rock the arm 809 out of the path of the stud 810 so that when the key lock shaft 80 is restored at the end of the multiple item clearing operation, the tooth 798 of the yoke 799 will be free to move out of engagement with the disc 800 thereby unlocking the manipulative lever 515.

*Control of the receipt mechanism by the total control lever*

The machine embodying the instant invention embraces mechanism operated by the total control lever, in predetermined positions thereof, to disable the receipt mechanism, and this disabling of the receipt mechanism supersedes the "On" and "Automatic" positions of the lever 515 (Fig. 39). In other words, when the lever 515 is in either "On" or "Automatic" position and the total control lever 123 is moved to a position that disables the receipt mechanism, the receipt mechanism will be rendered inoperative irrespective of the mechanism controlled by the lever 515.

Directing attention to Figs. 2 and 5, shifting the total control lever 123 away from adding position, by means of a link 815 connecting said total control lever to a crank 816 secured on the shaft 191, rocks said shaft 191 counterclockwise when the total control lever 123 is moved upwardly to reading position and clockwise when the total control lever is moved downwardly to resetting position. Secured on the left-hand end of the shaft 191 (Fig. 40) and moving in unison therewith is a sector 817 having a hook-shaped extension 818 which cooperates with a stud 819 in a crank 820 connected by a hub 821 loose on a stud 822 in the frame 61 to a similar crank 823. The crank 823 is connected by a link 824 to a latch 825 loose on the shaft 323 and urged clockwise by a spring 826 to normally maintain the roller 819 in contact with the periphery of the hook-shaped extension 818.

When the total control lever is either in "Add" or "Multiple-item total" position (Fig. 3) a high portion 827 of the hook-shaped extension 818 is opposite the stud 819 and holds a hook 828 of the latch 825 out of engagement with a stud 829 in the lever 770. It is therefore obvious that when the total control lever is either in "Add" or "Multiple item total" position, movement of the lever 770 is not interfered with and the receipt mechanism is controlled by the mechanism shown in Figs. 39 and 41 and explained above. Shifting the total control lever to any of its reading positions or to its "Clerk's total" or "Transaction total" positions, moves the high portion 827 of the periphery of the extension 818 out of the path of the stud 819, permitting the spring 826 to rock the hook 828 into resilient engagement with the stud 829. During machine operation the cam 750, and other mechanism shown in Fig. 41, rocks the lever 770 counterclockwise to shift the pitman 773 rearwardly. When the stud 829 moves beyond the hook 828, the spring 826 (Fig. 40) urges said hook clockwise into the path of said stud 829 to block the return movement counterclockwise of the lever 770 and the shaft 376 (Figs. 41 and 43). It is therefore obvious that when the total control lever is in positions other than "Add" or "Multiple item total" the nose of the tappet 758 is held in the path of the foot 759 of the dog 506, and disables the receipt mechanism irrespective of the position of the lever 515.

Obviously, by properly cutting the extension 818 of the sector 817, any position or positions of the total control lever may be arranged to disable the receipt mechanism. The mutilated portion of the transaction sector 229 (Fig. 41) is so arranged that operating the machine with the lever 515 (Fig. 3) in "Automatic" position and with either the Item cash key 206, the Cash key 208, or the Paid-out key 208, depressed, causes the receipt mechanism to be disabled. The mutilated portions of the sectors 229 and 777 may be cut or arranged as required to give the desired control of the receipt mechanism.

Slip printing mechanism

The machine embodying this invention, in addition to issuing a receipt, is also adapted to print identical records upon the original and duplicate portions of a slip 830 (Fig. 37). The slips are guided by a table 831 (Fig. 11) beneath the single line of type wheels mounted on the shaft 198 (Fig. 16) and a stop (not shown) locates the upper edge of the original copy of the duplicate slip in alinement with the printing mechanism. During operation of the machine, the slip impression hammer functions to impress the date, consecutive number, machine number, amount, and the transaction and clerks' identification letters on the original copy of the slip. The slip is then automatically fed to bring the duplicate copy thereof, which is longer than the original copy, in alinement with the printing mechanism. The impression hammer again functions to print the exact data upon the duplicate copy of the slip that was printed upon the original. Having the attached original and duplicate slips of different lengths makes it possible to print the desired data upon both copies of the slip, which is obviously more satisfactory than using an interposed carbon to transfer the desired data to the duplicate slip.

When a slip is inserted in the machine, a slip feeler device cooperating therewith, upon operation of the machine, disables the receipt mechanism by obstructing return movement of the shaft 376 (Fig. 41) and thereby retaining the nose of the tappet 758 (Fig. 43) in the path of the dog 506 as will be more fully explained presently.

Directing attention to Figs. 19, 23 and 27, the drive of the shaft 101 is transmitted to the slip mechanism by means of a gear 832 secured on said shaft 101, which meshes with a gear 833 mounted on a stud in the frame 66, and the gear 833 in turn meshes with a gear 834 secured on a slip printer drive shaft 835 journaled in the frames 65 and 66. By means of the above gearing the shaft 101 drives the shaft 835 one counterclockwise revolution each machine operation. Connecting the frames 65 and 66 (Figs. 44 and 45) is a rod 836, pivotally supporting a feeler 837 having a vertical extension 838 with a bent-over ear adapted to move through an opening in the table 831 (Fig. 11) to feel for an inserted slip. The slip feeler 837 carries a stud 839 which extends within a slot in an arm of a bell crank 840 secured on a shaft 841 journaled between the frame 66 and a plate 842. Plate 842 is supported by the rod 836, a similar rod 843 connecting the frames 65 and 66, and a stud 844 (Fig. 45) secured in the frame 66. The bell crank 840 supports a roller 845 which cooperates with the periphery of a cam 846 secured on the slip printer drive shaft 835 (see also Fig. 27).

Also secured on the shaft 841 (Figs. 44 and 45) is an arm 847 connected by a link 848 to a downwardly extending arm of a yoke 849 loose on a stud 850 secured in the frame 66. Another arm of the yoke 849 has pivotally connected thereto the lower end of a link 851, the upper end of which is slotted to embrace a stud 852 in a latch 853 pivoted to the arm 766 (see also Fig. 41), which as explained previously, is secured on the shaft 376. A notch 854 in the forward end of of the latch 853 cooperates with the flattened portion of a half-round stud 855 secured in the frame 66. A spring 856 stretched between the latch 853 and the link 851 maintains the lower surface of the latch 853 in resilient contact with the top of the stud 855. When the machine is at rest the shaft 835 is positioned as shown in Fig. 44, in which position the lobe of the cam 846 is opposite the roller 845 and by means of the bell crank 840 maintains the feeler 837 downwardly or in counterclockwise position against the tension of a spring 857 to retain the extension 838 below the table 831 so that it does not interfere with the insertion of slips.

Counterclockwise movement of the shaft 835, during machine operations, moves the lobe of the cam 846 beyond the roller 845 and if no slip is inserted in the machine the spring 857 moves the feeler 837 full distance upwardly or clockwise, which movement is governed by the contour of the cam 846 in cooperation with the bell crank 840. Counterclockwise movement of the bell crank 840, the shaft 841 and the arm 847 (Fig. 44) shifts the link 848 rearwardly to rock the yoke 849 clockwise to cause the link 851 to lift the latch 853 to retain the notch 854 out of the path of the stud 855 so that return movement of the shaft 376 will not be interfered with (see also Figs. 41 and 43). This prevents the tappet 758 from being retained in the path of the dog 506, thereby permitting the receipt mechanism to function in the usual manner as explained above.

If the extension 838 of the slip feeler 837 contacts a slip when it is moved upwardly under influence of the cam 846, movement of the bell crank 840, the shaft 841 and the arm 847 is impeded, and consequently the link 848 imparts no movement to the yoke 849. When this condition obtains, clockwise movement of the shaft 376 and the crank 766, under influence of the cam 750 (Fig. 41) shifts the latch 853 rearwardly until the notch 854 therein moves beyond the flat portion of the stud 855. The slotted upper end of the link 851 permits the spring 856 to latch the notch 854 over the stud 855 to obstruct return movement counterclockwise of the shaft 376 to hold the nose of the tappet 758 (Fig. 43) in the path of the foot 759 of the dog 506 to disable the receipt mechanism, in the manner explained previously, when a slip is inserted in the machine.

The upward thrust of the extension 838 of the slip feeler 837 (Fig. 44) places quite a strain upon the slip and in order to prevent this strain from tearing or injuring the slip a device has been provided to assume the holding of the slip feeler 837 soon after the machine is set in motion. This device includes a cam 858 secured on the shaft 835, the periphery of which cooperates with a roller 859 on an arm of a lever 865 loose on the shaft 841. Another arm of said lever 865 has a slot which embraces a stud 866 in one arm of a bell crank 867 loose on a stud 868 in the plate 842. Another arm of the bell crank 867 has pivotally mounted thereon a pawl 869 urged clockwise by a torsion spring 870 to normally maintain an extension thereof in resilient engagement with a stud 871 in the bell crank 867. A spring 873 extending between one arm of the bell crank 867 and a stud in the plate 842 maintains the roller 859 in resilient engagement with the cam 858.

If a slip obstructs the upward or clockwise movement of the extension 838 of the slip feeler 837, when the lobe of the cam 846 moves beyond the roller 845, continued rotation of the shaft 835 and the cam 858 causes said cam to rock the lever 865 counterclockwise. This imparts clockwise movement to the bell crank 867, to move a finger 872 of the pawl 869 in the path of the stud 839, which obstructs further clockwise movement of the slip feeler 837 and thereby takes the strain of the upward thrust of the extension 838 off of the inserted slip. When no slip is inserted in the machine the slip feeler 837 moves upwardly or clockwise prior to movement of the lever 865 under influence of the cam 858. Consequently the stud 839 moves beyond the finger 872 and subsequent movement of the lever 865 and the bell crank 867 has no influence on the slip feeler 837. When no slip is inserted in the machine and the slip feeler 837 is permitted to move its full distance upwardly, clockwise movement of the bell crank 867 moves the finger 872 of the pawl 869 in the path of the stud 839 and inasmuch as the slip feeler is restored prior to the bell crank 867 the spring 870 permits the stud 839 to by-pass the finger 872.

Slip impression hammer

Referring to Figs. 44A and 46, rotatable on the shaft 836 is a slip impression hammer 874 which supports a platen 875. The hammer 874 is given two impression strokes each machine operation by a cam 876 secured on the shaft 835 to imprint the desired data upon the original and the duplicate copies of the slip 830 (Fig. 37). A groove 877 in the face of the cam 876 cooperates with a roller 878 on one end of a lever 879 loose on the shaft 836 and having adjustably connected thereto a plate 880 which pivotally supports a hammer operating arm 881. A notch in the upper end of the arm 881 is arranged to engage a stud 882 in the hammer 874. The arm 881 carries a stud 883 which extends through a slot in one end of a link 884, the other end of which is pivotally connected to the upper end of an arm 885 secured on the shaft 841. A spring 886, extending between the stud 883 and a stud in the arm 885, flexibly connects the arm 881 to the arm 885 and normally maintains the notch in said latch in engagement with the stud 882 to couple the hammer 874 to its driving lever 879 whereupon rotation of the cam 876 during machine operation imparts two impression strokes to the lever 879 and the hammer 874. The adjustable plate 880 mounted on the lever 879 provides a means of adjusting the notch in the operating arm 881 in relation to the stud 882 so that the proper pressure between the platen 875 and the type wheels may be obtained.

Operating the machine without a slip inserted therein permits the feeler 837 to move upwardly and the bell crank 840 and the shaft 841 to rock first counterclockwise under influence of the cam 846. This counterclockwise movement of the shaft 841 (Figs. 44 and 44A) also rocks the arm 885 in unison therewith, which by means of the link 884 rocks the operating arm 881 also counterclockwise to disengage the notch in the upper end thereof from the stud 882 in the hammer 874. This permits the hammer operating lever 879 to operate independently of the hammer 874 and it is therefore evident that when no slip is inserted in the machine the hammer 874 remains stationary during machine operation. Upon operation of the machine with a slip inserted therein, the feeler 837 and the bell crank 840 and shaft 841 are retained substantially in the position shown in Figs. 44 and 44A, in which position the notch in the operating arm 881 remains in engagement with the stud 882 to operatively connect the lever 879 to the hammer 874. The cam 876 then imparts two impression strokes to the hammer 874 to print upon the original and the duplicate copies of the slip 830 (Fig. 46). The slot in the link 884 and the flexible connection formed by the spring 886 permits the forward edge of the operating arm 881, adjacent the notch therein, to by-pass the stud 882 when said arm is returned clockwise in unison with the shaft 841 after having been rocked to ineffective position.

Slip feed mechanism

The first stroke of the hammer 874 prints the data shown in Fig. 37 upon the original copy of the slip 830. After the first impression, the slip is fed forwardly to aline the top edge of the duplicate copy thereof with the printing hammer 874 and the type wheels so that the second impression will be made thereon. A detailed description of the feeding mechanism for the slip 830 follows:

When the slip 830 (Figs. 11, 45, 46 and 47) is introduced into the machine, the table 831 guides said slip between a pair of pressure rollers 887 rotatable on a stud 888 secured in the front plate of the ribbon support frame 629 and a corresponding pair of feed rollers 889 fast on a shaft 890 journaled in arms formed by the yoked portion of a plate 891 fulcrumed on the shaft 836. The plate 891 has a slot through which extends a roller 892 on one arm of a two-armed lever 893 loose on the shaft 841 and urged counterclockwise by a spring 894 to normally maintain a roller 895 mounted on the other arm of said lever 893 in contact with the periphery of a cam 896. The cam 896 is integral with a slip feeding cam 897 which is secured on the shaft 835 and consequently makes one counterclockwise revolution in unison with said shaft each machine operation.

When an inserted slip obstructs movement of the slip feeler 837, the bell crank 840, the shaft 841, and the arm 847 during machine operation, said arm 847 retains the link 848 in its forward position as shown in Fig. 47 to prevent a hook 898 thereof from engaging a stud 899 in one arm of the lever 893. The lever 893 is therefore free to follow the contour of the cam 896 under influence of the spring 894 to impart clockwise movement to the plate 891 to cause the feed rollers 889 to yieldingly press the inserted slip 830 against the pressure rollers 887, so that feeding movement of said rollers 889 will feed the slip 830 after the first impression is made thereon. When no slip is inserted in the machine, movement of the slip feeler 837, the yoke 840, the shaft 841 and the arm 847 (Figs. 44 and 47) shifts the link 848 rearwardly to engage the hook 898 with the stud 899 to hold said lever 893 stationary when the high portion of the cam 896 moves beyond the roller 895. This prevents the feed rollers 889 from needlessly moving into contact with the pressure rollers 887 when no slip in inserted in the machine, and thereby prevents possible damage to said feed and pressure rollers.

A feed roller driving rack 900 (Figs. 46 and 47) has teeth which mesh with a pinion 901 secured on the shaft 890 and said rack 900 is mounted to rock in unison with the plate 891 and simultaneously to slide relatively to said plate by means of horizontal slots therein in cooperation respectively with the shaft 836 and a roller 902 mounted on the plate 891. The rack 900 has secured thereto a plate 903 with a vertical slot into which extends a roller 904 on the upper end of an arm 905 loose on a stud 906 in the plate 842 (Figs. 44 and 45) and said arm 905 is connected by a link 907 to a crank 908 fulcrumed on a stud 909 in the plate 842. The crank 908 carries a roller 915 which engages a camming groove in the face of the cam 897 which, as previously stated, is driven one counterclockwise revolution each machine operation by the shaft 835.

Initial movement of the cam 897 rocks the crank 908 and the arm 905 clockwise to shift the rack 900 forwardly to rotate the feed roller 889 counterclockwise prior to engagement of said rollers with the slip 830 and the pressure rollers 887. Immediately thereafter the cam 896 (Figs. 46 and 47) rocks the plate 891 clockwise to cause the feed rollers 889 to press the slip 830 against the pressure rollers 887. The cam 897 then returns the crank 908 and the arm 905 counterclockwise to shift the rack 900 rearwardly. This rotates the feed rollers 889 clockwise to feed the slip 830 after the first impression has been made upon the original copy of said slip to aline the duplicate copy of said slip with the printing mechanism so that the second impression will be made thereon. The cam 896 then rocks the plate 891 counterclockwise to move the feed rollers 889 out of engagement with the slip 830 and the pressure rollers 887.

The arm 920 (Fig. 11), by means of the cam slot 921 therein cooperating with pin 922 on lever 923, positions lever 923 so as to control the operation of clutch 924. Clutch 924 is mounted on shaft 327 and couples the cams (not shown), which operate the follower 925, to the shaft 327. The follower 925 operates link 926 which extends to a detail printer which forms the subject matter of another application and will not be described herein.

It is believed that a thorough understanding of the mode of operation of the machine embodying the instant invention will have been obtained from the foregoing specification, and for this reason a further description of operation is believed unnecessary.

Summarizing briefly, the machine embodying this invention is adapted to perform single item and multiple item transactions. In single item transactions a stub receipt is issued having recorded upon the body and stub portions thereof the complete transaction. In multiple item transactions a stub receipt is issued, upon the body of which is listed the various items, and after all the items have been listed a compulsory multiple item clearing operation is performed in the course of which the total of the items is recorded upon the body and the stub of the multiple item receipt.

The receipt mechanism is under the control of a manipulative member having "On", "Off" and "Automatic" positions. When the manipulative member is in "Automatic" position the issuing of a receipt is controlled by two mutilated gear sectors which are in turn positioned by the transaction keys and the clerks' keys. The total control lever is also arranged to disable the receipt mechanism when said control lever is in certain predetermined positions.

The instant machine is also adapted to print the total of a bill of goods and a complete record of the transaction, both upon the original and duplicate copies of an insertable slip. A slip feeler mechanism cooperating with the slip renders the receipt mechanism inoperative when a slip is inserted in the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow:

What is claimed is:

1. In a machine of the character described adapted to issue a receipt and having means to imprint a plurality of items on said receipt, the combination of means to feed the receipt; means to drive the feeding means; a latch to connect the driving means to the feeding means; means to break the latch and position the feeding means, to cause the receipt to be back-fed a certain distance; means to move the latch breaking means to ineffective position to permit an idle pick-up of the feeding means to cause the receipt to be forwardly-fed a greater distance than it was back-fed to position said receipt to receive the imprint of the first item; and means, including an abrupt surface on the latch breaking means, cooperating with the latch to cause the feeding means to back-feed the receipt a certain distance and to forward-feed said receipt a greater distance to properly space the imprints of subsequent items.

2. In a machine of the class described, adapted to issue a receipt and having means to make imprints on said receipts, the combination of means to feed the receipt; means to drive the feeding means; means to couple the feeding means to the driving means; means to move the coupling means to and from coupling position; means to operate the driving means; means to connect the operating means to the driving means; and means working in synchronism with the coupling means to control the connecting means to cause the receipt to be back-fed and forward-fed varying distances to position said receipt in relation to the imprinting means.

3. In a machine of the character described, adapted to issue a receipt and having means to make imprints on said receipt, the combination of means to feed the receipt; means to drive the feeding means; means to couple the feeding means to the driving means; means to move the coupling means to and from coupling position; means to operate the driving means; a latch to connect the operating means to the driving means; and a plurality of members arranged to disconnect the latch, and working in synchronism with the coupling means to control the latch to cause the receipt to be back-fed and forward-fed varying distances to position said receipt in relation to the imprinting means.

4. In a machine of the class described adapted to issue a receipt and having means to make imprints on said receipt, the combination of means to feed the receipt; means to drive the feeding means; means to couple the feeding means to the driving means; means to move the coupling means to and from coupling position; means to operate the driving means; a latch to connect the operating means to the driving means; a plurality of members working in conjunction with the coupling means to disconnect the latch in various stages of movement of the operating means and the driving means; and means to govern the members to cause the receipt to be back-fed and forwardly-fed varying distances to position said receipt in relation to the imprinting means.

5. In a machine of the character described adapted to issue a receipt and having means to make imprints on said receipt, the combination of means to feed the receipt; means to drive the feeding means; means to couple the feeding means to the driving means; means to move the coupling means to and from coupling position; means to operate the driving means; a latch to connect the operating means to the driving means; a plurality of members working in conjunction with the coupling means; abutments on the members cooperating with the latch to disconnect the operating means from the driving means; and means to govern the members to bring the various abutments into operative alinement with the latch to cause the receipt to be back-fed and forwardly-fed varying distances to position said receipt in relation to the imprinting means.

6. In a machine of the class described, adapted to issue a receipt and having means to make imprints on the receipt, the combination of means to feed the receipt backward and forward; means to drive the feeding means; a latch to connect the driving means to the feeding means; and a plurality of independently operable members cooperating with the latch to disconnect the driving means from the feeding means and to further control the latch to cause the receipt to be back-fed and forward-fed varying distances to position said receipt in relation to the imprinting means.

7. In a machine of the character described, having means to make imprints upon an issuing receipt, the combination of means to feed the receipt; means to drive the feeding means; a latch, normally effective, to connect the driving means to the feeding means; a plurality of members to move the latch to ineffective position; and means to position the members selectively and individually relatively to the latch to disconnect the driving means from the feeding means in various stages of movement thereof to position the receipt in relation to the imprinting means.

8. In a machine of the class described, having means to make imprints upon an issuing receipt, the combination of means to feed the receipt back and forth in relation to the imprinting means; means to drive the feeding means; a latch to connect the driving means to the feeding means; a plurality of independently controllable members; abutments on the members to disengage the latch; and means to position the abutments relatively to the latch to disconnect the driving means from the feeding means in various stages of movement thereof to position the receipt in relation to the imprinting means.

9. In a machine of the class described, having means to make imprints upon an issuing receipt, the combination of means to feed the receipt back and forth in relation to the imprinting means; and means including a latch device and a plurality of independently positionable members cooperating therewith to control the movements of the feeding means to position the receipt in relation to the imprinting means.

10. In a machine of the class described, adapted to make imprints upon an issuing receipt, the combination of means to feed the receipt; means to impart oscillating movement to the feeding means to feed the receipt back and forth; means to connect the imparting means to the feeding means; means to engage and disengage the connecting means; means to drive the imparting means; means to disconnect the driving means from the imparting means to control the feeding of the receipt; and means cooperating with the disconnecting means and effective when the connecting means is disengaged to cause the imparting means to move relatively to the feeding means, to feed the receipt farther in one direction than in the other direction to properly space the printing thereon.

11. In a machine of the class described adapted to make imprints upon an issuing receipt, the combination of means to feed the receipt; means to impart oscillating movement to the feeding means to feed the receipt back and forth; means to connect the imparting means to the feeding means; means to engage and disengage the connecting means; and means including a latch device and means to control the latch device to cause the imparting means to be moved relatively to the feeding means when the connecting means is disengaged to vary the backward and forward feed of the receipt to properly space the printing thereon.

12. In a machine of the class described, having means to make a plurality of imprints upon an issuing receipt, the combination of means including a latch device and a plurality of arms with graduated steps to cause the receipt to be fed varying distances in one direction; and means cooperating with the arms to control the operation of the aforementioned means to cause the receipt to be fed a greater distance in another direction to space said receipt in relation to the imprinting means.

13. In a machine of the class described having means to make a plurality of imprints upon an issuing receipt, the combination of means to feed the receipt; means to impart oscillating movement to the feeding means, to feed the receipt back and forth; means to connect the imparting means to the feeding means; means to engage and disengage the connecting means; means to drive the imparting means; a latch to connect the driving means to the imparting means; means to disengage the latch to control the back-feeding of the receipt; and means cooperating with the latch disengaging means and effective when the connecting means is disengaged to cause the imparting means to move independently of the feeding means to cause the receipt to be fed forwardly a greater distance than it was fed backwardly to properly space the printing thereon.

14. In a machine of the class described, including means to make imprints in several places upon an issuing receipt, the combination of means to feed the receipt; means to impart two movements to the feeding means to feed the receipt back and forth in relation to the imprinting means; means to disconnect the imparting means from the feeding means after said feeding means has terminated its backward feeding movements; and means, including a latch device and control members therefore, to cause the imparting means to move independently of the feeding means to feed the receipt a greater distance forwardly than it was fed backwardly to properly space the printing thereon.

15. In a machine of the class described, adapted to make imprints upon record material, the combination of means to feed the record material; resilient drive means for the feeding means; means to drive the feeding means positively; means to connect the positive driving means to the feeding means; means to engage the connecting means to disengage the positive drive from the feeding means; and means to actuate the engaging means to free a part of the feeding means for operation by the resilient driving means to cause the feeding means to properly space the printing on the record material.

16. In a machine of the class described, having means to make imprints upon record material, the combination of means to feed the record material; means including a latch mechanism to drive the feeding means; and means including a plurality of independently controllable members to variably control the latch mechanism to govern the feeding of the record material to properly space the printing thereon.

17. In a machine of the class described, comprising means to make imprints upon record material, the combination of means to feed the record material; a member to drive the feeding means; means to operate the member; a latch device connecting the member to the operating means; and means including a plurality of independently controllable members to variably control the latch device to govern the feeding of the record material to properly space the printing thereon.

18. In a machine of the class described, having means to make imprints upon an issuing receipt, the combination of means to feed the receipt; a member to drive the feeding means; means to couple the member to the feeding means; means to operate the coupling means; means to operate the member; a latch device to connect the member to the member operating means; and means including positionable elements having means thereon to selectively break the latch at various points to disconnect the member from the member operating means to control the feeding of the receipt to properly space the printing thereon.

19. In a machine of the class described, adapted to print and issue receipts, the combination of means to feed the receipts; means to drive the feeding means; means to connect the driving means to the feeding means; and a plurality of individually controlled positionable members cooperating with the connecting means to disconnect the driving means from the feeding means in various stages of movement thereof to cause receipts of various types and lengths to be printed and issued.

20. In a machine of the class described, having means to make imprints upon receipt material, the combination of means to feed the receipt material; an oscillating member to drive the feeding means in two directions to feed the receipt material back and forth in relation to the printing and issuing means; means to operate the oscillating member; means to connect the operating means to the oscillating member; means to control the connecting means to terminate initial movement of the oscillating member and the feeding means; and means to cause the oscillating member to move independently of the feeding means and the operating means, whereupon the feeding means is returned a greater distance than it was moved initially to properly position the receipt material in relation to the printing means.

21. In a machine of the class described, reversibly operable means to feed issuing receipts; actuating means for the feeding means; and means to control the actuating means so that the actuating means operates the feeding means to feed the receipt back and forth different amounts during each operation in order to properly line-space the receipt.

22. In a machine of the class described, having means to make a plurality of impressions upon an issuing receipt, the combination of receipt feeding means; actuating means for the feeding means, said actuating means including a latch device; means to couple the actuating means to the feeding means; a plurality of arms with graduated steps to control the operation of the actuating means for the feeding means to cause the receipt to be fed various predetermined distances in one direction; and means cooperating with the arms to further control the actuating means to cause the feeding means to feed the receipt a greater distance in another direction to space said receipt in relation to the imprinting means.

23. In a machine of the class described adapted to print on issuing receipts, the combination of receipt feeding means; actuating means for said feeding means; coupling means for selectively coupling the actuating means to the feeding means; positive drive means for the actuating means; yielding drive means for the actuating means; and means to control the operation of the coupling means to couple the actuating means to the feeding means when the actuating means is being operated by the positive drive means and to uncouple the actuating means from the drive means when the actuating means is being operated by the yielding drive means.

24. In a machine of the class described, having means to make records on an issuing receipt, the combination of means to feed the receipt back and forth; actuating means for said feeding means, including a latch; coupling means for selectively coupling the actuating means with the feeding means; resilient driving means for said actuating means; positive driving means connected to the actuating means by said latch; a plurality of members operable to engage the latch to disconnect the actuating means from the positive driving means; and means operating in synchronism with said coupling means and operable to shift said members to release the latch and actuating means for an idle operation by the resilient driving means so that said feeding means may be operated different extents to feed the receipt a greater distance in one direction than in the other.

EVERETT H. PLACKE.
GEORGE H. TASKER.